(12) United States Patent
Nuhn

(10) Patent No.: US 12,337,633 B2
(45) Date of Patent: *Jun. 24, 2025

(54) AMPHIBIOUS PUMPING VEHICLE

(71) Applicant: Nuhn Industries Ltd., Sebringville (CA)

(72) Inventor: Ian Nuhn, Stratford (CA)

(73) Assignee: Nuhn Industries Ltd., Sebringville (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/073,035

(22) Filed: Dec. 1, 2022

(65) Prior Publication Data

US 2023/0092599 A1 Mar. 23, 2023

Related U.S. Application Data

(63) Continuation of application No. 17/886,130, filed on Aug. 11, 2022, now Pat. No. 11,541,708, which is a
(Continued)

(51) Int. Cl.
*B60F 3/00* (2006.01)
*A01C 3/02* (2006.01)
(Continued)

(52) U.S. Cl.
CPC ............ *B60F 3/0061* (2013.01); *A01C 3/026* (2013.01); *A01C 23/045* (2013.01);
(Continued)

(58) Field of Classification Search
CPC ........ B60F 3/00; B60F 3/0061; B60F 3/0038; B60F 3/0007; B60F 3/003; B60F 2301/00;
(Continued)

(56) References Cited

U.S. PATENT DOCUMENTS

| 613,809 A | 11/1898 | Tesla |
| 1,040,543 A | 10/1912 | Hughes |

(Continued)

FOREIGN PATENT DOCUMENTS

| CA | 2002619 C | 11/1989 |
| CN | 101687451 A | 3/2010 |

(Continued)

OTHER PUBLICATIONS

International Search Report and Written Opinion dated Nov. 5, 2014 on PCTCA2014050789.
(Continued)

*Primary Examiner* — Stephen P Avila

(74) *Attorney, Agent, or Firm* — Brunet & Co. Ltd.; Robert Brunet; Hans Koenig

(57) ABSTRACT

An amphibious vehicle has a floatable vehicle body; ground engaging propulsion structure having a plurality of ground engaging elements; a fluid pump for pumping liquid manure; a power source configured to provide power to both the ground engaging propulsion structure and the fluid pump; and, remote control structure for controlling the ground engaging propulsion structure and a flow of fluid from the fluid pump. The speed and/or direction of the vehicle is remotely controllable by an operator remote from the vehicle when the vehicle is ground engaging and when the vehicle is floating.

75 Claims, 7 Drawing Sheets

Related U.S. Application Data continuation of application No. 17/201,100, filed on Mar. 15, 2021, now Pat. No. 11,491,835, which is a continuation of application No. 16/891,627, filed on Jun. 3, 2020, now Pat. No. 10,974,557, which is a continuation of application No. 16/157,950, filed on Oct. 11, 2018, now Pat. No. 10,710,422, which is a continuation of application No. 15/586,493, filed on May 4, 2017, now Pat. No. 10,124,638, which is a continuation of application No. 15/044,905, filed on Feb. 16, 2016, now Pat. No. 9,694,636, which is a continuation of application No. PCT/CA2014/050789, filed on Aug. 18, 2014.

(60) Provisional application No. 61/867,598, filed on Aug. 19, 2013.

(51) Int. Cl.
*A01C 23/04* (2006.01)
*B63H 25/02* (2006.01)
*F04D 13/02* (2006.01)

(52) U.S. Cl.
CPC ............ *B60F 3/0007* (2013.01); *B60F 3/003* (2013.01); *B60F 3/0038* (2013.01); *B63H 25/02* (2013.01); *F04D 13/02* (2013.01); *B60F 2301/00* (2013.01); *B63H 2025/028* (2013.01)

(58) Field of Classification Search
CPC ...... A01C 3/026; A01C 23/045; B63H 25/02; B63H 2025/028; F04D 13/02
See application file for complete search history.

(56) References Cited

U.S. PATENT DOCUMENTS

| | | |
|---|---|---|
| 1,747,817 A | 2/1930 | Albert |
| 1,943,152 A | 1/1934 | Weiss |
| 2,309,947 A | 2/1943 | Maxwell et al. |
| 2,578,805 A | 12/1951 | Johnson |
| 2,586,218 A | 2/1952 | Gazda |
| 2,625,110 A | 1/1953 | Haentjens |
| 2,890,659 A | 5/1955 | Haentjens et al. |
| 2,792,158 A | 5/1957 | Veitch, Sr. et al. |
| 3,199,486 A | 8/1965 | Gillois et al. |
| 3,256,950 A | 6/1966 | De Biasi |
| 3,263,968 A | 8/1966 | Sahlstrom |
| 3,306,250 A | 2/1967 | Pitchford |
| 3,367,583 A | 2/1968 | Kellogg |
| 3,384,047 A | 5/1968 | Remley |
| 3,385,255 A | 5/1968 | Raymond et al. |
| 3,417,929 A | 12/1968 | Secrest |
| 3,444,837 A | 5/1969 | Donofrio |
| 3,446,151 A | 5/1969 | Vince |
| 3,456,592 A | 7/1969 | Nelsen |
| 3,537,659 A | 11/1970 | Vagedes |
| 3,557,981 A | 1/1971 | Seymour |
| 3,610,416 A | 10/1971 | Englesberg |
| 3,664,451 A | 5/1972 | Rogers et al. |
| 3,733,151 A | 5/1973 | Timmons et al. |
| 3,737,255 A | 6/1973 | Emeny |
| 3,824,042 A | 7/1974 | Barnes et al. |
| 3,860,035 A | 1/1975 | Semple |
| 3,892,079 A | 7/1975 | Hirano et al. |
| 3,905,725 A | 9/1975 | Johnson |
| 3,948,450 A | 4/1976 | Erlitz |
| 3,957,633 A | 5/1976 | Gatti et al. |
| 3,966,361 A | 6/1976 | House |
| 4,063,849 A | 12/1977 | Modianos |
| 4,145,008 A | 3/1979 | Wolford |
| 4,214,879 A | 7/1980 | Whetstone et al. |
| 4,270,307 A | 6/1981 | Arigaya |
| 4,332,484 A | 6/1982 | Peters |
| 4,406,413 A | 9/1983 | Houle |
| 4,416,549 A | 11/1983 | Kretschmer |
| 4,445,823 A | 5/1984 | Zyduck |
| 4,508,272 A | 4/1985 | Thompson |
| 4,512,665 A | 4/1985 | Cline et al. |
| 4,545,315 A | 10/1985 | Becherer |
| 4,555,063 A | 11/1985 | Goettsch |
| 4,572,675 A | 2/1986 | Roberts |
| 4,594,006 A | 6/1986 | Depeault |
| 4,596,511 A | 6/1986 | Weinrib |
| 4,616,979 A | 10/1986 | Hynes et al. |
| 4,618,426 A | 10/1986 | Mandt |
| 4,661,046 A | 4/1987 | Ruyle |
| 4,664,051 A | 5/1987 | Newkirk |
| 4,699,597 A | 10/1987 | Oja |
| 4,744,324 A | 5/1988 | Martinmaas |
| 4,830,585 A | 5/1989 | Ruyle |
| 4,836,687 A | 6/1989 | Kardoes et al. |
| 4,874,575 A | 10/1989 | Dunn et al. |
| 4,896,445 A | 1/1990 | Deal |
| 4,904,159 A | 2/1990 | Wickoren |
| 4,971,526 A | 11/1990 | Ruyle |
| 5,100,303 A | 3/1992 | Depault |
| 5,141,390 A | 8/1992 | Haentjens |
| 5,176,098 A | 1/1993 | Royle |
| 5,267,830 A | 12/1993 | Wickoren et al. |
| 5,435,664 A | 7/1995 | Pettersson |
| 5,624,241 A | 4/1997 | Nesseth |
| 5,687,669 A | 11/1997 | Engler |
| 5,690,046 A | 11/1997 | Grzech, Jr. |
| 5,744,072 A | 4/1998 | Karliner |
| 5,984,032 A | 11/1999 | Gremillion et al. |
| 5,993,273 A | 11/1999 | Adams |
| 6,276,824 B1 | 8/2001 | De Jager |
| 6,406,255 B1 | 6/2002 | Angelle |
| 6,482,052 B1 | 11/2002 | Giljam |
| 6,520,750 B2 | 2/2003 | Eller et al. |
| 6,666,735 B2 | 12/2003 | Benoit |
| 6,672,916 B1 | 1/2004 | Lent-Phillips et al. |
| 6,798,336 B2 | 9/2004 | Kanda et al. |
| 6,808,430 B1 | 10/2004 | March |
| 6,922,922 B2 | 8/2005 | Cheramie |
| 7,032,698 B2 | 4/2006 | Lee et al. |
| 7,159,889 B2 | 1/2007 | Nuhn et al. |
| 7,314,395 B2 | 1/2008 | Bryham |
| 7,478,817 B1 | 1/2009 | Carrier |
| 7,585,135 B1 | 9/2009 | Deal, Jr. |
| 7,797,789 B2 | 9/2010 | Nuhn |
| 7,833,071 B2 | 11/2010 | Gaither |
| 8,256,692 B2 | 9/2012 | Knowles |
| 8,301,318 B2 | 10/2012 | Lacaze et al. |
| 8,543,256 B1 | 9/2013 | Karafiath |
| 8,764,499 B1 | 7/2014 | March |
| 8,894,452 B2 | 11/2014 | Tiew |
| 8,899,165 B2 | 12/2014 | Puck |
| 8,939,637 B2 | 1/2015 | Depault |
| 8,944,758 B2 | 2/2015 | Nuhn |
| 9,462,741 B2 | 10/2016 | Puck |
| 9,572,297 B2 | 2/2017 | Puck |
| 9,694,636 B2 * | 7/2017 | Nuhn .............. B60F 3/003 |
| 9,931,899 B2 | 4/2018 | Coast |
| 10,118,138 B2 | 11/2018 | Tews |
| 10,124,638 B2 * | 11/2018 | Nuhn .............. B60F 3/0038 |
| 10,212,879 B2 | 2/2019 | Nuhn |
| 10,694,661 B2 | 6/2020 | Nuhn |
| 10,974,557 B2 * | 4/2021 | Nuhn .............. B60F 3/0038 |
| 11,358,425 B1 | 6/2022 | Nuhn |
| 11,448,224 B2 | 9/2022 | Nuhn |
| 11,491,835 B2 * | 11/2022 | Nuhn .............. B63H 25/02 |
| 11,499,665 B2 | 11/2022 | Marvi et al. |
| 11,541,708 B2 * | 1/2023 | Nuhn .............. B60F 3/0007 |
| 2002/0112460 A1 | 8/2002 | Penny |
| 2005/0124234 A1 | 6/2005 | Sells et al. |
| 2010/0144220 A1 | 6/2010 | Bailey |
| 2012/0185129 A1 | 7/2012 | Carrier |
| 2012/0263014 A1 | 10/2012 | Von Briel |
| 2013/0016490 A1 | 1/2013 | Asano |
| 2013/0033070 A1 | 2/2013 | Kinsman et al. |
| 2013/0145980 A1 | 6/2013 | Puck |

(56) References Cited

U.S. PATENT DOCUMENTS

| | | |
|---|---|---|
| 2014/0112093 A1 | 4/2014 | Puck |
| 2014/0288763 A1 | 9/2014 | Bennett et al. |
| 2014/0312156 A1 | 10/2014 | Minino et al. |
| 2015/0201548 A1 | 7/2015 | Wolter et al. |
| 2015/0258868 A1 | 9/2015 | Visscher |
| 2015/0367297 A1 | 12/2015 | Tews |
| 2017/0118907 A1 | 5/2017 | Nuhn |
| 2018/0343786 A1 | 12/2018 | Svenby et al. |
| 2021/0331752 A1 | 10/2021 | Bennett et al. |

FOREIGN PATENT DOCUMENTS

| | | |
|---|---|---|
| CN | 202715247 U | 2/2013 |
| DE | 2364962 A1 | 7/1975 |
| DE | 2818501 A1 | 8/1979 |
| DE | 3431345 A1 | 3/1986 |
| DE | 8218017 A1 | 10/1986 |
| DE | 3711015 A1 | 10/1988 |
| DE | 19527977 A1 | 12/1996 |
| EP | 0325091 A1 | 7/1989 |
| EP | 730 094 B1 | 4/2000 |
| EP | 1782882 A1 | 5/2007 |
| GB | 2049384 A | 12/1980 |
| GB | 2110101 A | 6/1983 |
| GB | 2349101 A | 10/2000 |
| GB | 2366218 A | 3/2002 |
| GB | 2401829 A | 11/2004 |
| JP | 2001037903 A | 2/2001 |
| KR | 20130016490 A | 2/2013 |
| RU | 131561 U1 | 8/2013 |
| WO | 2008/038029 A2 | 4/2008 |
| WO | 2011/035430 A1 | 3/2011 |
| WO | 2015/024116 A1 | 2/2015 |

OTHER PUBLICATIONS

Office action dated Jan. 5, 2017 on U.S. Appl. No. 15/044,905.
Office action dated Mar. 2, 2017 on CN 201480053275.
Office action dated Aug. 23, 2017 on EA 201690422-31.
Office action dated Aug. 23, 2017 on U.S. Appl. No. 15/586,493.
Office action dated Nov. 6, 2017 on CN 201480053275.
Office action dated Dec. 15, 2017 on U.S. Appl. No. 15/586,493.
Office action dated Nov. 21, 2019 on U.S. Appl. No. 16/157,950.
Office action dated Sep. 14, 2020 on U.S. Appl. No. 16/891,627.
Office action dated Feb. 1, 2021 on U.S. Appl. No. 16/891,627.
Arguments in reexamination request dated May 6, 2022 on U.S. Appl. No. 10/974,557.
Order granting reexamination request dated May 26, 2022 on U.S. Appl. No. 10/974,557.
Office action dated Aug. 12, 2022 in reexamination of U.S. Appl. No. 10/974,557.
Office action dated Aug. 19, 2022 on U.S. Appl. No. 17/201,100.
Arguments in reexamination request dated Aug. 31, 2022 on U.S. Appl. No. 11/358,425.
Order granting reexamination request dated Sep. 19, 2022 on U.S. Appl. No. 11/358,425.
Office action dated Oct. 21, 2022 in reexamination of U.S. Appl. No. 10/974,557.
Office action dated Oct. 31, 2022 on U.S. Appl. No. 17/886,130.
Notice of intent to issue reexamination certificate dated Nov. 2, 2022 on U.S. Appl. No. 11/358,425.
Reexamination certificate dated Nov. 16, 2022 on U.S. Appl. No. 11/358,425.
SDIA64-ECF-35 Defendant Bazooka Farmstar, LLC's Motion for Leave to File a First Amended Answer in *Nuhn Industries Ltd. v. Bazooka Farmstar, LLC*, U.S. District Court for the Southern District of Iowa, Case No. 3:22-cv-00064-SMR-HCA filed Apr. 14, 2023 (ECF 35, 35-01, 35-02, 35-03).
SDIA64-ECF-38 Plaintiff Nuhn Industries Ltd.'s Response in Opposition to Defendant Bazooka Farmstar, LLC's Motion for Leave to File a First Amended Answer in *Nuhn Industries Ltd. v. Bazooka Farmstar, LLC*, U.S. District Court for the Southern District of Iowa, Case No. 3:22-cv-00064-SMR-HCA filed Apr. 28, 2023 (ECF 38, 38-01).
SDIA64-ECF-41 Defendant Bazooka Farmstar, LLC's Reply in Support of its Motion for Leave to File a First Amended Answer in *Nuhn Industries Ltd. v. Bazooka Farmstar, LLC*, U.S. District Court for the Southern District of Iowa, Case No. 3:22-cv-00064-SMR-HCA filed May 5, 2023 (ECF 41).
SDIA64—InitialInvalidityContentions—Part1a Defendant Bazooka Farmstar, LLC's Initial Invalidity Contentions in *Nuhn Industries Ltd. v. Bazooka Farmstar, LLC*, U.S. District Court for the Southern District of Iowa, Case No. 3:22-cv-00064-SMR-HCA served on May 5, 2023—Part 1a.
SDIA64—InitialInvalidityContentions—Part1b Defendant Bazooka Farmstar, LLC's Initial Invalidity Contentions in *Nuhn Industries Ltd. v. Bazooka Farmstar, LLC*, U.S. District Court for the Southern District of Iowa, Case No. 3:22-cv-00064-SMR-HCA served on May 5, 2023—Part 1b.
SDIA64—InitialInvalidityContentions—Part2 Defendant Bazooka Farmstar, LLC's Initial Invalidity Contentions in *Nuhn Industries Ltd. v. Bazooka Farmstar, LLC*, U.S. District Court for the Southern District of Iowa, Case No. 3:22-cv-00064-SMR-HCA served on May 5, 2023—Part 2.
SDIA64—InitialInvalidityContentions—Part3 Defendant Bazooka Farmstar, LLC's Initial Invalidity Contentions in *Nuhn Industries Ltd. v. Bazooka Farmstar, LLC*, U.S. District Court for the Southern District of Iowa, Case No. 3:22-cv-00064-SMR-HCA served on May 5, 2023—Part 3.
SDIA64—InitialInvalidityContentions—Part4 Defendant Bazooka Farmstar, LLC's Initial Invalidity Contentions in *Nuhn Industries Ltd. v. Bazooka Farmstar, LLC*, U.S. District Court for the Southern District of Iowa, Case No. 3:22-cv-00064-SMR-HCA served on May 5, 2023—Part 4.
SDIA64—InitialInvalidityContentions—Part5 Defendant Bazooka Farmstar, LLC's Initial Invalidity Contentions in *Nuhn Industries Ltd. v. Bazooka Farmstar, LLC*, U.S. District Court for the Southern District of Iowa, Case No. 3:22-cv-00064-SMR-HCA served on May 5, 2023—Part 5.
SDIA76-ECF-14 Defendant Bazooka Farmstar, LLC's Answer in *Nuhn Industries Ltd. v. Bazooka Farmstar, LLC*, U.S. District Court for the Southern District of Iowa, Case No. 3:22-cv-00076-SMR-HCA filed Jan. 20, 2023 (ECF 14, 14-01, 14-02, 14-03, 14-04).
SDIA76-ECF-23 Plaintiff Nuhn Industries Ltd.'s Motion to Dismiss Defendant Bazooka Farmstar, LLC's Counterclaims in *Nuhn Industries Ltd. v. Bazooka Farmstar, LLC*, U.S. District Court for the Southern District of Iowa, Case No. 3:22-cv-00076-SMR-HCA filed Feb. 10, 2023 (ECF 23, 23-01, 23-02, 23-03, 23-04, 23-05, 23-06, 23-07, 23-08, 23-09, 23-10, 23-11, 23-12, 23-13, 23-14).
SDIA76-ECF-24-Part1 Defendant Bazooka Farmstar, LLC's First Amended Answer in *Nuhn Industries Ltd. v. Bazooka Farmstar, LLC*, U.S. District Court for the Southern District of Iowa, Case No. 3:22-cv-00076-SMR-HCA filed Feb. 24, 2023 (ECF 24, 24-01, 24-02, 24-03, 24-04, 24-05)—Part 1.
SDIA76-ECF-24-Part2 Defendant Bazooka Farmstar, LLC's First Amended Answer in *Nuhn Industries Ltd. v. Bazooka Farmstar, LLC*, U.S. District Court for the Southern District of Iowa, Case No. 3:22-cv-00076-SMR-HCA filed Feb. 24, 2023 (ECF 24, 24-01, 24-02, 24-03, 24-04, 24-05)—Part 2.
SDIA76-ECF-24-Part3 Defendant Bazooka Farmstar, LLC's First Amended Answer in *Nuhn Industries Ltd. v. Bazooka Farmstar, LLC*, U.S. District Court for the Southern District of Iowa, Case No. 3:22-cv-00076-SMR-HCA filed Feb. 24, 2023 (ECF 24, 24-01, 24-02, 24-03, 24-04, 24-05)—Part 3.
SDIA76-ECF-24-Part4 Defendant Bazooka Farmstar, LLC's First Amended Answer in *Nuhn Industries Ltd. v. Bazooka Farmstar, LLC*, U.S. District Court for the Southern District of Iowa, Case No. 3:22-cv-00076-SMR-HCA filed Feb. 24, 2023 (ECF 24, 24-01, 24-02, 24-03, 24-04, 24-05)—Part 4.
SDIA76-ECF-25 Plaintiff Nuhn Industries Ltd.'s Motion to Dismiss Defendant Bazooka Farmstar, LLC's First Amended Answer in *Nuhn Industries Ltd. v. Bazooka Farmstar, LLC*, U.S. District Court for the Southern District of Iowa, Case No. 3:22-cv-00076-SMR-

(56) References Cited

OTHER PUBLICATIONS

HCA filed Mar. 10, 2023 (ECF 25, 25-01, 25-02, 25-03, 25-04, 25-05, 25-06, 25-07, 25-08, 25-09, 25-10, 25-11, 25-12, 25-13, 25-14).
SDIA76-ECF-27 Defendant Bazooka Farmstar, LLC's Response in Opposition to Plaintiff Nuhn Industries Ltd.'s Motion to Dismiss Defendant Bazooka Farmstar, LLC's First Amended Answer in *Nuhn Industries Ltd. v. Bazooka Farmstar, LLC*, U.S. District Court for the Southern District of Iowa, Case No. 3:22-cv-00076-SMR-HCA filed Mar. 24, 2023 (ECF 27).
SDIA76-ECF-29 Plaintiff Nuhn Industries Ltd.'s Reply in Support of its Motion to Dismiss Defendant Bazooka Farmstar, LLC's First Amended Answer in *Nuhn Industries Ltd. v. Bazooka Farmstar, LLC*, U.S. District Court for the Southern District of Iowa, Case No. 3:22-cv-00076-SMR-HCA filed Mar. 31, 2023 (ECF 29).
Office Action dated Mar. 1, 2011 on U.S. Appl. No. 13/038,189.
Office action dated Apr. 9, 2014 on U.S. Appl. No. 13/038,189.
Office action dated Oct. 2, 2015 on U.S. Appl. No. 14/570,504.
Office action dated May 6, 2016 on U.S. Appl. No. 14/570,504.
Office action dated Jan. 5, 2018 on U.S. Appl. No. 15/063,566.
Office action dated Jan. 17, 2020 on U.S. Appl. No. 16/053,331.
Office action dated May 19, 2020 on U.S. Appl. No. 16/053,331.
Interview summary dated Aug. 18, 2020 on U.S. Appl. No. 16/053,331.
Office action dated Nov. 25, 2022 on U.S. Appl. No. 17/886,031.
Office action dated Jun. 23, 2023 on U.S. Appl. No. 17/886,031.
Office action dated Jul. 6, 2023 on U.S. Appl. No. 18/120,034.
Office action dated Aug. 30, 2016 on CA 2733049.
Office action dated Jan. 16, 2017 on CA 2733049.
Office action dated Mar. 9, 2023 on U.S. Appl. No. 18/073,035.
SDIA 15-ECF-85, Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85).
SDIA 15-ECF-85-1, Defendant Bazooka Farmstar, LLC's Brief in Support of Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-01).
SDIA 15-ECF-85-2, Exhibit 1 Clean '557 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-02)—Part 1.
SDIA 15-ECF-85-2, Exhibit 1 Clean '557 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-02)—Part 2.
SDIA 15-ECF-85-2, Exhibit 1 Clean '557 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-02)—Part 3.
SDIA 15-ECF-85-2, Exhibit 1 Clean '557 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-02)—Part 4.
SDIA 15-ECF-85-3, Exhibit 2 Redline '557 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-03).
SDIA 15-ECF-85-4, Exhibit 3 Clean '425 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-04)—Part 1.
SDIA 15-ECF-85-4, Exhibit 3 Clean '425 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-04)—Part 2.
SDIA 15-ECF-85-4, Exhibit 3 Clean '425 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-04)—Part 3.
SDIA 15-ECF-85-4, Exhibit 3 Clean '425 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-04)—Part 4.
SDIA 15-ECF-85-5, Exhibit 4 Redline '425 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-05).
SDIA 15-ECF-85-6, Exhibit 3 Clean '708 and '835 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-06)—Part 1.
SDIA 15-ECF-85-6, Exhibit 3 Clean '708 and '835 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-06)—Part 2.
SDIA 15-ECF-85-6, Exhibit 3 Clean '708 and '835 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-06)—Part 3.
SDIA 15-ECF-85-6, Exhibit 3 Clean '708 and '835 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-06)—Part 4.
SDIA 15-ECF-85-6, Exhibit 3 Clean '708 and '835 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-06)—Part 5.
SDIA 15-ECF-85-6, Exhibit 3 Clean '708 and '835 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-06)—Part 6.
SDIA 15-ECF-85-7, Exhibit 4 Redline '708 and '835 Amended Answer to Defendant Bazooka Farmstar, LLC's Motion for Leave to File Amended Answers and Counterclaims in *Nuhn Industries Ltd. v. Bazooka Farmstar, LLC*, U.S. District Court for the Southern District of Iowa, Case No. 3:22-cv-00015-SMR-HCA filed Jun. 28, 2023 (ECF 85-07).

(56) References Cited

OTHER PUBLICATIONS

SDIA 64—Husky Farm Equipment Brochure Sep. 11, 1985—BAZ000083.
SDIA 64—J. Houle & Fils Inc. / Internet Archive Houle Website: Super Pump Prior to Oct. 20, 2007—BAZ000120.
EX1026 and EX1027—Johanna Kaschik, A Frog as a Role Model, Aug. 25, 2011.
EX1046—Randy L. Beaver, William E. Field, Summary of Documented Fatalities in Livestock Manure Storage and handling Facilities—1975-2004, 12, J. Agromedicine 3 (2007).
EX1049—U.S. Ctr. for Disease Control, Fatalities Attributed to Entering Manure Waste Pits—Minnesota, 1992, 42, Morbidity & Mortality Wkly Rep. 325 (1993).
EX1051—U.S. Gov't Accountability Off., GAO-05-96, Workplace Safety and Health: Safety in the Meat and Poultry Industry, while Improving Could Be Further Strengthened (2005).
EX1052—Siduo Zhang, Nat'l Collaborating Ctr. for Env't Health, Air Quality and Community Health Impact of Animal Manure Management (2011).
EX1055—C.A. Loto & A.P.I Popoola, Environmental Surface Degradation of Galvanised and Mild Steels in Cattle and Poultry Wastes and Urea Solution, 6(13) Int'l J. Phys. Sci. 3074-81 (2011).
EX1068—Scheduling and Trial Setting Order in the '015 Litigation (Case 3:22-cv-00015-SMR-HCA, Dkt. 76, Filed Apr. 17, 2023).
Graham Kozak, Gibbs Sports Amphibians Launches the Quadski: All-Terrain Vehicle Achieves 45 Mph on Land and Water, Autoweek, (Oct. 15, 2012). https://www.autoweek.com/news/a1972646/gibbssports-amphibians-launches-quadski-all-terrain-vehicle-achieves-45-mph-land/.
Sealegs Fire Craft—Rescue and Response (Jan. 2, 2010). https://www.sealegs.com/blog/posts/2010/january/sealegs-firecraft-61m/.
U.S. Appl. No. 60/812,530 to Gaither, filed Jun. 9, 2006.
U.S. Appl. No. 61/805,113 to Bennett, filed Mar. 25, 2013.
U.S. Appl. No. 61/867,598 to Nuhn, filed Aug. 19, 2013.
U.S. Appl. No. 61/805,113, filed Mar. 25, 2013.
Jun. 30, 2023 Petition dated Jun. 30, 2023 for Inter Partes Review of U.S. Pat. No. 11,358,425.
EX1039—Jun. 29, 2023 Defendant's Stipulation of Invalidity Contentions. *Nuhn Industries Ltd.* v. *Bazooka Farmstar, LLC.* in the United States District Court for the Southern District of Iowa Eastern Division. Case No. 3:22-cv-00015-SMR-HCA.
EX1004—Declaration of Eric S. Winkel, Ph.D., P.E. dated Jun. 29, 2023 in Support of Petition for Inter Partes Review of U.S. Pat. No. 11,358,425. Part 1.
EX1004—Declaration of Eric S. Winkel, Ph.D., P.E. dated Jun. 29, 2023 in Support of Petition for Inter Partes Review of U.S. Pat. No. 11,358,425. Part 2.
EX1019—Lyseng R. Float your boat in a slurry moat. The Western Producer. Aug. 29, 2013.
EX1023—TruxorExG-Truxor_2012_ENG. Truxor Amphibian tool carrier brochure.
EX1021—TruxorExE-Truxor2013-USinchFloridAquaticJohnFarell. Truxor Amphibian tool carrier brochure.
EX1022—Truxor Ex F 2013 US inch Hockney. Truxor Amphibian tool carrier brochure.
EX1008—Truxor-DeclarationRediarOlofsson dated Feb. 27, 2023. Part 1.
EX1008—Truxor-DeclarationRediarOlofsson dated Feb. 27, 2023. Part 2.
EX1008—Truxor-DeclarationRediarOlofsson dated Feb. 27, 2023. Part 3.
EX1007—Truxor-DeclarationJanDavidArnoldsson dated Mar. 26, 2023. Part 1.
EX1007—Truxor-DeclarationJanDavidArnoldsson dated Mar. 26, 2023. Part 2.
EX1007—Truxor-DeclarationJanDavidArnoldsson dated Mar. 26, 2023. Part 3.
EX1027—Berky Newspaper. The frog as a role model. Aug. 25, 2011.
EX1013—Berky-DeclarationAnsgarLonnemann dated Jun. 15, 2023.
EX1044—ANSI/HI 9.6.7-2010. Effects of Liquid Viscosity on Rotodynamic (Centrifugal and Vertical) Pump Performance.
EX1045—Thygesen O, et al. Indicators of Physical Properties and Plant Nutrient Content of Animal Slurry and Separated Slurry. Transactions of the ASABE, 2012.
EX1047—Marks R. Cesspools of Shame. How Factory Farm Lagoons and Sprayfields Threaten Environmental and Public Health. Natural Resources Defense Council and the Clean Water Network, Jul. 2001.
EX1057—Yeaple F. Fluid Power Design Handbook, Third Edition, Revised and Expanded. Preface and Chapter 10. 1995.
EX1060—Odgers E, et al. Manure Gas Safety. Review of Practices and Recommendations for Wisconsin Livestock Farms. 2008.
EX1062—Part 651 Agricultural Waste Management Field Handbook. Chapter 4. Agricultural Waste Characteristics. United States Department of Agriculture, Natural Resources Conservation Service. 2008.
EX1063—Part 651 Agricultural Waste Management Field Handbook. Chapter 10. Agricultural Waste Management System Component Design. United States Department of Agriculture, Natural Resources Conservation Service. 2009.
EX1064—Part 651 Agricultural Waste Management Field Handbook. Chapter 11. Waste Utilization. United States Department of Agriculture, Natural Resources Conservation Service. 2013.
EX1065—Part 651 Agricultural Waste Management Field Handbook. Chapter 11. Waste Utilization. United States Department of Agriculture, Natural Resources Conservation Service. 1992.
EX1066—Part 651 Agricultural Waste Management Field Handbook. Chapter 12. Waste Management Equipment. United States Department of Agriculture, Natural Resources Conservation Service. 2011.
EX1067—Part 651 Agricultural Waste Management Field Handbook. Chapter 13. Operation, Maintenance, and Safety. United States Department of Agriculture, Natural Resources Conservation Service. 2011.
EX1040—Dougherty M, et al. Liquid Manure Application Systems Design Manual. Northeast Regional Agricultural Engineering Service (NRAES) Cooperative Extension. 1998. Part 1.
EX1040—Dougherty M, et al. Liquid Manure Application Systems Design Manual. Northeast Regional Agricultural Engineering Service (NRAES) Cooperative Extension. 1998. Part 2.
EX1040—Dougherty M, et al. Liquid Manure Application Systems Design Manual. Northeast Regional Agricultural Engineering Service (NRAES) Cooperative Extension. 1998. Part 3.
EX1040—Dougherty M, et al. Liquid Manure Application Systems Design Manual. Northeast Regional Agricultural Engineering Service (NRAES) Cooperative Extension. 1998. Part 4. (EX1040).
EX1040—Dougherty M, et al. Liquid Manure Application Systems Design Manual. Northeast Regional Agricultural Engineering Service (NRAES) Cooperative Extension. 1998. Part 5. (EX1040).
EX1040—Dougherty M, et al. Liquid Manure Application Systems Design Manual. Northeast Regional Agricultural Engineering Service (NRAES) Cooperative Extension. 1998. Part 6. (EX1040).
EX1040—Dougherty M, et al. Liquid Manure Application Systems Design Manual. Northeast Regional Agricultural Engineering Service (NRAES) Cooperative Extension. 1998. Part 7. (EX1040).
EX1040—Dougherty M, et al. Liquid Manure Application Systems Design Manual. Northeast Regional Agricultural Engineering Service (NRAES) Cooperative Extension. 1998. Part 8. (EX1040).
EX1050—Preventing Deaths of Farm Workers in Manure Pits. The National Institute for Occupational Safety and Health (NIOSH). 1990.
EX1053—Manure Storage Safety. ASAE EP470 Jan. 1992 (R2005). pp. 796-800.
EX1054—Livestock Waste Facilities Handbook, Third Edition, 1993. MidWest Plan Service. Iowa State University. Part 1.
EX1054—Livestock Waste Facilities Handbook, Third Edition, 1993. MidWest Plan Service. Iowa State University. Part 2.
EX1056—Safley LM, et al. Corrosion of Galvanized Steel in Animal Waste Environments. Bioresource Technology 40 (1992) 53-61.
Huning Brand Power-take-off pumps website extract. Sep. 12, 2013.

(56) References Cited

OTHER PUBLICATIONS

Manure Manager magazine. Jul./Aug. 2011, pp. 23-24.
Request for Ex Parte Reexamination dated Jun. 30, 2023 on U.S. Appl. No. 11/448,224—Part 1.
Request for Ex Parte Reexamination dated Jun. 30, 2023 on U.S. Appl. No. 11/448,224—Part 2.
Request for Ex Parte Reexamination dated Jun. 30, 2023 on U.S. Appl. No. 11/448,224—Part 3.
Request for Ex Parte Reexamination dated Jun. 30, 2023 on U.S. Appl. No. 11/448,224—Part 4.
Request for Ex Parte Reexamination dated Jun. 30, 2023 on U.S. Appl. No. 11/448,224—Part 5.
Request for Ex Parte Reexamination dated Jun. 30, 2023 on U.S. Appl. No. 11/448,224—Part 6.
Request for Ex Parte Reexamination dated Jun. 30, 2023 on U.S. Appl. No. 11/448,224—Part 7.
Request for Ex Parte Reexamination dated Jun. 30, 2023 on U.S. Appl. No. 11/448,224—Part 8.
Request for Ex Parte Reexamination dated Jun. 30, 2023 on U.S. Appl. No. 11/448,224—Part 9.
Request for Ex Parte Reexamination dated Jun. 30, 2023 on U.S. Appl. No. 11/448,224—Part 10.
Request for Ex Parte Reexamination dated Jun. 30, 2023 on U.S. Appl. No. 11/448,224—Part 11.
Request for Ex Parte Reexamination dated Jun. 30, 2023 on U.S. Appl. No. 11/448,224—Part 12.
Request for Ex Parte Reexamination dated Jun. 30, 2023 on U.S. Appl. No. 11/448,224—Part 13.
Request for Ex Parte Reexamination dated Jun. 30, 2023 on U.S. Appl. No. 11/448,224—Part 14.
Request for Ex Parte Reexamination dated Jun. 30, 2023 on U.S. Appl. No. 11/448,224—Part 15.
Request for Ex Parte Reexamination dated Jun. 30, 2023 on U.S. Appl. No. 11/448,224—Part 16.
Request for Ex Parte Reexamination dated Jun. 30, 2023 on U.S. Appl. No. 11/448,224—Part 17.
Request for Ex Parte Reexamination dated Jun. 30, 2023 on U.S. Appl. No. 11/448,224—Part 18.
Request for Ex Parte Reexamination dated Jun. 30, 2023 on U.S. Appl. No. 11/448,224—Part 19.
Request for Ex Parte Reexamination dated Jun. 30, 2023 on U.S. Appl. No. 11/448,224—Part 20.
SDIA15-InitialInvalidityContentionsExAA-Carrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAB-TruxorAndCarrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAC-TruxorAndCarrierAndNuhnReferencOrManureManager (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAD-SenwaTecAndYoon (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAE-SenwaTecAndYoonAndNuhnReferencOrManureManager (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAF-PuckAndBryham (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAG-PuckAndBryhamAndNuhnReferencOrManureManager (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAH-CheramieAndYoonOrCarrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAI-Carrier1-1AndNuhnReferencOrManureManager (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAJ-ReexamRequestOnU.S. Appl. No. 10/975,557-Part1 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAJ-ReexamRequestOnU.S. Appl. No. 10/975,557-Part2 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAJ-ReexamRequestOnU.S. Pat. No. 10,975,557-Part3 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAK-PuckAndBryhamAndBennett11 (United States District Court for the Southern District of Iowa Eastern Division. N*Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAL-BradleyAndBryham (United States District Court for the Southern District of Iowa Eastern Division. N*Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExAM-BradleyAndBryhamAndBennett11 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBB-CheramieAndYoonOrCarrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBC-Carrier1-1AndNuhnReferencOrManureManager (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBD-YoonAndSenwaTecOrTruxor (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBE-ReexamRequestOnU.S. Pat. No. 11,358,425-Part1 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBE-ReexamRequestOnU.S. Pat. No. 11,358,425-Part2 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBE-ReexamRequestOnU.S. Pat. No. 11,358,425-Part3 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBE-ReexamRequestOnU.S. Pat. No. 11,358,425-Part4 (United States District Court for the Southern

(56) References Cited

OTHER PUBLICATIONS

District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExCA-Carrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExCB-Lyseng (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExCC-TruxorAndCarrierOrYoon (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExCD-SenwaTecAndYoonOrCarrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExCE-PuckAndBryham (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExCF-CheramieAndYoonOrCarrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExCG-PuckAndSenwaTec (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExCH-PuckAndBryhamAndBennett-II (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDA-BennettII (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDB-TruxorAndCarrierOrYoon (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDC-SenwaTecAndYoonOrCarrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDD-CheramieAndYoonOrCarrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDE-PuckAndBryham (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDF-Lyseng (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDG-Grounds2-7And12-14andNuhnReferenceOrManureManager (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDH-Grounds2-7And12-14AndFisher Pump (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDI-PuckAndBryhamAndBennett II (United States District Court for the Southern District of Iowa Eastern Division.*Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDJ-BradleyAndBryham (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExDK-BradleyAndBryhamAndBennettII (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part1 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part2 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part3 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part4 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part5 (United States District Court for the Southern District of Iowa Eastern Division.*Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part6 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part7 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part8 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part9 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part10 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part11 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.
SDIA15-InitialInvalidityContentionsExBA-InterPartesReviewPetitionOnU.S. Pat. No. 11,358,425-Part12 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

(56) References Cited

OTHER PUBLICATIONS

SDIA15-InitialInvalidityContentionsExBA-InterPartesReviewPetitionOnU.S. Pat. No. 11,358,425-Part13 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part14a (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part14b (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part14c (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part15a (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part15b (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part15c (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part16 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part17 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part18 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part19 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part20 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part21 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part22 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part23 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsExBA-InterPartesReviewPetitionOnU.S. Pat. No. 11,358,425-Part24 (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentions (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx1-Carrier (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx2-CarrierII (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx3-Yoon (United States District Court for the Southern District of Iowa Eastern Division. *Nuhn Industries, Ltd.* v. *Bazooka-Farmstar, LLC.* Case No. 3:22- cv-00015-SMR-HCA.) Aug. 29, 2023.

SDIA15-InitialInvalidityContentionsEx4-YoonTranslation (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx5-Puck (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx6-Bryham (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx7-Bennett (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx8-Bennett-II (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx9-Cheramie (United States District Court for the Southern District of Iowa Eastern Division. N*Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx10-Truxor09-ENG (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx11-SenwaTec (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentionsEx12-Lyseng (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentions-Ex13-NuhnReference (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

SDIA15-InitialInvalidityContentions-Ex14- DeclarationLonnemann (United States District Court for the Southern District of Iowa Eastern Division. *Nuhn Industries, Ltd.* v. *Bazooka-Farmstar, LLC.* Case No. 3:22-cv-00015-SMR-HCA.) Aug. 29, 2023.

(56) References Cited

OTHER PUBLICATIONS

SDIA15-InitialInvalidityContentions-Ex15-Melnikov (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex16-MelnikovTranslation (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex17-BerkyNewspaperGerman (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex18-BerkyNewspaperTranslation (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex19-ExhibitB-VideoScreenshots (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex20-FisherPumpBrochure (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex21-ManureManager (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex22-DeclarationArnoldsson-Part1 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex22-DeclarationArnoldsson-Part2 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex22-DeclarationArnoldsson-Part3 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex23-NuhnSales (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex24-BurrowsDeclaration-Part1 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex24-BurrowsDeclaration-Part2 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex24-BurrowsDeclaration-Part3 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex24-BurrowsDeclaration-Part4 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex24-BurrowsDeclaration-Part5 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex24-BurrowsDeclaration-Part6 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex24-BurrowsDeclaration-Part7 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex24-BurrowsDeclaration-Part8 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex25-Gaither (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex26-Bradley (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex27 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex28 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
SDIA15-InitialInvalidityContentions-Ex29 (United States District Court for the Southern District of Iowa Eastern Division. *Nuhn Industries, Ltd. v. Bazooka-Farmstar, LLC.* Case No. 3:22-cv-00015-SMR-HCA.) Aug. 29, 2023.
EX1009—Truxor-ArchiveOrgAffidavit. Truxor DM 5000 brochure. Dec. 12, 2022.
EX1006—Truxor09-ENG. Truxor Amphibian tool carrier brochure. Aug. 18, 2010.
EX1028-ExhibitB-VideoScreenshots-AmphiKing. May 3, 2012.
EX1012-SenwaTec1. Senwatec Amphi-King brochure. Aug. 19, 2013.
EX1042—Pfost D et al. Beef Manure Management Systems in Missouri. Published by MU Extension, University of Missouri-Columbia. Published in 2000.
EX1048—Bowman DD, et al. Manure Pathogens: Real Issued and Real Risks. Jan. 2000.
EX1058—Fulhage CD. Solids Removal From Livestock Manure Lagoons. Published by MU Extension, University of Missouri-Columbia. Nov. 1994.
Affidavit of Nathaniel E Frank-White, dated Jul. 18, 2023, and Exhibit A, 12 pages.
MANURE Manager, "Big Foot, Specially rigged trucks help applicator," 2011 Buyers Guide, Nov./Dec. 2010, 41 pages.
MANURE Manager, "Creative manure management, Couser Cattle Company demonstrates ingenuity," Jan./Feb. 2011, 6 pages.
MANURE Manager, "Manure Turnover: Nebraska dairy develops composting enterprise," Jul./Aug. 2011, 6 pages.
MANURE Manager, "Dane County community digester, Wisconsin hopes for cleaner lakes with Cow Power investments," Sep./Oct. 2011, 6 pages.
Detailed request for Ex Parte Patent Reexamination dated Sep. 25, 2023.
Request for Reexamination of U.S. Pat. No. 10,974,557. 2022.
Declaration of Eric Winkel, Dated Oct. 20, 2023.
Excerpts of Reexamination History of U.S. Pat. No. 10,974,557.
Excerpts of Prosecution History of U.S. Pat. No. 10,974,557. 2022.
SenwaTec-Schroer Umwelt-& Gewassertechnologie Gmbh & Co. KG, Light Amphibious BoatNehicle "Amphi-King®" SWT -- AB380 (SenwaTec). Undated.
Nuhn Reference and Declaration of Nathaniel E Frank-White, Dated Jul. 18, 2023 (Nuhn Reference).
English Translation of Yoon (EX1014) and Declaration of Taylor Liff, Dated Jun. 7, 2023.
Declaration of Jan David Arnoldsson, Dated Mar. 26, 2023.
Declaration of Reidar Olofsson, Dated Feb. 27, 2023.
Declaration of Nathaniel E Frank-White, Dated Dec. 12, 2022.
Declaration of Ansgar Lonnemann, Dated Jun. 15, 2023.
Dorotea Mekaniska AB, Truxor Amphibian Tool Carrier (2013) (Truxor-II).

(56) References Cited

OTHER PUBLICATIONS

Dorotea Mekaniska AB, Truxor Amphibian Tool Carrier (2013) (Truxor-III).
Dorotea Mekaniska AB, Truxor Amphibian Tool Carrier (Truxor-IV). Undated.
English Translation of Melnikov (EX1024) and Declaration of Samuel Goldfarb, Dated Jun. 7, 2023.
Johanna Kaschik, Der Frosch als Vorbild, HNA (Aug. 25, 2011), https://www.hna.de/lokales/rotenburg-bebra/frosch-vorbild-1376974.html.
English Translation of Der Frosch als Vorbild (EX1027) and Declaration of Beverly Santamaria, Dated Jun. 8, 2023.
Screenshots from UD Umwelt-Dienste GmbH Amphi-King Manure Pumping Video. Undated,.
U.S. Provisional U.S. Appl. No. 61/805,133 (The '133 Provisional). 2013.
Manure Manager Publication, Dated Nov./Dec. 2010.
Ne. Reg'l Agric. Eng'g Serv., Liquid Manure Application Systems Design Manual (1998).
Donald L. Pfost & Charles D. Fulhage, U. Mo. Extension, Land Application Equipment for Livestock and Poultry Manure Management (2001).
Donald L. Pfost & Charles D. Fulhage, U. Mo. Extension, Beef Manure Management Systems in Missouri (2000).
William F. Wright, Dairy Manure Particle Size Distribution, Properties, and Implications for Manure Handling and Treatment, in 2005 ASAE Ann. Int'l Meeting (2005).
Effects of Liquid Viscosity on Rotodynamic (Centrifugal and Vertical) Pump Performance (Am. Nat'l Standards Inst. 2010).
Ole Thygesen et al., Indicators of Physical Properties and Plant Nutrient Content of Animal Slurry and Separated Slurry, 5(3) Biological Eng'g Transactions 123 (2012).
Randy L. Beaver, William E. Field, Summary of Documented Fatalities in Livestock Manure Storage and handling Facilities-1975-2004, 12 J. Agromedicine 3 (2007).
Robbin Marks, Nat'l Res. Def. Council and the Clean Water Network, Cesspools of Shame (2001).
Dwight D. Bowman & Jeffrey C. Burnham, Manure Pathogens: Real Issues and Real Risks, in Proceedings of the Water Env't Fed'n 694 (2000).
U.S. Ctr. for Disease Control, Fatalities Attributed to Entering Manure Waste Pits—Minnesota, 1992, 42 Morbidity & Mortality Wkly Rep. 325 (1993).
U.S. Ctr. for Disease Control, Nat. Inst. for Occupational Safety and Health, of Farm Workers in Manure Pits, Publ. No. 90-103 (1990).
U.S. Gov't Accountability Off., GAO-05-96, Workplace Safety and Health: Safety in the Meat and Poultry Industry, while Improving Could Be Further Strengthened (2005).
Siduo Zhang, Nat'l Collaborating Ctr. For Env't Health, Air Quality and Community Health Impact of Animal Manure Management (2011).
Manure Storage Safety Asae EP470 Jan. 1992 (Am. Soc'y of Agric. And Biological Eng'gs 2005).
MidWest Plan Serv., Livestock Waste Facilities Handbook (3d ed. 1993).
C.A. Loto & AP.I Popoola, Environmental Surface Degradation of Galvanised and Mild Steels in Cattle and Poultry Wastes and Urea Solution, 6(13) Int'l J. Phys. Sci. 3074-81 (2011).
L.M. Safley, Jr. & P.W. Westerman, Corrosion of Galvanized Steel in Animal Waste Environments, 40 Bioresource Tech. 53 (1992).
Frank Yeaple, Fluid Power Design Handbook (3d ed. 1995).
Charles D. Fulhage, Solids Removal from Livestock Manure Lagoons, U. Mo. Extension (Nov. 1995), https://extension.missouri.edu/publications/wq324.
Ed Odgers et al., Manure Gas Safety: Review of Practices and Recommendations for Wisconsin Livestock Farms (2008).
U.S. Dep't Agric., Agricultural Waste Characteristics, in Agricultural WasteHandbook ch. 4 (2008).
U.S. Dep't Agric., Agricultural Waste Management System Component Design, in Agricultural Waste Management Field Handbook ch. 10 (2009).
U.S. Dep't Agric., Waste Utilization, in Agricultural Waste Management Field Handbook ch. 11 (2013).
U.S. Dep't Agric., Waste Utilization, in Agricultural Waste Management Field Handbook ch. 11 (1996).
U.S. Dep't Agric., Waste Management Equipment, in Agricultural Waste Management Field Handbook ch. 12 (2011).
U.S. Dep't Agric., Operation, Maintenance, and Safety, in Agricultural Waste Management Field Handbook ch. 13 (2011).
BoatBuilder's Handbook (U.S. Coast Guard Revised. Nov. 2003).
Detailed request for Ex Parte Patent Reexamination dated Oct. 23, 2023.
Declaration of Eric Winkel, dated Nov. 13, 2023.
Order Granting Request for Ex Parte Reexamination of U.S. Pat. No. 10,974,557.
Detailed request for Ex Parte Patent Reexamination dated Nov. 13, 2023.
Declaration of Eric Winkel, Dated Nov. 3, 2023.
Dorotea Mekaniska Ab, Truxor Amphibian Tool Carrier (Truxor) allegedly publicly available as of 2009.
Manure Manager, Jan./Feb. 2011 (Manure-Manager).
Manure Manager, Jul./ Aug. 2011 (Manure-Manager-II).
Fisher Pumps, Inc., Fisher Pumps allegedly publicly available as of 2009.
Russian Patent Application No. 2012137830/11 (Melnikov); English Translation ofMelnikov (EX1024) and Declaration, of Samuel Goldfarb, Dated Jun. 7, 2023.
Declaration of Eric Winkel, Dated Oct. 13, 2023.
Petition for Inter Partes Review of U.S. Pat. No. 11,491,835 dated Oct. 13, 2023.
Petition for Inter Partes Review of U.S. Pat. No. 11,541,708 dated Nov. 3, 2023.
Declaration of Jan David Arnoldson, CEO of Truxor Wetland Equipment AB, executed Mar. 26, 2023, making allegations regarding alleged prior art related to Truxor cited in Exhibits A, B, C, D, E, F, G, H, I, J, and K thereto (EX1007 to IPR2023-01161, IPR2024-00004, and IPR2024-00098).
Declaration of Reidar Olofsson, Mechanical Engineer of Truxor Wetland Equipment AB, executed Feb. 27, 2023, making allegations regarding alleged prior art related to Truxor cited in Exhibits A, B, C, D, E, F, G, H, I, J, and K thereto (EX1008 to IPR2023-01161, IPR2024-00004, and IPR2024-00098).
Affidavit of Nathaniel E Frank-White, a Records Request Processor at the Internet Archive, executed Dec. 12, 2022, regarding Truxor website printouts (within Exhibit A to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Truxor website—broschyrer, https://web.archive.org/web/20100217101718/http://www.doroteamekaniska.se/broschyrer.html, Wayback Machine printout from Feb. 17, 2010 (Exhibit A to Affidavit of Nathaniel E Frank-White, a Records Request Processor at the Internet Archive, executed Dec. 12, 2022, within Exhibit A to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Truxor website—index, https://web.archive.org/web/20100216060230/http://www.doroteamekaniska.se/index.html, Wayback Machine printout from Feb. 16, 2010 (Exhibit A to Affidavit of Nathaniel E Frank-White, a Records Request Processor at the Internet Archive, executed Dec. 12, 2022, within Exhibit A to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Truxor 2009 ENG.pdf, Truxor website, https://web.archive.org/web/20100818031508if_/http://www.doroteamekaniska.se/pdf/truxor%2009%20ENG.pdf, Wayback Machine printout from Aug. 18, 2010 (Exhibit B to Affidavit of Nathaniel E Frank-White, a Records Request Processor at the Internet Archive, executed Dec. 12, 2022, within Exhibit A to Arnoldsson Declaration (EX1007 to IPR2023-

(56) References Cited

OTHER PUBLICATIONS

01161, IPR2024-00004, and IPR2024-00098) and Olofsson Declaration (EX1008 to IPR2023-01161, IPR2024-00004, and IPR2024-00098)).
Printout of Google Search on Jan. 31, 2023 of "Dorotea Mekaniska" date restricted to before Aug. 19, 2013 and before Aug. 18, 2010 (Exhibit B to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Voice of Pomerania, They showed a robot for cleaning ponds and lakes (photos, video), Apr. 21, 2012, https://gp24.pVpokazali-robota-do-czyszczenia-stawow-ijezior-zdjecia-wideo/ar/4773731 (Exhibit C to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Truxor Amphibian Tool Carrier Brochure, allegedly available for download at least as early as Aug. 18, 2010 (Exhibit D to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098); EX1006 to IPR2023-01161, IPR2024-00004, and IPR2024-00098).
Truxor 2013 US inch FloridAquatic, John Farell, allegedly created on Apr. 26, 2013 (Exhibit E to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098); EX1021 to IPR2023-01161; EX1020 to IPR2024-00004; and EX1024 to IPR2024-00098).
Truxor 2013 US inch Hockney, allegedly created on Apr. 26, 2013 (Exhibit F to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098); EX1022 to IPR2023-01161; EX1021 to IPR2024-00004; and EX1025 to IPR2024-00098).
Truxor 2012 ENG, allegedly available at http://www.aquaclearwatermanagement.corn/docs/truxor _ 2012 _ ENG.pdf, allegedly indexed and searchable by a commercial internet search engine prior to Aug. 19, 2013 (Exhibit G to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098); EX1023 to IPR2023-01161; EX1022 to IPR2024-00004; and EX1026 to IPR2024-00098).
Truxor's Doro Pump Instruction Manual, allegedly created on Jan. 27, 2013 (Exhibit H to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Truxor's Doro Pump Assembly Diagram, allegedly created Sep. 21, 2010 (Exhibit I to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Printout of Google Search on Jan. 31, 2023 of "amphibious AND machine AND pump" date restricted to before Aug. 19, 2013 (Exhibit J to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Engineering drawing and parts list of LJ1003 slurry pump, allegedly dated Jan. 3, 2006 (Exhibit J to Arnoldsson Declaration (EX1007 to IPR2023-01161, IPR2024-00004, and IPR2024-00098) and Olofsson Declaration (EX1008 to IPR2023-01161, IPR2024-00004, and IPR2024-00098)).
Bazooka Farmstar, LLC's Request for Ex Parte Reexamination of U.S. Appl. No. 90/019,224, Reexam No. U.S. Appl. No. 90/019,224, dated Jun. 30, 2023.
Husky Farm Equipment Limited, Husky Liquid Manure H 5000 Pump Parts Manual, allegedly printed Apr. 28, 1982 (Exhibit 5 to Request for Ex Parte Reexamination dated Jun. 30, 2023 on U.S. Appl. No. 90/019,224, Reexam No. U.S. Appl. No. 90/019,224).
Husky Farm Equipment Limited, Husky Marketing Brochure, allegedly printed Oct. 1985 (Exhibit 8 to Request for Ex Parte Reexamination dated Jun. 30, 2023 on U.S. Appl. No. 90/019,224, Reexam No. U.S. Appl. No. 90/019,224).
Husky Farm Equipment Limited, Husky Liquid Manure Pump H5000/H6000 Operator's Manual, Apr. 1995 (Exhibit 7 to Request for Ex Parte Reexamination dated Jun. 30, 2023 on U.S. Appl. No. 90/019,224, Reexam No. U.S. Appl. No. 90/019,224).
Declaration of Walter S. Grose, President of Husky Farm Equipment Ltd., executed Jun. 2, 2023: (1) alleging prior sales of Husky Liquid Manure H5000 Pumps; and (2) alleging dates for: (i) Husky Liquid Manure H5000 Pump Parts Manual (Exhibit 5 to Request for Ex Parte Reexamination dated Jun. 30, 2023 on U.S. Appl. No. 90/019,224, Reexam No. 90/019,224), (ii) Husky Marketing Brochure (Exhibit 8 to Request for Ex Parte Reexamination dated Jun. 30, 2023 on U.S. Appl. No. 90/019,224, Reexam No. U.S. Appl. No. 90/019,224), and (iii) Husky Liquid Manure Pump H5000/H6000 Operator's Manual (Exhibit 7 to Request for Ex Parte Reexamination dated Jun. 30, 2023 on U.S. Appl. No. 90/019,224, Reexam No. U.S. Appl. No. 90/019,224)—(Exhibit 23 to Request for Ex Parte Reexamination dated Jun. 30, 2023 on U.S. Appl. No. 90/019,224, Reexam No. 90/019,224).
Nuhn, Nuhn Dual Port Header Series Pump Brochure, allegedly publicly distributed before Mar. 2010 (Exhibit 6 to Request for Ex Parte Reexamination dated Jun. 30, 2023 on U.S. Appl. No. 90/019,224, Reexam No. U.S. Appl. No. 90/019,224).
Declaration of Morgan Henderson, executed Nov. 21, 2022: (1) allegeing prior manufacture, advertisement, and sales of Nuhn Dual Port Header Series Pump; and (2) alleging date of alleged Nuhn Dual Port Header Series Pump Brochure (Exhibit 6 to Request for Ex Parte Reexamination dated Jun. 30, 2023 on U.S. Appl. No. 90/019,224, Reexam No. U.S. Appl. No. 90/019,224) - (Exhibit 22 to Request for Ex Parte Reexamination dated Jun. 30, 2023 on U.S. Appl. No. 90/019,224, Reexam No. U.S. Appl. No. 90/019,224).
J. Houle & Files, Inc., Super Pump, Wayback Machine printout from May 29, 2006 (Exhibit 9 to Request for Ex Parte Reexamination dated Jun. 30, 2023 on U.S. Appl. No. 90/019,224, Reexam No. U.S. Appl. No. 90/019,224).
Affidavit of Nathaniel E Frank-White, a Records Request Processor at the Internet Archive, executed Jun. 19, 2023, in support of J. Houle & Files, Inc., Super Pump, Wayback Machine printout from May 29, 2006 (Exhibit 9 to Request for Ex Parte Reexamination dated Jun. 30, 2023 on U.S. Appl. No. 90/019,224, Reexam No. U.S. Appl. No. 90/019,224) - (Exhibit 24 to Request for Ex Parte Reexamination dated Jun. 30, 2023 on U.S. Appl. No. 90/019,224, Reexam No. U.S. Appl. No. 90/019,224).
Fisher Pumps, Fisher Pumps Owners Manual, Sep. 1, 07 (Exhibit 10 to Request for Ex Parte Reexamination dated Jun. 30, 2023 on U.S. Appl. No. 90/019,224, Reexam No. U.S. Appl. No. 90/019,224).
Fisher Pumps, Fisher Pumps Advertisement, allegedly published prior to 2000 (Exhibit 11 to Request for Ex Parte Reexamination dated Jun. 30, 2023 on U.S. Appl. No. 90/019,224, Reexam No. U.S. Appl. No. 90/019,224).
Fisher Pumps, Fisher Pumps Brochure, allegedly provided to customers and potential customers in the US and Canada before Mar. 2010 (Exhibit 12 to Request for Ex Parte Reexamination dated Jun. 30, 2023 on U.S. Appl. No. 90/019,224, Reexam No. U.S. Appl. No. 90/019,224).
Declaration of Royal Burows, owner of Burrows Enterprises, LLC, executed Jun. 21, 2023: (1) allegeing prior public use, offer for sale, and sale of Fisher Vertical Set Belt Drive Pump, Fisher Vertical Set Direct Drive Pump, and Portable Hydraulic Driven Pumps; (2) describing Fisher Pumps advertisements in Manure Manager, Sep./Oct. 2009 (Exhibit 13 to Request for Ex Parte Reexamination dated Jun. 30, 2023 on U.S. Pat. No. 11,448,224, Reexam No. 90/019,224) and Manure Manager, Jan./Feb. 2010 (Exhibit 14 to Request for Ex Parte Reexamination dated Jun. 30, 2023 on U.S. Appl. No. 90/019,224, Reexam No. U.S. Appl. No. 90/019,224); and (3) alleging dates for: (i) Fisher Pumps Advertisement (Exhibit 11 to Request for Ex Parte Reexamination dated Jun. 30, 2023 on U.S. Appl. No. 90/019,224, Reexam No. U.S. Appl. No. 90/019,224), (ii) Fisher Pumps Brochure (Exhibit 12 to Request for Ex Parte Reexamination dated Jun. 30, 2023 on U.S. Pat. No. 11/448,224, Reexam No. 90/019,224),

(56) References Cited

OTHER PUBLICATIONS and (iii) Fisher Pumps Owners Manual (Exhibit 10 to Request for Ex Parte Reexamination dated Jun. 30, 2023 on U.S. Pat. No. 11,448,224, Reexam No. U.S. Appl. No. 90/019,224)—(Exhibit 25 to Request for Ex Parte Reexamination dated Jun. 30, 2023 on U.S. Pat. No. 11,448,224, Reexam No. 90/019,224).
Annex Publishing & Printing Inc., Manure Manager, September/Oct. 2009 (Exhibit 13 to Request for Ex Parte Reexamination dated Jun. 30, 2023 on U.S. Appl. No. 90/019,224, Reexam No. U.S. Appl. No. 90/019,224).
Annex Publishing & Printing Inc., Manure Manager, Jan./Feb. 2010 (Exhibit 14 to Request for Ex Parte Reexamination dated Jun. 30, 2023 on U.S. Pat. No. 11,448,224, Reexam No. 90/019,224).
Ground 1—Claim Chart—Husky Dual Outlet Parts Manual (Exhibit 16 to Request for Ex Parte Reexamination dated Jun. 30, 2023 on U.S. Pat. No. 11,448,224, Reexam No. 90/019,224).
Ground 2—Claim Chart—Nuhn Pump Brochure (Exhibit 17 to Request for Ex Parte Reexamination dated Jun. 30, 2023 on U.S. Appl. No. 90/019,224, Reexam No. 90/019,224).
Ground 3A—Claim Chart—Husky Single Outlet in view of Fisher Brochure (Exhibit 18 to Request for Ex Parte Reexamination dated Jun. 30, 2023 on U.S. Appl. No. 90/019,224, Reexam No. U.S. Appl. No. 90/019,224).
Ground 3B—Claim Chart—GEA Houle in view of Fisher Brochure (Exhibit 19 to Request for Ex Parte Reexamination dated Jun. 30, 2023 on U.S. Appl. No. 90/019,224, Reexam No. U.S. Appl. No. 90/019,224).
Ground 4A—Claim Chart—Husky Single Outlet in view of Haentjens (Exhibit 20 to Request for Ex Parte Reexamination dated Jun. 30, 2023 on U.S. Appl. No. 90/019,224, Reexam No. U.S. Appl. No. 90/019,224).
Ground 4B—Claim Chart—GEA Houle in view of Haentjens (Exhibit 21 to Request for Ex Parte Reexamination dated Jun. 30, 2023 on U.S. Appl. No. 90/019,224, Reexam No. U.S. Appl. No. 90/019,224).
Printouts from Nuhn.ca/about/history/, Jun. 5, 2023 (Exhibit 26 to Request for Ex Parte Reexamination dated Jun. 30, 2023 on U.S. Appl. No. 90/019,224, Reexam No. U.S. Appl. No. 90/019,224).
Order Granting Request for Ex Parte Reexamination of U.S. Pat. No. 11,448,224, Reexam No. 90/019,224, Aug. 1, 2023.
Hydro Engineering Agitation-Pontoons Brochure (2013).
Annex Publishing & Printing Inc., Manure Manager, Jul./Aug. 2011.
Annex Publishing & Printing Inc., Manure Manager, Nov./Dec. 2010.
Annex Publishing & Printing Inc., Manure Manager, Jan./Feb. 2011.
Annex Publishing & Printing Inc., Manure Manager, Jan./Feb. 2012.
Annex Publishing & Printing Inc., Manure Manager, Jul./Aug. 2013.
Bazooka Farmstar, LLC's Request for Ex Parte Reexamination of U.S. Pat. No. 10,957,557, Reexam No. U.S. Appl. No. 90/019,076, dated May 6, 2022 (including claim charts in Exhibits G-J).
Order Granting Request for Ex Parte Reexamination of U.S. Pat. No. 11,957,557, filed May 26, 2022, Reexam No. 90/019,076, filed May 26, 2022.
Non-Final Office Action in Ex Parte Reexamination of U.S. Pat. No. 10,974,557, Reexam No. 90019076, Aug. 12, 2022.
Response to Non-Final Office Action in Ex Parte Reexamination of U.S. Appl. No. 10/974,557, Reexam No. 90/019,076, Sep. 2, 2022.
Final Office Action in Ex Parte Reexamination of U.S. Appl. No. 10/974,557, Reexam No. 90/019,076, Oct. 21, 2022.
Response to Final Office Action in Ex Parte Reexamination of U.S. Appl. No. 10/974,557, Reexam No. 90/019,076, Oct. 31, 2022.
Notice of Intent to Issue Reexamination Certificate in Ex Parte Reexamination of U.S. Appl. No. 10/974,557, Reexam No. 90019076, Dec. 1, 2022.
Reexamination Certificate of U.S. Appl. No. 10/974,557, Reexam No. 90019076, Dec. 28, 2022.
Bazooka Farmstar, LLC's Request for Ex Parte Reexamination of U.S. Appl. No. 90/019,107, Reexam No. U.S. Appl. No. 90/019,107, dated Aug. 31, 2022 (including claim charts in Exhibits J, K, M-O).
Order Granting Request for Ex Parte Reexamination of U.S. Appl. No. 11/358,425, Reexam No. 90/019,107, Sep. 19, 2022.
Notice of Intent to Issue Reexamination Certificate in Ex Parte Reexamination of U.S. Pat. No. 11/358,425, Reexam No. 90/019,107, Nov. 2, 2022.
Reexamination Certificate of U.S. Pat. No. 11,358,425, Reexam No. 90/019,107, Nov. 16, 2022.
Printout of Sentwatec from https://www.youtube.com/watch?v=ecnlfMf7CH4&t=1s (video posted on Nov. 29, 2016).
WDNY 368—Defendant Atlas Ag Services, LLC's Answer filed in *Nuhn Industries Ltd.* v. *Atlas Ag Services, LLC*, U.S. District Court for the Western District of New York, Case No. Case 1:23-cv-00368-JLS filed Jun. 22, 2023 (ECF 7).
WDNY 368—Wayback Machine Capture for Nuhn.ca, Jun. 5, 2011 (Exhibit A to Defendant Atlas Ag Services, LLC's Answer in *Nuhn Industries Ltd.* v. *Atlas Ag Services, LLC*, U.S. District Court for the Western District of New York, Case No. Case 1:23-cv-00368-JLS filed Jun. 22, 2023 (ECF 7-1), Exhibit 15 (ECF 7-18) is a duplicate of Exhibit A).
WDNY 368—Annex Publishing & Printing Inc., Manure Manager, Jul./Aug. 2011 (Exhibit B to Defendant Atlas Ag Services, LLC's Answer in *Nuhn Industries Ltd.* v. *Atlas Ag Services, LLC*, U.S. District Court for the Western District of New York, Case No. Case 1:23- cv-00368-JLS filed Jun. 22, 2023 (ECF 7-2), Exhibit 16 (ECF 7-19) is a duplicate of Exhibit B).
WDNY 368—Declaration of Morgan Henderson, executed Nov. 21, 2022 (Exhibit C to Defendant Atlas Ag Services, LLC's Answer in *Nuhn Industries Ltd.* v. *Atlas Ag Services, LLC*, U.S. District Court for the Western District of New York, Case No. Case 1:23-cv-00368-JLS filed Jun. 22, 2023 (ECF 7-3), Exhibit 17 (ECF 7-20) is a duplicate of Exhibit C).
WDNY 368—Exhibit 18 (Reply to Office Action in ex Parte Reexamination U.S. Appl. No. 90/019,076 Mailed Aug. 12, 2022) to Defendant Atlas Ag Services, LLC's Answer in *Nuhn Industries Ltd.* v. *Atlas Ag Services, LLC*, U.S. District Court for the Western District of New York, Case No. Case 1:23-cv-00368-JLS filed Jun. 22, 2023 (ECF 7-21).
WDNY 368—Exhibit 19 (Notice of Intent to Issue Reexamination Certificate in ex Parte Reexamination U.S. Appl. No. 90/019,076 Mailed Aug. 12, 2022) to Defendant Atlas Ag Services, LLC's Answer in *Nuhn Industries Ltd.* v. *Atlas Ag Services, LLC*, U.S. District Court for the Western District of New York, Case No. Case 1:23-cv-00368-JLS filed Jun. 22, 2023 (ECF 7-22).
WDNY 368—Plaintiff Nuhn Industries, Ltd.'s Motion to Dismiss filed in *Nuhn Industries Ltd.* v. *Atlas Ag Services, LLC*, U.S. District Court for the Western District of New York, Case No. Case 1:23-cv-00368-JLS filed Jul. 13, 2023 (ECF 16).
WDNY 368—Plaintiff Nuhn Industries, Ltd.'s Memorandum in Support of Motion to Dismiss filed in *Nuhn Industries Ltd.* v. *Atlas Ag Services, LLC*, U.S. District Court for the Western District of New York, Case No. Case 1:23-cv-00368-JLS filed Jul. 13, 2023 (ECF 16-1).
WDNY 368—Defendant Atlas Ag Services, LLC's Response in Opposition to Plaintiff Nuhn Industries, Ltd.'s Motion to Dismiss filed in *Nuhn Industries Ltd.* v. *Atlas Ag Services, LLC*, U.S. District Court for the Western District of New York, Case No. Case 1:23-cv-00368-JLS filed Jun. 22, 2023 (ECF 23).
WDNY 368—Plaintiff Nuhn Industries, Ltd.'s Reply in Support of its Motion to Dismiss filed in *Nuhn Industries Ltd.* v. *Atlas Ag Services, LLC*, U.S. District Court for the Western District of New York, Case No. Case 1:23-cv-00368-JLS filed Sep. 15, 2023 (ECF 25).
SDIA 15—Plaintiff Nuhn Industries, Ltd.'s Response in Opposition to Defendant Bazooka Farmstar, LLC's Motion for Leave to File Amended Answers and Counterclaims in *Nuhn Industries Ltd.* v. *Bazooka Farmstar, LLC*, U.S. District Court for the Southern District of Iowa, Case No. 3:22-cv-00015-SMR-HCA filed Jul. 11, 2023 (ECF 87).
SDIA 15—Defendant Bazooka Farmstar, LLC's Reply in Support of Motion for Leave to File Amended Answers and Counterclaims

(56) References Cited

OTHER PUBLICATIONS in *Nuhn Industries Ltd.* v. *Bazooka Farmstar, LLC*, U.S. District Court for the Southern District of Iowa, Case No. 3:22-cv-00015-SMR-HCA filed Jul. 18, 2023 (ECF 88).
Pfost (2001)—Land Application Equipment for Livestock and Poultry Manure Management (EX1041 to Inter Partes Review Petition against U.S. Pat. No. 11,358,425, IPR2023-01161).
Wright (2005)—Dairy Manure Particle Size Distribution, Properties, and Implications for Manure Handling and Treatment (EX1043 to Inter Partes Review Petition against U.S. Pat. No. 11,358,425, IPR2023-01161).
Nuhn Industries, Ltd.'s Patent Owner Preliminary Response filed on Oct. 10, 2023 in IPR2023-01161 (U.S. Pat. No. 11/358,425).
Declaration of Douglas S. Prarie executed Oct. 10, 2023 in support of Nuhn Industries, Ltd.'s Patent Owner Preliminary Response in IPR2023-01161 (U.S. Pat No. 11,358,425) (EX2004 to IPR2023-01161).
Screenshots from Patent Owner's YouTube Channel of Patented Product, retrieved on Oct. 2, 2023 from https://www.youtube.com/watch?v=fEgvvq9HZkk (EX2006 to IPR2023-01161).
Screenshots from Petitioner's YouTube Channel of Accused Product, retrieved on Oct. 2, 2023 from https://www.youtube.com/watch?v=3y3bSJJUOps (EX2007 to IPR2023-01161).
Screenshots from Progressive Dairyman YouTube Channel of 2014 Manure Lagoon Agitation Boat Demonstration, published on Jul. 9, 14 by Progressive Dairy, retrieved on Oct. 2, 23 from https://www.youtube.com/watch?v=FXRS-9lp1pE (EX2008 to IPR2023-01161).
Daniel L. Pfost et al., Univ. of Mo. Extension, Anaerobic Lagoons for Storage/Treatment of Livestock Manure (Oct. 2000) (EX2019 to IPR2023-01161).
Screenshots from 2023 North American Manure Expo Website, retrieved on Oct. 2, 23 from https://www.manureexpo.ca/ (EX2020 to IPR2023-01161).
Dictionary Definitions of "Dredging" and "Agitation", retrieved on Sep. 30, 23 from https://en.wikipedia.org/wiki/Dredging, https://www.merriamwebster.com/dictionary/dredging#dictionary-entry-1, https://www.merriamwebster.com/dictionary/agitation, and https://www.lagoonpumping.com/articlesresources/agriculture-articles/manure-articles/ (EX2021 to IPR2023-01161).
Envtl. Prot. Agency, Primer for Municipal Wastewater Treatment Systems (Sep. 2004) (EX2022 to IPR2023-01161).
U.S. Dep't Agric., Agricultural Waste Management Systems, in Agricultural Waste Management Field Handbook ch. 9 (Dec. 2011) (EX2023 to IPR2023-01161).
Screenshot of 2023 Commercial Manure Applicator Certification, retrieved on Oct. 3, 23 from https://elearning-dnr.iowa.gov/course/index.php?categoryid=2 (EX2024 to IPR2023-01161).
Joseph Akyeampong et al., Evaluation of hydraulic excavator Human-Machine Interface concepts using Nasa TLX, 44 Int'l J. of Indus. Ergonomics 374, 374-82 (2014) (EX2025 to IPR2023-01161).
Screenshots of 2023 Truxor Website, retrieved on Oct. 1, 23 from https://truxor.com/en/catalog/node/products and https://truxor.com/en/catalog/node/products-truxor-machines (EX2026 to IPR2023-01161).
Screenshots of 2023 Berky (formerly SenwaTec) Website, retrieved on Oct. 4, 23 from https://www.berky.de/en/berky-nereus-240-amphi/ (EX2027 to IPR2023-01161).
Christian Haas et al., Practical Evaluation of a Control Concept for a Remote Controlled 1.8T Excavator Using a 3D Input Device, BATH/ASME 2022 Symposium on Fluid Power and Motion Control, ISBN: 978-0-7918-8633-5, FPMC2022-88959, V001T01A012-1 thru V001T01A012-7 (2022) (EX2028 to IPR2023-01161).
Declaration of Ansgar Lonnemann, sales manager of Berky GmbH, executed Jun. 15 (declaration does not include a year), making allegations regarding alleged prior art related to Senwatec cited in Exhibits A, B, and C thereto (EX1013 to IPR2023-01161, IPR2024-00004, and IPR2024-00098).

Der Frosch als Vorbild, allegedly dated Aug. 25, 2011, https://www.hna.de/lokales/rotenburgbebra/frosch-vorbild-1376974.html (Exhibit A to Lonnemann Declaration (EX1013 to IPR2023-01161, IPR2024-00004, and IPR2024-00098); EX1026 to IPR2023-01161; EX1025 to IPR2024-00004; and EX1029 to IPR2024-00098).
Screenshots of video allegedly created by UD Umweltdienste, allegedly created on or before May 3, 2012 (Exhibit B to Lonnemann Declaration (EX1013 to IPR2023-01161, IPR2024-00004, and IPR2024-00098); EX1028 to IPR2023-01161; EX1027 to IPR2024-00004; and EX1031 to IPR2024-00098).
SenwaTec Amphi-King Brochure, allegedly created at least as early as Nov. 28, 2012 (Exhibit C to Lonnemann Declaration (EX1013 to IPR2023-01161, IPR2024-00004, and IPR2024-00098); EX1012 to IPR2023-01161, IPR2024-00004, and IPR2024-00098).
IPR2023-10161, Decision Granting Institution of Inter Partes Review, Jan. 9, 2024.
"Gequirlter Klarschlamm" (Agitated Sewage Slurry), Main-Spessart-Newsletter, Oct. 15, 2010.
Translation dated Jan. 31, 2024 of Umwelt Dienste Video Screenshots.
Jones DD, et al. Closure of Earthen Manure Structures. University of Nebraska—Lincoln. Aug. 2006.
Custom Applicator Uses Dredge to Pump Lagoons. Farm Show Magazine: 2009, vol. 33, Issue 4, p. 9.
Ex Parte Reexamination 90/019,428 dated Feb. 22, 2024 on U.S. Pat. No. 10,974,557—Detailed Request.
Ex Parte Reexamination 90/019,428 dated Feb. 22, 2024 on U.S. Pat. No. 10,974,557—Exhibit 1002.
Ex Parte Reexamination 90/019,428 dated Feb. 22, 2024 on U.S. Pat. No. 10,974,557—Exhibit 1003.
Ex Parte Reexamination 90/019,428 dated Feb. 22, 2024 on U.S. Pat. No. 10,974,557—Exhibit 1004-PartA.
Ex Parte Reexamination 90/019,428 dated Feb. 22, 2024 on U.S. Pat. No. 10,974,557—Exhibit 1004-PartB.
Ex Parte Reexamination 90/019,428 dated Feb. 22, 2024 on U.S. Pat. No. 10,974,557—Exhibit 1005.
Ex Parte Reexamination 90/019,428 dated Feb. 22, 2024 on U.S. Pat. No. 10,974,557—Exhibit 1006.
Ex Parte Reexamination 90/019,428 dated Feb. 22, 2024 on U.S. Pat. No. 10,974,557—Exhibit 1007.
Ex Parte Reexamination 90/019,428 dated Feb. 22, 2024 on U.S. Pat. No. 10,974,557—Exhibit 1008.
Ex Parte Reexamination 90/019,428 dated Feb. 22, 2024 on U.S. Pat. No. 10,974,557—Exhibit 1009.
Ex Parte Reexamination 90/019,428 dated Feb. 22, 2024 on U.S. Pat. No. 10,974,557—Exhibit 1010.
Ex Parte Reexamination 90/019,428 dated Feb. 22, 2024 on U.S. Pat. No. 10,974,557—Exhibit 1011.
Ex Parte Reexamination 90/019,428 dated Feb. 22, 2024 on U.S. Pat. No. 10,974,557—Exhibit 1012.
Ex Parte Reexamination 90/019,428 dated Feb. 22, 2024 on U.S. Pat. No. 10,974,557—Exhibit 1013.
Ex Parte Reexamination 90/019,428 dated Feb. 22, 2024 on U.S. Pat. No. 10,974,557—Exhibit 1014.
Ex Parte Reexamination 90/019,428 dated Feb. 22, 2024 on U.S. Pat. No. 10,974,557—Exhibit 1015.
Ex Parte Reexamination 90/019,428 dated Feb. 22, 2024 on U.S. Pat. No. 10,974,557—Exhibit 1016.
Ex Parte Reexamination 90/019,428 dated Feb. 22, 2024 on U.S. Pat. No. 10,974,557—Exhibit 1017-PartA.
Ex Parte Reexamination 90/019,428 dated Feb. 22, 2024 on U.S. Pat. No. 10,974,557—Exhibit 1017-PartB.
Ex Parte Reexamination 90/019,428 dated Feb. 22, 2024 on U.S. Pat. No. 10,974,557—Exhibit 1017-PartC.
Ex Parte Reexamination 90/019,428 dated Feb. 22, 2024 on U.S. Pat. No. 10,974,557—Exhibit 1018-PartA.
Ex Parte Reexamination 90/019,428 dated Feb. 22, 2024 on U.S. Pat. No. 10,974,557—Exhibit 1018-PartB.
Ex Parte Reexamination 90/019,428 dated Feb. 22, 2024 on U.S. Pat. No. 10,974,557—Exhibit 1018-PartC.
Ex Parte Reexamination 90/019,428 dated Feb. 22, 2024 on U.S. Pat. No. 10,974,557—Exhibit 1019.
Ex Parte Reexamination 90/019,428 dated Feb. 22, 2024 on U.S. Pat. No. 10,974,557—Exhibit 1020.

(56) References Cited

OTHER PUBLICATIONS

Ex Parte Reexamination 90/019,428 dated Feb. 22, 2024 on U.S. Pat. No. 10,974,557—Exhibit 1021.
Ex Parte Reexamination 90/019,428 dated Feb. 22, 2024 on U.S. Pat. No. 10,974,557—Exhibit 1022.
Ex Parte Reexamination 90/019,428 dated Feb. 22, 2024 on U.S. Pat. No. 10,974,557—Exhibit 1023.
Ex Parte Reexamination 90/019,428 dated Feb. 22, 2024 on U.S. Pat. No. 10,974,557—Exhibit 1024.
Ex Parte Reexamination 90/019,428 dated Feb. 22, 2024 on U.S. Pat. No. 10,974,557—Exhibit 1025.
Ex Parte Reexamination 90/019,428 dated Feb. 22, 2024 on U.S. Pat. No. 10,974,557—Exhibit 1026.
Ex Parte Reexamination 90/019,428 dated Feb. 22, 2024 on U.S. Pat. No. 10,974,557—Exhibit 1027.
Ex Parte Reexamination 90/019,428 dated Feb. 22, 2024 on U.S. Pat. No. 10,974,557—Exhibit 1028.
Ex Parte Reexamination 90/019,428 dated Feb. 22, 2024 on U.S. Pat. No. 10,974,557—Exhibit 1029.
Ex Parte Reexamination 90/019,428 dated Feb. 22, 2024 on U.S. Pat. No. 10,974,557—Exhibit 1030.
Ex Parte Reexamination 90/019,428 dated Feb. 22, 2024 on U.S. Pat. No. 10,974,557—Exhibit 1031.
Ex Parte Reexamination 90/019,428 dated Feb. 22, 2024 on U.S. Pat. No. 10,974,557—Exhibit 1032.
Ex Parte Reexamination 90/019,428 dated Feb. 22, 2024 on U.S. Pat. No. 10,974,557—Exhibit 1033-PartA.
Ex Parte Reexamination 90/019,428 dated Feb. 22, 2024 on U.S. Pat. No. 10,974,557—Exhibit 1033-PartB.
Ex Parte Reexamination 90/019,428 dated Feb. 22, 2024 on U.S. Pat. No. 10,974,557—Exhibit 1033-PartC.
Ex Parte Reexamination 90/019,428 dated Feb. 22, 2024 on U.S. Pat. No. 10,974,557—Exhibit 1033-PartD.
Ex Parte Reexamination 90/019,428 dated Feb. 22, 2024 on U.S. Pat. No. 10,974,557—Exhibit 1034.
Ex Parte Reexamination 90/019,428 dated Feb. 22, 2024 on U.S. Pat. No. 10,974,557—Exhibit 1035.
Ex Parte Reexamination 90/019,428 dated Feb. 22, 2024 on U.S. Pat. No. 10,974,557—Exhibit 1036.
Ex Parte Reexamination 90/019,428 dated Feb. 22, 2024 on U.S. Pat. No. 10,974,557—Exhibit 1037.
Ex Parte Reexamination 90/019,428 dated Feb. 22, 2024 on U.S. Pat. No. 10,974,557—Exhibit 1038.
Ex Parte Reexamination 90/019,428 dated Feb. 22, 2024 on U.S. Pat. No. 10,974,557—Exhibit 1039.
Ex Parte Reexamination 90/019,428 dated Feb. 22, 2024 on U.S. Pat. No. 10,974,557—Exhibit 1040.
Ex Parte Reexamination 90/019,428 dated Feb. 22, 2024 on U.S. Pat. No. 10,974,557—Exhibit 1041.
Ex Parte Reexamination 90/019,428 dated Feb. 22, 2024 on U.S. Pat. No. 10,974,557—Exhibit 1042.
Ex Parte Reexamination 90/019,428 dated Feb. 22, 2024 on U.S. Pat. No. 10,974,557—Exhibit 1043.
Ex Parte Reexamination 90/019,428 dated Feb. 22, 2024 on U.S. Pat. No. 10,974,557—Exhibit 1044.
Ex Parte Reexamination 90/019,428 dated Feb. 22, 2024 on U.S. Pat. No. 10,974,557—Exhibit 1045.
Ex Parte Reexamination 90/019,428 dated Feb. 22, 2024 on U.S. Pat. No. 10,974,557—Exhibit 1046.
Ex Parte Reexamination 90/019,428 dated Feb. 22, 2024 on U.S. Pat. No. 10,974,557—Exhibit 1047-PartA.
Ex Parte Reexamination 90/019,428 dated Feb. 22, 2024 on U.S. Pat. No. 10,974,557—Exhibit 1047-PartB.
Ex Parte Reexamination 90/019,428 dated Feb. 22, 2024 on U.S. Pat. No. 10,974,557—Exhibit 1048.
Ex Parte Reexamination 90/019,428 dated Feb. 22, 2024 on U.S. Pat. No. 10,974,557—Exhibit 1049.
Ex Parte Reexamination 90/019,428 dated Feb. 22, 2024 on U.S. Pat. No. 10,974,557—Exhibit 1050.
Ex Parte Reexamination 90/019,428 dated Feb. 22, 2024 on U.S. Pat. No. 10,974,557—Exhibit 1051.
Ex Parte Reexamination 90/019,428 dated Feb. 22, 2024 on U.S. Pat. No. 10,974,557—Exhibit 1052.
Ex Parte Reexamination 90/019,428 dated Feb. 22, 2024 on U.S. Pat. No. 10,974,557—Exhibit 1053.
Ex Parte Reexamination 90/019,428 dated Feb. 22, 2024 on U.S. Pat. No. 10,974,557—Exhibit 1054.
Ex Parte Reexamination 90/019,428 dated Feb. 22, 2024 on U.S. Pat. No. 10,974,557—Exhibit 1055.
Ex Parte Reexamination 90/019,428 dated Feb. 22, 2024 on U.S. Pat. No. 10,974,557—Exhibit 1056-PartA.
Ex Parte Reexamination 90/019,428 dated Feb. 22, 2024 on U.S. Pat. No. 10,974,557—Exhibit 1056-PartB.
Ex Parte Reexamination 90/019,428 dated Feb. 22, 2024 on U.S. Pat. No. 10,974,557—Exhibit 1056-PartC.
Ex Parte Reexamination 90/019,428 dated Feb. 22, 2024 on U.S. Pat. No. 10,974,557—Exhibit 1056-PartD.
Ex Parte Reexamination 90/019,428 dated Feb. 22, 2024 on U.S. Pat. No. 10,974,557—Exhibit 1057.
Ex Parte Reexamination 90/019,428 dated Feb. 22, 2024 on U.S. Pat. No. 10,974,557—Exhibit 1058.
Ex Parte Reexamination 90/019,428 dated Feb. 22, 2024 on U.S. Pat. No. 10,974,557—Exhibit 1059-PartA.
Ex Parte Reexamination 90/019,428 dated Feb. 22, 2024 on U.S. Pat. No. 10,974,557—Exhibit 1059-PartB.
Ex Parte Reexamination 90/019,428 dated Feb. 22, 2024 on U.S. Pat. No. 10,974,557—Exhibit 1060.
Ex Parte Reexamination 90/019,428 dated Feb. 22, 2024 on U.S. Pat. No. 10,974,557—Exhibit 1061.
Ex Parte Reexamination 90/019,428 dated Feb. 22, 2024 on U.S. Pat. No. 10,974,557—Exhibit 1062.
Ex Parte Reexamination 90/019,428 dated Feb. 22, 2024 on U.S. Pat. No. 10,974,557—Exhibit 1063.
Ex Parte Reexamination 90/019,428 dated Feb. 22, 2024 on U.S. Pat. No. 10,974,557—Exhibit 1064.
Ex Parte Reexamination 90/019,428 dated Feb. 22, 2024 on U.S. Pat. No. 10,974,557—Exhibit 1065.
Ex Parte Reexamination 90/019,428 dated Feb. 22, 2024 on U.S. Pat. No. 10,974,557—Exhibit 1066.
Defendant's Notice of Service of Subpoena to Alamo Group Inc. (Feb. 12, 2024. In the United States District Court for the Southern District of Iowa Eastern Division. *Nuhn Industries Ltd* v. *Bazooka Farmstar, LLC.* Case No. 3:22-cv-00015-SMR-HCA.)
Non-Party Alamo Group Inc.'s Response and Objections to Defendant's Subpoena to Produce Documents on or Before Mar. 4, 2024. (Feb. 29, 2024. In the United States District Court for the Southern District of Iowa Eastern Division. *Nuhn Industries Ltd* v. *Bazooka Farmstar, LLC.* Case No. 3:22-cv-00015-SMR-HCA.)
Declaration of Echard Funck dated Mar. 8, 2024.
English machine translation of Declaration of Echard Funck dated Mar. 8, 2024.
Non-Party Alamo Group Inc.'s Motion to Quash Subpoena and Motion for Protective Order. (Mar. 11, 2024. In the United States District Court for the Western District of Texas San Antonio Division. Civil Action No. SA24MC0247OG)—Part 1.
Non-Party Alamo Group Inc.'s Motion to Quash Subpoena and Motion for Protective Order. (Mar. 11, 2024. In the United States District Court for the Western District of Texas San Antonio Division. Civil Action No. SA24MC0247OG)—Part 2.
Non-Party Alamo Group Inc.'s Motion to Quash Subpoena and Motion for Protective Order. (Mar. 11, 2024. In the United States District Court for the Western District of Texas San Antonio Division. Civil Action No. SA24MC0247OG)—Part 3.
Non-Party Alamo Group Inc.'s Motion to Quash Subpoena and Motion for Protective Order. (Mar. 11, 2024. In the United States District Court for the Western District of Texas San Antonio Division. Civil Action No. SA24MC0247OG)—Part 4.
Non-Party Alamo Group Inc.'s Motion to Quash Subpoena and Motion for Protective Order. (Mar. 11, 2024. In the United States District Court for the Western District of Texas San Antonio Division. Civil Action No. SA24MC0247OG)—Part 5.

(56) References Cited

OTHER PUBLICATIONS

Non-Party Alamo Group Inc.'s Motion to Quash Subpoena and Motion for Protective Order. (Mar. 11, 2024. In the United States District Court for the Western District of Texas San Antonio Division. Civil Action No. SA24MC0247OG)—Part 6.
Bazooka Farmstar, LLC's Response in Opposition to Non-Party Alamo Group Inc.'s Motion to Quash Subpoena and Motion for Protective Order. (Mar. 18, 2024. In the United States District Court for the Western District of Texas San Antonio Division. Civil Action No. SA24MC0247OG).
Declaration of Thomas J. Leach in Support of Defendant Bazooka Farmstar, LLC's Response in Opposition to Non-Party Alamo Group Inc.'s Motion to Quash Subpoena and Motion for Protective Order. (Mar. 18, 2024. In the United States District Court for the Western District of Texas San Antonio Division. Civil Action No. SA24MC0247OG).
Exhibit 1 of Declaration of Thomas J. Leach. (Mar. 18, 2024. In the United States District Court for the Western District of Texas San Antonio Division. Civil Action No. SA24MC0247OG).
Exhibit 2 of Declaration of Thomas J. Leach. (Mar. 18, 2024. In the United States District Court for the Western District of Texas San Antonio Division. Civil Action No. SA24MC0247OG).
English machine translation of Exhibit 2 of Declaration of Thomas J. Leach. (Mar. 18, 2024. In the United States District Court for the Western District of Texas San Antonio Division. Civil Action No. SA24MC0247OG).
Exhibit 3 of Declaration of Thomas J. Leach. (Mar. 18, 2024. In the United States District Court for the Western District of Texas San Antonio Division. Civil Action No. SA24MC0247OG).
Exhibit 4 of Declaration of Thomas J. Leach. (Mar. 18, 2024. In the United States District Court for the Western District of Texas San Antonio Division. Civil Action No. SA24MC0247OG).
Exhibit 5 of Declaration of Thomas J. Leach. (Mar. 18, 2024. In the United States District Court for the Western District of Texas San Antonio Division. Civil Action No. SA24MC0247OG).
Non-Party Alamo Group Inc.'s Reply in Support of its Motion to Quash Subpoena and Motion for Protective Order. (Mar. 25, 2024. In the United States District Court for the Western District of Texas San Antonio Division. Civil Action No. SA24MC0247OG).
Decision Granting Institution of IPR dated Apr. 16, 2024 on U.S. Pat. No. 11,491,835.
Detailed Request for Ex Parte Reexmaination Request dated Apr. 15, 2024 on U.S. Pat. No. 11,448,224.
Exhibit 1001 in Ex Parte Reexmaination Request dated Apr. 15, 2024 on U.S. Pat. No. 11,448,224.
Exhibit 1002 in Ex Parte Reexmaination Request dated Apr. 15, 2024 on U.S. Pat. No. 11,448,224.
Exhibit 1003 in Ex Parte Reexmaination Request dated Apr. 15, 2024 on U.S. Pat. No. 11,448,224.
Exhibit 1004 in Ex Parte Reexmaination Request dated Apr. 15, 2024 on U.S. Pat. No. 11,448,224.
Exhibit 1005 in Ex Parte Reexmaination Request dated Apr. 15, 2024 on U.S. Pat. No. 11,448,224.
Exhibit 1006 in Ex Parte Reexmaination Request dated Apr. 15, 2024 on U.S. Pat. No. 11,448,224.
Exhibit 1007 in Ex Parte Reexmaination Request dated Apr. 15, 2024 on U.S. Pat. No. 11,448,224.
Exhibit 1008 in Ex Parte Reexmaination Request dated Apr. 15, 2024 on U.S. Pat. No. 11,448,224.
Exhibit 1009 in Ex Parte Reexmaination Request dated Apr. 15, 2024 on U.S. Pat. No. 11,448,224.
Exhibit 1010 in Ex Parte Reexmaination Request dated Apr. 15, 2024 on U.S. Pat. No. 11,448,224.
Exhibit 1011 in Ex Parte Reexmaination Request dated Apr. 15, 2024 on U.S. Pat. No. 11,448,224.
Exhibit 1012 in Ex Parte Reexmaination Request dated Apr. 15, 2024 on U.S. Pat. No. 11,448,224.
Exhibit 1013 in Ex Parte Reexmaination Request dated Apr. 15, 2024 on U.S. Pat. No. 11,448,224.
Exhibit 1014 in Ex Parte Reexmaination Request dated Apr. 15, 2024 on U.S. Pat. No. 11,448,224.
Exhibit 1015 in Ex Parte Reexmaination Request dated Apr. 15, 2024 on U.S. Pat. No. 11,448,224.
Exhibit 1016 in Ex Parte Reexmaination Request dated Apr. 15, 2024 on U.S. Pat. No. 11,448,224.
Exhibit 1017 in Ex Parte Reexmaination Request dated Apr. 15, 2024 on U.S. Pat. No. 11,448,224.
Exhibit 1018 in Ex Parte Reexmaination Request dated Apr. 15, 2024 on U.S. Pat. No. 11,448,224.
Exhibit 1019 in Ex Parte Reexmaination Request dated Apr. 15, 2024 on U.S. Pat. No. 11,448,224.
Exhibit 1020 in Ex Parte Reexmaination Request dated Apr. 15, 2024 on U.S. Pat. No. 11,448,224.
Exhibit 1021 in Ex Parte Reexmaination Request dated Apr. 15, 2024 on U.S. Pat. No. 11,448,224.
Exhibit 1022 in Ex Parte Reexmaination Request dated Apr. 15, 2024 on U.S. Pat. No. 11,448,224.
Exhibit 1023 in Ex Parte Reexmaination Request dated Apr. 15, 2024 on U.S. Pat. No. 11,448,224.
Exhibit 1024 in Ex Parte Reexmaination Request dated Apr. 15, 2024 on U.S. Pat. No. 11,448,224.
Exhibit 1025 in Ex Parte Reexmaination Request dated Apr. 15, 2024 on U.S. Pat. No. 11,448,224.
Exhibit 1026 in Ex Parte Reexmaination Request dated Apr. 15, 2024 on U.S. Pat. No. 11,448,224.
Exhibit 1027 in Ex Parte Reexmaination Request dated Apr. 15, 2024 on U.S. Pat. No. 11,448,224.
Crosslande Tankers Ltd., CROSS0000001, May 15, 2001.
Crosslande Tankers Ltd., CROSS0000002, Aug. 2, 2011.
Crosslande Tankers Ltd., CROSS0000003, Aug. 2, 2011.
Crosslande Tankers Ltd., CROSS0000004, Aug. 2, 2024.
Crosslande Tankers Ltd., CROSS0000005, Aug. 2, 2011.
Declaration of Eckhard Funck with Exhibits A-H dated Mar. 8, 2024 (German).
Declaration of Eckhard Funck with Exhibits A-H dated Mar. 8, 2024 (English Translation).
Declaration of Reinhard Speerschneider with Exhibits A & B dated Apr. 24, 2024 (German).
Declaration of Reinhard Speerschneider with Exhibits A & B dated Apr. 24, 2024 (English Translation).
Preliminary Guidance on Patent Owner's Motion to Amend in the IPR of U.S. Pat No. 11/358,425 (Paper 39 in IPR2023-01161) (Jul. 17, 2024).
Between Defintion & Meaning—Merriam-Webster, <https://merriam-webster.com/dictionary/between> (May 13, 2024) (EX3002 in the IPR for U.S. Pat. No. 11,541,708 (IPR2024-00098)).
Chamber Defintion & Meaning—Merriam-Webster, <https://merriam-webster.com/dictionary/chamber> (May 13, 2024) (EX3003 in the IPR for U.S. Pat. No. 11,541,708 (IPR2024-00098)).
Decision Granting Institution of IPR of U.S. Pat No. 11/358,425 (Paper 12 in IPR2023-01161) (Jan. 9, 2024).
Int'l Ass'n of Dreding Cos., Cutter Suction Dredgers (2014).
Declaration of Ian Huhn in Support of Patent Owner's Response in IPR for U.S. Pat No. 11/358,425 (EX2083 in IPR2023-01161) (Apr. 2, 2024) (Public—Redacted).
Declaration of Ian Huhn in Support of Patent Owner's Response in IPR for U.S. Pat No. 11/491,835 (EX2083 in IPR2024-00004) (Jul. 9, 2024) (Public—Redacted).
Patent Owner's Response in IPR for U.S. Pat No. 11/541,708 (Paper 20 in IPR2024-00098) (Aug. 14, 2024) (Public—Redacted).
Declaration of Ian Huhn in Support of Patent Owner's Response in IPR for U.S. Pat. No. 11/541,708 (EX2083 in IPR2024-00098) (Aug. 14, 2024) (Public—Redacted).
Declaration of Doug S. Prairie in Support of Patent Owner's Response in IPR for U.S. Pat No. 11/541,708 (EX2099 in IPR2024-00098) (Aug. 14, 2024).
Cornel Redi-Prime Pump Brochure (undated).
Response to Office Action in U.S. Appl. No. 13/038,189 dated Feb. 3, 2014.
Response to Office Action in U.S. Appl. No. 13/038,189 dated Oct. 1, 2014.

(56) References Cited

OTHER PUBLICATIONS

Response to Office Action in U.S. Appl. No. 14/570,504 dated Jan. 27, 2016 (entered Feb. 16, 2016).
Response to Office Action in U.S. Appl. No. 16/053,331 dated Apr. 17, 2020.
Response to Office Action in U.S. Appl. No. 16/053,331 dated Aug. 14, 2020.
Office Action in U.S. Appl. No. 17/021,323 dated Sep. 30, 2021.
Claim Construction Briefing in SDIA 15 Case—Nuhn's Opening Claim Construction Brief filed Feb. 16, 2024 (ECF 131-1 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Opening Export of Douglas S. Prairie on Claim Construction in Support of Nuhn's Claim Constructions, dated Dec. 8, 2023 (ECF 131-20 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Webster's American English Dictionary—Expanded Edition (Federal Street Press 2013) (ECF 131-29 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Webster's New World—College Dictionary (Michael Agnes ed., 4th ed. 2006) (ECF 131-30 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—The American Heritage Dictionary 576 (Dell 5th ed. 2012) (ECF 131-31 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Oxford Dictionary of English 1216 (Angus Stevenson ed., Oxford University Press, 3d ed. 2010) (ECF 131-32 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Richard S. Hartenberg & Jacques Denavit, Kinematic Synthesis of Linkage chs. 1-4 (McGraw-Hill, Inc. 1964) (ECF 131-33 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Bazooka's Opening Claim Construction Brief filed Feb. 16, 2024 (ECF 132-1 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Four-bar Chain, S.B. Chopra, Anmol's Dictionary of Mechanical Engineering, 152 (1989) (ECF 132-21 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Four-bar Linkage, Tony Atkins & Marcel Eschudier, Oxford Dictionary of Mechanical Engineering, 144 (1st ed. 2013) (ECF 132-22 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Export Report of Robert T. Burns, Ph.D., P.E., on Claim Construction in Support of Bazooka's Claim Constructions, dated Jan. 3, 2024 (ECF 132-3 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Carolyn J. Roos, U.S. Dep't of Energy, A Guide to Pumping Manure Slurries in Centralized Biogas Digester Systems (rev. ed. 2013) (ECF 132-32 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 USEPA, Water Monitoring and Assessment: 5.8 Total Solids, https://archive.epa.gov/water/archive/web/html/vms58.html (last updated Mar. 6, 2012) (ECF 132-34 in *Nuhn Industries Ltd v. Bazooka Farmstar, LLC*, U.S. District Court for the Southern District of Iowa, Case No. 3:22-cv-00015-SMR-HCA) https://archive.epa.gov/water/archive/web/html/vms58.html.
Claim Construction Briefing in SDIA 15 Case—CAL. State Water Res. Control BD., Standard Operating Procedure (SOP) 3.1.5.8: Measurements of Settleable Solids with IMHOFF Cones (2017), (ECF 132-35 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—J.M. Langner & E.L. Bibeau, Properties of Naturally Settled Hog Manure in Ourdoor Lagoons, 52 Tranactions ASAE 2067 (2009), (ECF 132-36 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Nuhn's Responsive Brief on Clain Construction filed Mar. 11, 2024 (ECF 137-1 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Rebuttal Expert Report of Douglas S. Prairie on Claim Construction in Support of Nuhn's Claim Constructions, dated Jan. 12, 2024, (ECF 137-2 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Bazooka's Repsonsive Claim Construction Brief filed Mar. 11, 2024, (ECF 138-01 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Nuhn's Technology Tutorial filed Apr. 12, 2024, (ECF 160 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Bazooka's Technology Tutorial filed Apr. 12, 2024, (ECF 161 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Nuhn's Claim Construction Presentation filed Apr. 15, 2024, (ECF 166 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Bazooka's Claim Construction Presentation filed Apr. 15, 2024, (ECF 167 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Bazooka's Supplemental Claim Construction Presentation filed on Apr. 26, 2024, (ECF 173 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Nuhn's Responsive Supplemental Brief on Claim Construction filed May 3, 2024, (ECF 175 in *Nuhn Industries Ltd v. Bazooka Farmstar, LLC*, U.S. District Court for the Southern District of Iowa, Case No. 3:22-cv-00015-SMR-HCA).
Claim Construction Briefing in SDIA 15 Case—Bazooka's Supplemental Reply Claim Construction filed May 10, 2024, (ECF 176 in *Nuhn Industries Ltd v. Bazooka Farmstar, LLC*, U.S. District Court for the Southern District of Iowa, Case No. 3:22-cv-00015-SMR-HCA).
Petition to Accept an Unintentionally Delayed Claim for the Benefit of a Prior-Filed Application—U.S. Appl. No. 15,586,493—U.S. Pat. No. 10,124,638 dated Jul. 19, 2023, including Petition for Expedited Review, Declaration of Robert A.H. Brunet, Providing Additional Explanation of the Circumstances Surrounding the Unintentionally Delayed Claim for the Benefit of a Prior-Filed Application dated Jul. 18, 2023, and Request for Certificate of Correction.
Defendant Bazooka Farmstar, LLC's Initial Invalidity Contentions regarding U.S. Pat. No. 11,448,224 in *Nuhn Industries Ltd v. Bazooka Farmstar, LLC*, U.S. District Court for the Southern District of Iowa, Case No. 3:22-cv-00064-SMR-HCA served on May 5, 2023.

(56) References Cited

OTHER PUBLICATIONS

Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit A—Claim Chart—Alleged Prior Sales, Disclosure or Use of Nuhn Dual Port Header Series Pump.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit B—Claim Chart—Alleged Dual Port Header Series Brochure.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit C—Claim Chart—Alleged Manure H5000 Pump Parts Manual.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit D—Claim Chart—Alleged Husky Liquid Manure H5000 Pump Brochure.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit E—Claim Chart—Alleged Prior Sales, Disclosure or Use of Husky Liquid Manure H5000 Pump.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit F—Combination of Alleged GEA Houle Publications and Alleged Fisher Prior Art.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit G—Claim Chart—Combination of Alleged GEA Houle Publicatins and US2625110.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit H—Claim Chart—Combination of Alleged GEA Houle Publications and US33367583.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit I—Claim Chart—Combination of Alleged GEA Houle Publications and US4063849.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit J—Claim Chart—Combination of Alleged GEA Houle Publications and US3733151.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit K—Claim Chart—Combination of Alleged Husky Prior Art and Alleged Fisher Prior Art.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit L—Claim Chart—Combination of Alleged Husky Prior Art and US2625110.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit M—Claim Chart—Combination of Alleged Husky Prior Art and US33367583.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit N—Claim Chart—Combination of Alleged Husky Prior Art and US4063849.
Defendant Bazooka Farmstar, LLC's Initial Invalidity Contentions regarding U.S. Pat. No. 11,448,224 in *Nuhn Industries Ltd* v. *Bazooka Farmstar, LLC*, U.S. District Court for the Southern District of Iowa, Case No. 3:22-cv-00064-SMR-HCA served on May 5, 2023—Exhibit O—Claim Chart—Combination of Alleged Husky Prior Art and US33733151.
Burrows Enterprises, LLC (Fisher Pumps Divison), Image of Fisher Pump Belt Drive Vertical Pump (allegedly available at least as early as 1993) (produced by Bazooka-Farmstar, LLCas BAZ000012).
L.M. Staley et al., Flow Properties of Dairy Waste Slurries, Canadian Agricultural Engineering, vol. 15, No. 2, Dec. 1973.
2018-05-25_Eisele_Prospekt_Landwirtschaft_EN.pdf.
2018-10-26_Eisele_Prospekt_technische Daten_EN.pdf.
Screenshots of Puck Agitation Boat_13 Jeremy Puck posted to YouTube at https://youtube.com/watch?v=1MqPldkqOq4 (YouTube lists date of Aug. 10, 2011) https://youtube.com/watch?v=1MqPldkqOq4.
Screenshots of Sundstrom Pit Pumping Stir Boat posted to YouTube at https://youtube.com/watch?v=tTtFx1AUQi0 (YouTube lists date of Mar. 12, 2013).
Screenshots of ShopSeventhAvenue Amphibious Tankposted to YouTube at https://youtube.com/watch?v=daZ2s_NaYr4 (YouTube lists date of Jul. 26, 2011).
Screenshots of Mowing boat, Harvester, Small Dredger, Amphibian Excavator posted to YouTube at https://youtube.com/watch?v=4j9BfLL3INM (YouTube lists date of Nov. 23, 2011).
Screenshots of Christopher Lindstrom manure agitation boat posted to YouTube at https://youtube.com/watch?v=EzBzgDfsq0 (YouTube lists date of May 17, 2013).
Screenshots of Curt Kilsdonk Manure agitation barge 1 posted to YouTube at https://youtube.com/watch?v=IM74_B6XR9U (YouTube lists date of Jan. 14, 2013).
Screenshots of Curt Kilsdonk Manure agitation barge 2 posted to YouTube at https://youtube.com/watch?v=jtYI5nbyn (YouTube lists date of Jan. 14, 2013).
Screenshots of Curt Kilsdonk Manure agitation barge 3 posted to YouTube at https://youtube.com/watch?v=xLiETN5e-Ss (YouTube lists date of Jan. 14, 2013).
Screenshots of Curt Kilsdonk Manure agitation barge 4 posted to YouTube at https://youtube.com/watch?v=vzkHyIRsqV0 (YouTube lists date of Jan. 14, 2013).
Screenshots of dvanheel 70 Shi-toon posted to YouTube at https://youtube.com/watch?v=q1oHhsCuBc (YouTube lists date of Apr. 16, 2012).
Screenshots of Sundstrom Stir Dredge posted to YouTube at https://youtube.com/watch?v=RDyAyLgMETY (YouTube lists date of Apr. 13, 2012).
Screenshots of Conver CC50 Compact Amphibious Excavator posted to YouTube at https://youtube.com/watch?v=f5ykTIsYTAk (YouTube lists date of Feb. 1, 2012).
Screenshots of Sealegs Fire Pump Demonstration in Korea posted to YouTube at https://youtube.com/watch?v=rOTBXZNYsjk (YouTube lists date of Jul. 5, 2011).
Declaration of Randall G. Gorter, Head of Market Support at GEA Farm Technolgoes, Inc. dated Jul. 26, 2024 (alleging publication of Houle Manure Pumps and Agitators brochure in 2002 attached as Exhibit A and alleging publication of Houle Pumps and Valves for Flush Systems brochure in 2001, attached as Exhibit B).

(56) References Cited

OTHER PUBLICATIONS

Houle Manure Pumps and Agitators brochure 2002 (Exhibit A to Declaration of Randall G. Gorter, Head of Market Support at GEA Farm Technolgoes, Inc. dated Jul. 26, 2024).
Houle Manure Pumps and Valves for Flush Systems brochure 2001 (Exhibit A to Declaration of Randall G. Gorter, Head of Market Support at GEA Farm Technolgoes, Inc. dated Jul. 26, 2024).
Printouts from Nuhn.ca/history/ (EX1070 in IPR2023-01161) (May 30, 2024).
Manure Manager, On Track: Jan./Feb. 2009, <https://manuremanager.com/on-track-2044/> (EX1073 in IPR2023-01161).
Manure Manager, Sep./Oct. 2014 (EX1074 in IPR2023-01161) (see p. 25).
Redacted Reply to Patent Owner's Response in Inter Partes Review of U.S. Pat. No. 11,358,425 (Aug. 6, 2024) (Paper 42 in IPR2023-01161).
Public Delaration of Eric Winkel, Dated Aug. 6, 2024 (EX1112 in IPR2023-01161).
U.S. Dep't Agric., Wildland Fire Engine Guide (2000) (EX1113 in IPR2023-01161).
Delaration of Benny D. Puck, Dated Jul. 31, 2024 (EX1114 in IPR2023-01161).
Public Delaration of Ernie Sundstrom, Dated Aug. 1, 2024 (EX1115 in IPR2023-01161).
T.H. Morrell, Soc'y of Auto. Eng's Tech. paper No. 800943, The Development of Agricultural Equipment Power Take-Off Mechanism (1980) (EX1116 in IPR2023-01161).
Philip Jeffrey Nelson, A Pretension of Place: The Industrialization of Corn Belt Agriculture, 1940-1965 (May 1992) (M.A. dissertation, University of Northen Iowa) (on file with the Rod Library, University of Northen Iowa) (EX1117 in IPR2023-01161).
Petition for Expedited Review Under 37 CFR 1.182 of U.S. Pat. No. 10,124,638 (Jul. 19, 2023) (EX1118 in IPR2023-01161).
Screenshots from Puck Enters., Inc., Puck Agitation Boat, YouTube, (Sep. 19, 2012), <https://youtu.be/com/1fRPrwGUyM0> (EX1119 in IPR2023-01161).
Case Study: Fire Craft-Rescue and Response, SEALEGS (Jan. 2, 2010), <https://sealegs.com/blog/posts/2010/january/sealegsfirecraft-61m/> (EX1120 in IPR2023-01161).
Sealegs Now Goes Even Further with All Wheel Drive, Sydney Boating (2010), <http://sydneyboating.com/au/app/articles/view/sealegs-now-goes-even-further-with-all-wheel-drive/> [https://web.archive.org/web/20110222062723/http://www.sydneyboating.com/au/app/articles/view/sealegs-now-goes-even-further-with-all-wheel-drive/] (EX1122 in IPR2023-01161).
Frank Yeaple, Fluid Power Design Handbook (2d ed. 1990) (EX1123 in IPR2023-01161).
Redi-Prime and Venturi Prime, Cornell Pump Co. (2013), <http://cornellpump.com/lit/brochure/BR REDI-PRIME.pdf> [https://web.archive.org/web/20150922061133/http://www.cornellpump.com/lit/brochure/BR_REDI-PRIME.pdf/] (EX1122 in IPR2024-01161).
Understanding Power Take-Offs, Parker-Hannifin Corp. (2002), <https://www.parker.com/content.dam.parker/msg.chelsea-productsdivision/home/Understanding%20PTOs.pdf> (EXP1124 in IPR2-23-01161).
Screenshots from Huhn Indus., Ltd., Nuhn Lagoon Crawler X, YouTube, (Jun. 2, 2021), <https://youtu.be.com/hzzEOqCRdh0> (EX1126 in IPR2023-01161).
M. Kumar et al., Flow Properties of Animal Waste Slurries, 15(4) Transactions of the ASAE 718(1972) (EX1128 in IPR2023-01161).
6090HF485 9.0L Industrial Diesel Engine, John Deere (last visited Aug. 6, 2024), <https://deere.com/en/industrial-engines/tier-3-stage-iii-a/powertech-plus-9-0I/> [https://web.archive.org/web/20240531105931/https://www.deere.com/en/industrial-engines/tier-3-stage-iii-a/powertech-plus-9-0I/] (EX1130 in IPR2023-01161).
Photographs of the SenwaTec Amphi-King (produced in the *Nuhn Indus. Ltd v. Bazooka Farmstar, LLC*, Case No. 3:22-cv-00015-SMR-HCA in the U.S. District Court for the Southern District of Iowa as BAZ15_002442621) (Publicly filed by Bazooka Farmstar on Aug. 6, 2024 as EX1131 in IPR2023-01161).

Eight Long Range Cruisers with Full Displacement Hulls, Powerboat Guide Blog (Feb. 2017), <https://powerboatguideblog.com/mobile/blog-index/feb-24-2016-mobile.html> [https://web.archive.org/web/20230207222951/https://www.powerboatguideblog.com/mobile/blog-index/feb-24-2016-mobile.html] (EX1132 in IPR2023-01161).
Patent Owner's Reply to Petitioner's Opposition to its Motion to Amend in Inter Partes Review of U.S. Pat. No. 11,358,425 (Aug. 6, 2024) (Paper 40 in IPR2023-01161).
Declaration of Douglas Prairie Regarding Motion to Amend 425 Patent in Inter Partes Review of U.S. Pat. No. 11,358,425 (Aug. 6, 2024) (EX2099 in IPR2023-01161).
Cornell Pump Company Applications, Remote Controlled Agitators (2012).
Amphibious Tractor, Farm Show, vol. 14, No. 3, 1990 at 2.
Tank Systems, Storage Lagoon Covers and Liners, Manure Manager, Mar. 11, 2008.
Image of Iveco Truck (image contains date of 2009).
Truxor Amphibian Tool Carrier Brochure, Dorotea Mekaniska AB (Hockney Underwater Weed Cutters, Inc.—Distributor), 20 pages (2015).
Amphibious Tank RC Toy Manual (2009).
Normrock Industries Inc., Technical Specifications for Horizontal Cutter Suction Dredging Equipment Amphibex AE800P (May 18, 2011).
MidWest Plan Service, Manure Characteristics, Manure Management Systems Series, MWPS-18 Section 1 (2d ed. 2004).
Christiansen, Leonard Rufus, "Mixing studies on starch pastes and slurries " (1973), *Retrospective Theses and Dissertations*. 6191. https://lib.dr.iastate.edu/rtd/6191.
Salehiyon, A. R., S.Minaei, and S. J. Razavi. 2015. Rheological properties of sand-laden dairy manure: modeling by concentration and temperature, AgricEng Int: CIGR Journal, 17(1): 284-292.
The Prairie Province's Comm. on Livestock Dev. & Manure Mgmt., Tri-Provinical Manure Application and Use Guidelines: Saskatchewan, Understanding the Soil and Manure Test Reports (2003).
John P. Chastain & Stephen Henry, Management of Lagoons and Storage Structures for Dairy Manure (2004).
Unsworn Declaration of Damien Cleugh Pursuant to 28 U.S.C. § 1746 dated Jun. 5, 2024 (Produced by Alamo Group, Inc. on Jun. 7, 2024 pursuant to subpoena issued by Bazooka in *Nuhn Industries Ltd v. Bazooka Farmstar, LLC*, U.S. District Court for the Southern District of Iowa, Case No. 3:22-cv-00015-SMR-HCA).
C550-M821-DSCN7360.JPG—Photograph of Conver C550 (Produced by Alamo Group, Inc. on Jun. 7, 2024 pursuant to subpoena issued by Bazooka in *Nuhn Industries Ltd v. Bazooka Farmstar, LLC*, U.S. District Court for the Southern District of Iowa, Case No. 3:22-cv-00015-SMR-HCA and alleged to predate Jan. 1, 2024).
3118-Quotation-C580H&C550-Mastenbroek-161210.pdf—Quotation for one Conver C580H and one new C550—Amphitrax Compact amphibious tool carrier dated Dec. 16, 2010 (Produced by Alamo Group, Inc. on Jun. 7, 2024 pursuant to subpoena issued by Bazooka in *Nuhn Industries Ltd v. Bazooka Farmstar, LLC*, U.S. District Court for the Southern District of Iowa, Case No. 3:22-cv-00015-SMR-HCA).
C550-M821-DSCN7364.JPG—Photograph of Conver C550 (Produced by Alamo Group, Inc. on Jun. 7, 2024 pursuant to subpoena issued by Bazooka in *Nuhn Industries Ltd v. Bazooka Farmstar, LLC*, U.S. District Court for the Southern District of Iowa, Case No. 3:22-cv-00015-SMR-HCA and alleged to predate Jan. 1, 2024).
C550-M872-DSC_0014.JPG—Photograph of Conver C550 (Produced by Alamo Group, Inc. on Jun. 7, 2024 pursuant to subpoena issued by Bazooka in *Nuhn Industries Ltd v. Bazooka Farmstar, LLC*, U.S. District Court for the Southern District of Iowa, Case No. 3:22-cv-00015-SMR-HCA and alleged to predate Jan. 1, 2024).
P3682-C550.pdf—Manual Conver C550 (Produced by Alamo Group, Inc. on Jun. 7, 2024 pursuant to subpoena issued by Bazooka in *Nuhn Industries Ltd v. Bazooka Farmstar, LLC*, U.S. District Court for the Southern District of Iowa, Case No. 3:22-cv-00015-SMR-HCA and alleged to predate Jan. 1, 2024).
P2575-C58H0.pdf—Service Manual Conver C580H (Produced by Alamo Group, Inc. on Jun. 7, 2024 pursuant to subpoena issued by Bazooka in *Nuhn Industries Ltd v. Bazooka Farmstar, LLC*, U.S.

(56) References Cited

OTHER PUBLICATIONS

District Court for the Southern District of Iowa, Case No. 3:22-cv-00015-SMR-HCA and alleged to predate Jan. 1, 2024).
C580 07 (1).jpg—Photograph of Conver C580 (Produced by Alamo Group, Inc. on Jun. 7, 2024 pursuant to subpoena issued by Bazooka in *Nuhn Industries Ltd* v. *Bazooka Farmstar, LLC*, U.S. District Court for the Southern District of Iowa, Case No. 3:22-cv-00015-SMR-HCA and alleged to predate Jan. 1, 2024).
Screenshots from DSC_0024.AVI (Produced by Alamo Group, Inc. on Jun. 7, 2024 pursuant to subpoena issued by Bazooka in *Nuhn Industries Ltd* v. *Bazooka Farmstar, LLC*, U.S. District Court for the Southern District of Iowa, Case No. 3:22-cv-00015-SMR-HCA and alleged to predate Jan. 1, 2024).
Decision Granting Unintentionally Delayed Priority Claim in re U.S. Pat. No. 10,124,638 (Jul. 26, 2023).
Petitioner's Reply to Patent Owner's Preliminary Response (Paper 7 in IPR2023-01161) (Nov. 1, 2023).
Patent Owner's Sur-Reply to Petitioner's Reply to Patent Owner's Preliminary Response (Paper 9 in IPR2023-01161) (Nov. 8, 2023).
Patent Owner's Conditional Motion to Amend (Paper 18 in IPR2023-01161) (Apr. 2, 2023).
Patent Owner's Response for the IPR of U.S. Pat. No. 11,358,425 (Paper 19 in IPR2023-01161) (Apr. 2, 2024) (Public—Redacted).
Patent Owner's Corrected Response for the IPR of U.S. Pat. No. 11,358,425 (Paper 26 in IPR2023-01161) (May 6, 2024) (Public—Redacted).
Declaration of Douglas S. Prairie in Support of Patent Owner's Response for the IPR of U.S. Pat. No. 11,358,425 (EX2029 in IPR2023-01161) (Apr. 2, 2024).
K. Smith et al., Natural Crusting Of Slurry Storage As An Abatement Meausrement For Ammonia Emissions On Dairy Darms, 97 Biosystems Engineering 464 (2007) (EX2030 in IPR2023-01161).
H. Landry et al., Physical and Rheological Properties of Manure Products, Applied Engineering in Agirculture, at 278 (2004) (EX2033 in IPR2023-01161).
Hydrostatic Pto's Run in Reverse, Farm Show, vol. 1, No, 5, 1977 (EX2034 in IPR2023-01161).
Petitioner's Opposition to Patent Owner's Motion to Amend (Paper 36 in IPR2023-01161) (Jun. 27, 2024).
S.C. Jett et al., Size Distribution and Nutritional Value of Swine Manure Separates, 17(5) Transactions of the ASAE 965 (1974) (EX1097 in IPR2023-01161).
Claire E. Marcato et al., Particle size and metal distributions in anaerobically digested pig slurry, 99(7) Bioresource Technology 2340 (2008) (EX1098 in IPR2023-01161).
Deanne Meyer et al., Particle Size and Nutrient Distribution in Fresh Dairy Manure, 23(1) APplied Engineering in Agriculture 113 (2007) (EX1099 in IPR2023-01161).
Conrad B. Gilbertson et al., Pumping Liquid Manure from Swine Lagoons and Holding Ponds, in Pork Industry Handbook (1984) (EX1101 in IPR2023-01161).
William L. Kranz et al., Application of Liquid Animal Manures Using Center Pivot Irrigation Systems, U. Nev. Extension (May 10, 2007) (EX1102 in IPR2023-01161).
T.M. Verna and L. A. Prieto-Portar, A Simple Method of Risk/Hazard Assessment in Dredging, Western Dreding Association Technical Conference and Texas A&M Univeristy Dredging Seminar 233 (Jun. 2012) (EX1103 in IPR2023-01161).
Dredger Accidents, Maritime Injury Guide, https://www.maritimeinjuryguide/maritime-accidents-injuries/vessel-injuries-dredger/ (last visited Jun. 24, 2024) (EX1104 in IPR2023-01161).
Most Dangerous Jobs in the U.S., Industrial & Hygiene News, https://www.ishn.com/articles/110496-most-dangerous-jobs-in-the-us-top-20 (last visited Jun. 24, 2024) (EX1105 in IPR2023-01161).
Eric C. Tupper, Introduction to Naval Architecture 71 (5th ed. 2013) (EX1106 in IPR2023-01161).
Donald F. Young et al., A Brief Introduction to Fluid Mechanics 141-142 (Penny Perritti et al. eds. 2d ed. 2001) (EX1107 in IPR2023-01161).

Declaration of Eric Winkel, Dated Jun. 27, 2024 (EX1109 in IPR2023-01161).
Patent Owner's Preliminary Response in IPR of U.S. Pat. No. 11,491,835 (Paper 9 in IPR2024-00004) (Jan. 17, 2024).
Declaration of Douglas S. Prairie in Support of Patent Owner's Response in IPR of U.S. Pat. No. 11,491,835 (EX2004 in IPR2024-00004) (Jan. 17, 2024).
Screenshots from YouTube of SenwaTec video, retrieved on Jan. 15, 2024 from https://www.youtube.com/watch?v=ecnlfMf7CH4&t=1s.
Dredge Yard Auger Dredger ECO2008-A8-brochure, downloaded from https://dredgeyard.com/wp-content/uploadds/2021/01/ECO2008-A8-brochure.pdf (document undated).
Hydraulic Dredgers—Dredge Brokers LLC, accessed at https://dredgebrokers.com/equipment/hydraulic-dredgers/dt-horizontal-cutter/ (Jul. 6, 2024).
Declaration of Douglas S. Prairie in Support of Patent Owner's Response in IPR of U.S. Pat. No. 11,491,835 (EX2094 in IPR2024-00004) (Jul. 9, 2024).
Agriculture—manure storage statistics, eurostat, Sep. 2013, accessed at https://url.us.m.mimecastprotect.com/s/ZSdwCkRw8BHqom10i2tW.
Patent Owner's Response in IPR for U.S. Pat. No. 11,358,425 (Paper 22 in IPR2023-01161) (Jul. 9, 2024) (Public—Redacted).
Patent Owner's Conditional Motion to Amend in IPR for U.S. Pat. No. 11,491,835 (Paper 21 in IPR2024-0004) (Jul. 9, 2024).
Supplemental Declaration of Eckhard Funck dated Jun. 15, 2024 (English Translation).
Supplemental Declaration of Eckhard Funck dated Jun. 15, 2024 (Original German).
Certificate Correction for U.S. Pat. No. 10,124,638 (Aug. 22, 2023).
Patent Owner's Preliminary Response in IPR of U.S. Pat. No. 11,541,708 (Paper 7 in IPR2024-00098) (Feb. 26, 2024).
Petitioner's Reply to Patent Owner's Preliminary Response in IPR of U.S. Pat. No. 11,541,708 (Paper 8 in IPR2024-00098) (Mar. 25, 2024).
Patent Owner's Sur-Reply to Patent Owner's Preliminary Response in U.S. Pat. 11,541,708 (Paper 9 in IPR2024-00098) (Apr. 1, 2024).
Decision Granting Institution of IPR for U.S. Pat. 11,541,708 (Paper 10 in IPR2024-00098) (May 23, 2024).
Declaration of Douglas S. Prairie in Support of Patent Owner's Response in IPR of U.S. Pat. No. 11,491,835 (EX2004 in IPR2024-00098) (Feb. 26, 2024).
McCaslin, Drive Sprockets and Track Drivers, TexasFinalDrive.com, https://info.texasfinaldrive.com/shop-talk-blog/drive-sprockets-and-track-drives (last accessed Feb. 25, 2024) (EX2034 in IPR2024-00098).
Declaration of Eric S. Winkel, Ph.D. dated Apr. 12, 2024 (EX1004 in Ex Parte Reexamination of U.S. Pat. No. 11,448,224 (Reexam Ser. No. 90/019,482).
Supplemental Declaration of Walter S. Grose dated Apr. 9, 2024 (EX1019 in Ex Parte Reexamination of U.S. Pat. No. 11,448,224 (Reexam Ser. No. 90/019,482)).
Order Granting Request for Ex Parte Reexamination Request of U.S. Pat. No. 11,448,224—Reexam No. 90/019,482, dated Jul. 9, 2024.
Order Granting Request for Ex Parte Reexamination Request of U.S. Pat. No. 10,974,557—Reexam No. 90/019,258, dated Oct. 18, 2023.
Patent Owner's Statement filed in Ex Parte Reexamination Request of U.S. Pat. No. 10,974,557—Reexam No. 90/019,258, dated Dec. 18, 2023 (including EX12; EX15-EX19 previouisly cited).
Bazaooka's Reply to Patent Owner's Statement filed in Ex Parte Reexamination Request of U.S. Pat. No. 10,974,557—Reexam No. 90/019,258, dated Feb. 16, 2024.
Order Granting Request for Ex Parte Reexamination Request of U.S. Pat. No. 10,974,557—Reexam No. 90/019,290, dated Jan. 22, 2024.
Order Granting Request for Ex Parte Reexamination Request of U.S. Pat. No. 10,974,557—Reexam No. 90/019,302, dated Feb. 12, 2024.
Order Granting Request for Ex Parte Reexamination of U.S. Pat. No. 10,974,557—Reexam No. 90/019,428, dated May 20, 2024.

(56) References Cited

OTHER PUBLICATIONS

Supplemental Declaration of Eric S. Winkel dated Feb. 22, 2024 (EX1004 in Ex Parte Reexamination of U.S. Pat. No. 10,974,557 (Reexam Ser. No. 90/019,428)).
Nuhn Industries Ltd., Header Series Lagoon Pump Brochure (Aug. 2, 2013).
Nuhn Industries Ltd., Articulated Pump Brochure (Feb. 1, 2012).
Nuhn Industries Ltd., Header Series Lagoon Pump Brochure (Sep. 20, 2012).
Nuhn Industries Ltd., Header Series Vertical Pit Pump Brochure (Sep. 20, 2012).
Nuhn Industries Ltd., G-Force Pump Brochure (2008).
Nuhn Industries Ltd., PTO Pump Brochure (2008).
Nuhn Industries Ltd., Vertical Pit Pump Brochure (Sep. 1, 2010).
Nuhn Industries Ltd., Header Series Lagoon Pump Brochure (May 21, 2013).
The Beacon Herald, Nuhn Industries Has Global Reach, Nov. 25, 2011.
Nuhn G-Force Vertical Pit Pump Advertisement, Ontario Farmer, Jun. 7, 2011.
Nuhn Header Series Lagoon Pump Advertisement, Progressive Dairyman, Jan. 1, 2013.
Nuhn Advertisement, Prairie Hog Country, Jun./Jul. 2011.
Nuhn Advertisement, Prairie Farmer, Aug. 1, 2011.
Screenshot of Nuhn Vertical Pit Pump Brochure (Nov. 11, 2010).
Nuhn Vertical Pit Pump Brochure (Oct. 10, 2010).
2008 Hydro Engineering's Accessory Parts Catalog.
Jamesway Pumpeller Hybrid Lagoon Pump Brochure (document undated).
Balzer's V-6 Pump High Volume Pit Pumps Brochure (document undated).
Calumet Brochure (2003).
Jamesway Vertical Electric Pumps Brochure (document undated).
Office Action in U.S. Appl. No. 18/472,696 dated Apr. 24, 2024.
Bazooka Farmstar's Petition for Inter Partes Review U.S. Pat. No. 11,358,425 dated Jun. 30, 2023 (IPR2023-01161).
Litigation documents related to Bazooka Farmstar, LLC's Subpoena to Non-Party Alamo Group, Inc.—ECF 3—Bazooka Farmstar, LLC's Response in Opposition to Non-Party Alamo Group, Inc.'s Motion to Quash Subpoena and Motion for Protective Order (Mar. 18, 2024 in U.S. District Court for the Western District of Texas San Antonio Division, Case No. 5:24-mc-00247-OLG).
Decision Granting Institution of IPR for U.S. Pat. No. 11,491,835 (Paper 12 in IPR2024-00004) (Apr. 16, 2024).
Declaration of Douglas S. Prairie in Support of Patent Owner's Response in IPR of U.S. Pat. No. 11,541,708 (EX2099 in IPR2024-00098) (Aug. 14, 2024)—Part 1.
Declaration of Douglas S. Prairie in Support of Patent Owner's Response in IPR of U.S. Pat. No. 11,541,708 (EX2099 in IPR2024-00098) (Aug. 14, 2024)—Part 2.
Declaration of Douglas S. Prairie in Support of Patent Owner's Preliminary Response in IPR of U.S. Pat. No. 11,358,425 (EX2004 in IPR2024-01161) (Oct. 10, 2023).
Declaration of Eric S. Winkel, Ph.D., P.E. dated Nov. 3, 2023 in Support of Petition for Inter Partes Review of U.S. Pat. No. 11,541,708 (EX1004 in IPR2024-00098).
Declaration of Eric S. Winkel, Ph.D., P.E. dated Oct. 13, 2023 in Support of Petition for Inter Partes Review of U.S. Pat. No. 11,491,835 (EX1004 in IPR2024-00004).
Declaration of Royal Burows, owner of Burows Enterprises, LLC, executed Jun. 21, 2023: (1) alleging prior to public use, offer ro sale, and sale of Fisher Vertical Set Belt Drive Pump, Fisher Vertical Set Direct Drive Pump, and Portable Hydraulic Driven Pumps; (2) describing Fisher Pumps advertisements in Manure Manager, Sep./Oct. 2009 (Exhibit 13 to Request for Ex Parte Reexamination dated Jun. 30, 2023 on U.S. Appl. No. 11/448,224, Reexam No. 90/019,224) and Manure Manager, Jan./Feb. 2010 (Exhibit 14 to Request for Ex Parte Reexamination dated Jun. 30, 2023 on U.S. Appl. No. 11/448,224, Reexam No. 90/019,224); and (3) alleging dates for: (i) Fisher Pumps Advertisement (Exhibit 11 to Request for Ex Parte Reexamination dated Jun. 30, 2023 on U.S. Appl. No. 11/448,224, Reexam No. 90/019,224), (ii) Fisher Pumps Brochure (Exhibit 12 to Request for Ex Parte Reexamination dated Jun. 30, 2023 on U.S. Appl. No. 11/448,224, Reexam No. 90/019,224), and (iii) Fisher Pumps Owner's Manual (Exhibit 10 to Request for Ex Parte Reexamination dated Jun. 30, 2023 on U.S. Appl. No. 11/448,224, Reexam No. 90/019,224)—Part 1.
Declaration of Royal Burows, owner of Burows Enterprises, LLC, executed Jun. 21, 2023: (1) alleging prior to public use, offer ro sale, and sale of Fisher Vertical Set Belt Drive Pump, Fisher Vertical Set Direct Drive Pump, and Portable Hydraulic Driven Pumps; (2) describing Fisher Pumps advertisements in Manure Manager, Sep./Oct. 2009 (Exhibit 13 to Request for Ex Parte Reexamination dated Jun. 30, 2023 on U.S. Appl. No. 11/448,224, Reexam No. 90/019,224) and Manure Manager, Jan./Feb. 2010 (Exhibit 14 to Request for Ex Parte Reexamination dated Jun. 30, 2023 on U.S. Appl. No. 11/448,224, Reexam No. 90/019,224); and (3) alleging dates for: (i) Fisher Pumps Advertisement (Exhibit 11 to Request for Ex Parte Reexamination dated Jun. 30, 2023 on U.S. Appl. No. 11/448,224, Reexam No. 90/019,224), (ii) Fisher Pumps Brochure (Exhibit 12 to Request for Ex Parte Reexamination dated Jun. 30, 2023 on U.S. Appl. No. 11/448,224, Reexam No. 90/019,224), and (iii) Fisher Pumps Owner's Manual (Exhibit 10 to Request for Ex Parte Reexamination dated Jun. 30, 2023 on U.S. Appl. No. 11/448,224, Reexam No. 90/019,224)—Part 2.
Litigation documents related to Bazooka Farmstar, LLC's Subpoena to Non-Party Alamo Group, Inc.—ECF 4—Declaration of Thomas J. Leach in Support of Bazooka Farmstar, LLC's Response in Opposition to Non-Party Alamo Group, Inc.'s Motion to Quash Subpoena and Motion for Protective Order (Mar. 18, 2024 in U.S. District Court for the Western District of Texas San Antonio Division, Case No. 5:24-mc-00247-OLG).
Litigation documents related to Bazooka Farmstar, LLC's Subpoena to Non-Party Alamo Group, Inc.—ECF 3—Bazooka Farmstar, LLC's Notice of Service of Subpoena to Non-Party Alamo Group, Inc. (Feb. 12, 2024 in *Nuhn Industries Ltd* v. *Bazooka Farmstar, LLC* in U.S. District Court for the Southern District of Iowa, Case No. 3:22-cv-00015-SMR-HCA).
Detailed Request for Reexamination of U.S. Pat. No. 11,448,224 dated Apr. 15, 2024 (Rexam No. 90/019,482).
Declaration of Eric S. Winkel, Ph.D., P.E. dated Jun. 29, 2023 in Support of Petition for Inter Partes Review of U.S. Pat. No. 11,358,425 (EX1004 in IPR2023-01161).
Litigation documents related to Bazooka Farmstar, LLC's Subpoena to Non-Party Alamo Group, Inc.—ECF 4-1—Exhibit 1 to Declaration of Thomas J. Leach in Support of Bazooka Farmstar, LLC's Response in Opposition to Non-Party Alamo Group, Inc.'s Motion to Quash Subpoena and Motion for Protective Order (Mar. 18, 2024 in U.S. District Court for the Western District of Texas San Antonio Division, Case No. 5:24-mc-00247-OLG).
Excerpts of File History of Reexamination of U.S. Pat. No. 11,448,224 (Reexam No. 90/019,224) including Reexamination Certificate of U.S. Pat. No. 11,448,224 issued on Feb. 2, 2024, Notice of Intent to Issue Reexamination Certificate dated Dec. 21, 2023, and Order Granting Request for Ex Partes Reexamination of U.S. Pat. No. 11,448,224 (Reexam No. 90/019,482) (EX 1006 in Ex Parte Reexamination Request dated Apr. 15, 2024 on U.S. Pat. No. 11,448,224 (Reexam No. 90/019,482).
Litigation documents related to Bazooka Farmstar, LLC's Subpoena to Non-Party Alamo Group, Inc.—ECF 4-2—UD Umwelt-Dienste GmbH Partner fer Kommunen (Exhibit 2 to Declaration of Thomas J. Leach in Support of Bazooka Farmstar, LLC's Response in Opposition to Non-Party Alamo Group, Inc.'s Motion to Quash Subpoena and Motion for Protective Order) (Mar. 18, 2024 in U.S. District Court for the Western District of Texas San Antonio Division, Case No. 5:24-mc-00247-OLG).
Litigation documents related to Bazooka Farmstar, LLC's Subpoena to Non-Party Alamo Group, Inc.—ECF 4-3—Affidavit of Nathaniel E. Frank-White of Archive.org dated Apr. 13, 2023, Archived Website of UD Umwelt-Dienste, https://web/archive.org/web/20110408010122/http:/umwelt-dienste.de:80/verwertung.htm from Apr. 8, 2011 (Exhibit 3 to Declaration of Thomas J. Leach in Support of Bazooka Farmstar, LLC's Response in Opposition to

(56) References Cited

OTHER PUBLICATIONS

Non-Party Alamo Group, Inc.'s Motion to Quash Subpoena and Motion for Protective Order) (Mar. 18, 2024 in U.S. District Court for the Western District of Texas San Antonio Division, Case No. 5:24-mc-00247-OLG).
Litigation documents related to Bazooka Farmstar, LLC's Subpoena to Non-Party Alamo Group, Inc.—ECF 4-4—Stipulated Protective Order in *Nuhn Industries Ltd* v. *Bazooka Farmstar, LLC* in U.S. District Court for the Southern District of Iowa, Case No. 3:22-cv-00015-SMR-HCA (Exhibit 2 to Declaration of Thomas J. Leach in Support of Bazooka Farmstar, LLC's Response in Opposition to Non-Party Alamo Group, Inc.'s Motion to Quash Subpoena and Motion for Protective Order) (Mar. 18, 2024 in U.S. District Court for the Western District of Texas San Antonio Division, Case No. 5:24-mc-00247-OLG).
Litigation documents related to Bazooka Farmstar, LLC's Subpoena to Non-Party Alamo Group, Inc.—ECF 4-5—Amended Schedule B (Exhibit 5 to Declaration of Thomas J. Leach in Support of Bazooka Farmstar, LLC's Response in Opposition to Non-Party Alamo Group, Inc.'s Motion to Quash Subpoena and Motion for Protective Order) (Mar. 18, 2024 in U.S. District Court for the Western District of Texas San Antonio Division, Case No. 5:24-mc-00247-OLG).
Litigation documents related to Bazooka Farmstar, LLC's Subpoena to Non-Party Alamo Group, Inc.—ECF 1—Non-Party Alamo Group, Inc.'s Motion to Quash Subpoena and Motion for Protective Order) (Mar. 11, 2024 in U.S. District Court for the Western District of Texas San Antonio Division, Case No. 5:24-mc-00247-OLG)—Part 1.
Litigation documents related to Bazooka Farmstar, LLC's Subpoena to Non-Party Alamo Group, Inc.—ECF 1—Non-Party Alamo Group, Inc.'s Motion to Quash Subpoena and Motion for Protective Order (Mar. 11, 2024 in U.S. District Court for the Western District of Texas San Antonio Division, Case No. 5:24-mc-00247-OLG)—Part 2.
Litigation documents related to Bazooka Farmstar, LLC's Subpoena to Non-Party Alamo Group, Inc.—ECF 1—Non-Party Alamo Group, Inc.'s Motion to Quash Subpoena and Motion for Protective Order (Mar. 11, 2024 in U.S. District Court for the Western District of Texas San Antonio Division, Case No. 5:24-mc-00247-OLG)—Part 3.
Litigation documents related to Bazooka Farmstar, LLC's Subpoena to Non-Party Alamo Group, Inc.—ECF 1—Non-Party Alamo Group, Inc.'s Motion to Quash Subpoena and Motion for Protective Order (Mar. 11, 2024 in U.S. District Court for the Western District of Texas San Antonio Division, Case No. 5:24-mc-00247-OLG)—Part 4.
Litigation documents related to Bazooka Farmstar, LLC's Subpoena to Non-Party Alamo Group, Inc.—ECF 1—Non-Party Alamo Group, Inc.'s Motion to Quash Subpoena and Motion for Protective Order (Mar. 11, 2024 in U.S. District Court for the Western District of Texas San Antonio Division, Case No. 5:24-mc-00247-OLG)—Part 5.
Litigation documents related to Bazooka Farmstar, LLC's Subpoena to Non-Party Alamo Group, Inc.—ECF 1—Non-Party Alamo Group, Inc.'s Motion to Quash Subpoena and Motion for Protective Order (Mar. 11, 2024 in U.S. District Court for the Western District of Texas San Antonio Division, Case No. 5:24-mc-00247-OLG)—Part 6.
Litigation documents related to Bazooka Farmstar, LLC's Subpoena to Non-Party Alamo Group, Inc.—ECF 7—Non-Party Alamo Group, Inc.'s Reply in Support of its Motion to Quash Subpoena and Motion for Protective Order (Mar. 25, 2024 in U.S. District Court for the Western District of Texas San Antonio Division, Case No. 5:24-mc-00247-OLG).
Litigation documents related to Bazooka Farmstar, LLC's Subpoena to Non-Party Alamo Group, Inc.—Non-Party Alamo Group, Inc.'s Responses and Onbjetions to Motion to Bazooka Farmstar, LLC's Subpoena to Produce Documents on or Before Mar. 4, 2024 (Feb. 29, 2024 in U.S. District Court for the Western District of Texas San Antonio Division, Case No. 5:24-mc-00247-OLG).
Bazooka Farmstar, LLC's Petition for Inter Partes Review for U.S. Pat. No. 11,491,835 dated Oct. 13, 2023 (IPR2024-0004).
Bazooka Farmstar, LLC's Petition for Inter Partes Review for U.S. Pat. No. 11,541,708 dated Nov. 3, 2023 (IPR2024-0098).
SDIA 15-ECF-85-6, Exhibit 5 Clean '708 and '835 Amended Answer to Defendant Bazooka Farmstar, LLC's Motion for Leave to File Amended Answers and Counterclaims in *Nuhn Industries Ltd* v. *Bazooka Farmstar, LLC*, U.S. District Court for the Southern District of Iowa, Case No. 3:22-cv-00015-SMR-HCA filed Jun. 28, 2023 (ECF 85-06)—Part 1.
SDIA 15-ECF-85-6, Exhibit 5 Clean '708 and '835 Amended Answer to Defendant Bazooka Farmstar, LLC's Motion for Leave to File Amended Answers and Counterclaims in *Nuhn Industries Ltd* v. *Bazooka Farmstar, LLC*, U.S. District Court for the Southern District of Iowa, Case No. 3:22-cv-00015-SMR-HCA filed Jun. 28, 2023 (ECF 85-06)—Part 2.
SDIA 15-ECF-85-6, Exhibit 5 Clean '708 and '835 Amended Answer to Defendant Bazooka Farmstar, LLC's Motion for Leave to File Amended Answers and Counterclaims in *Nuhn Industries Ltd* v. *Bazooka Farmstar, LLC*, U.S. District Court for the Southern District of Iowa, Case No. 3:22-cv-00015-SMR-HCA filed Jun. 28, 2023 (ECF 85-06)—Part 3.
SDIA 15-ECF-85-6, Exhibit 5 Clean '708 and '835 Amended Answer to Defendant Bazooka Farmstar, LLC's Motion for Leave to File Amended Answers and Counterclaims in *Nuhn Industries Ltd* v. *Bazooka Farmstar, LLC*, U.S. District Court for the Southern District of Iowa, Case No. 3:22-cv-00015-SMR-HCA filed Jun. 28, 2023 (ECF 85-06)—Part 4.
SDIA 15-ECF-85-6, Exhibit 5 Clean '708 and '835 Amended Answer to Defendant Bazooka Farmstar, LLC's Motion for Leave to File Amended Answers and Counterclaims in *Nuhn Industries Ltd* v. *Bazooka Farmstar, LLC*, U.S. District Court for the Southern District of Iowa, Case No. 3:22-cv-00015-SMR-HCA filed Jun. 28, 2023 (ECF 85-06)—Part 5.
SDIA 15-ECF-85-6, Exhibit 5 Clean '708 and '835 Amended Answer to Defendant Bazooka Farmstar, LLC's Motion for Leave to File Amended Answers and Counterclaims in *Nuhn Industries Ltd* v. *Bazooka Farmstar, LLC*, U.S. District Court for the Southern District of Iowa, Case No. 3:22-cv-00015-SMR-HCA filed Jun. 28, 2023 (ECF 85-06)—Part 6.
SDIA 15-ECF-85-7, Exhibit 6 Redline '708 and '835 Amended Answer to Defendant Bazooka Farmstar, LLC's Motion for Leave to File Amended Answers and Counterclaims in *Nuhn Industries Ltd* v. *Bazooka Farmstar, LLC*, U.S. District Court for the Southern District of Iowa, Case No. 3:22-cv-00015-SMR-HCA filed Jun. 28, 2023 (ECF 85-07).
SDIA 15—Defendant Bazooka Farmstar, LLC's Initial Invalidity Contentions (*Nuhn Industries Ltd* v. *Bazooka Farmstar, LLC*, U.S. District Court for the Southern District of Iowa, Case No. 3:22-cv-00015-SMR-HCA) Aug. 29, 2023.
SDIA 15—Defendant Bazooka Farmstar, LLC's Initial Invalidity Contentions—Ex AA—Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.
SDIA 15—Defendant Bazooka Farmstar, LLC's Initial Invalidity Contentions—Ex AB—Truxor and Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.
SDIA 15—Defendant Bazooka Farmstar, LLC's Initial Invalidity Contentions—Ex AC—Truxor and Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.
SDIA 15—Defendant Bazooka Farmstar, LLC's Initial Invalidity Contentions—Ex AD—Truxor and Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.
SDIA 15—Defendant Bazooka Farmstar, LLC's Initial Invalidity Contentions—Ex AE—SenwaTec and Yoon and Nuhn Reference of Manure Manager (*Nuhn Industries Ltd* v. *Bazooka Farmstar, LLC*,

(56) References Cited

OTHER PUBLICATIONS

U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex AF—Puck and Bryham (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex AG—Puck and Bryham and Nuhn Reference of Manure Manager (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex AH—Cheramine and Yoon or Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex AI—Carrier and Nuhn Reference of Manure Manager (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex AK—Puck and Bryham and Bennett II (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex AL—Bradley and Bryham (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex AM—Bradley and Bryham and Bennett II (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex BB—Cheramie and Yoon or Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex BC—Carrier and Nuhn Refrerence or Manure Manager (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex BD—Yoon and SenwaTec or Truxor (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex CA—Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex CB—Lyseng (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex CC—Truxor and Carrier or Yoon (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex CD—SenwaTec and Carirer or Yoon (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex CE—Puck and Bryham (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex CF—Cheramine and Yoon or Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex CG—Puck and SenwaTec (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex CH—Puck and Bryham and Bennett II (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DA—Bennett II (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DB—Truxor and Carrier or Yoon (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DC—SenwaTec and Yoon or Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DD—Cheramie and Yoon or Carrier (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DE—Bradley and Bryham (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DF—Lysenf (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DG—Grounds 2-7 and 12-14 and Nuhn Reference or Manure Manager (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DH—Grounds 2-7 and 12-14 and Fisher Pump (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DI—Puck and Bryham and Bennett II (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DJ—Bradley and Bryham (*Nuhn Industries Ltd* v. *Bazooka Farmstar, LLC*, U.S. District Court for the Southern District of Iowa, Case No. 3:22-cv-00015-SMR-HCA) Aug. 29, 2023.

SDIA 15—Defendant Bazooka Farmstar, LLC's Initial Invalidity Contentions—Ex DK—Bradley and Bryham and Bennett II (*Nuhn

(56) References Cited

OTHER PUBLICATIONS

*Industries Ltd* v. *Bazooka Farmstar, LLC*, U.S. District Court for the Southern District of Iowa, Case No. 3:22-cv-00015-SMR-HCA) Aug. 29, 2023.
SDIA 15—Defendant Bazooka Farmstar, LLC's First Supplemental Initial Invalidity Contentions (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex AP—Sundstom in view of Bennett II (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex AN—Sundstom in view of Bryham (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex AO—Sundstom in view of Bryham in view of Nuhn Reference or Manure Manger (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex AQ—Sundstom in view of Bryham and Bennett II (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex BF—Sundstom in view of Bryham (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex BG—Sundstom in view of Bennett II (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex BH—Sundstom in view of Bennett II (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex CI—Sundstom in view of Bryham (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex CJ—Sundstom in view of SenwaTec (AmphiKing or Pub) (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex CK—Sundstom in view of Bryham in view of Bennett-II (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex DL—Sundstom in view of Bryham (*Nuhn Industries Ltd* v. *Bazooka Farmstar, LLC*, U.S. District Court for the Southern District of Iowa, Case No. 3:22-cv-00015-SMR-HCA) Sep. 3, 2024.
SDIA 15—Defendant Bazooka Farmstar, LLC's First Supplemental Initial Invalidity Contentions—Ex DM—Sundstom in view of Bryham in view of Bennett II (*Nuhn Industries Ltd* v. *Bazooka Farmstar, LLC*, U.S. District Court for the Southern District of Iowa, Case No. 3:22-cv-00015-SMR-HCA) Sep. 3, 2024.
Sealegs Amphibious Rescue Craft Brochure (metadata allegedly shows date of Apr. 28, 2010) (Produced as SEA0000003 on Aug. 30, 2024 in *Nuhn Industries Ltd* v. *Bazooka Farmstar, LLC*, U.S. District Court for the Southern District of Iowa, Case No. 3:22-cv-00015-SMR-HCA).
Sealegs Amphibious Rescue Craft Brochure (2001-2011) (Produced as SEA0000011 on Aug. 30, 2024 in *Nuhn Industries Ltd* v. *Bazooka Farmstar, LLC*, U.S. District Court for the Southern District of Iowa, Case No. 3:22-cv-00015-SMR-HCA)—Part 1.
Sealegs Amphibious Rescue Craft Brochure (2001-2011) (Produced as SEA0000011 on Aug. 30, 2024 in *Nuhn Industries Ltd* v. *Bazooka Farmstar, LLC*, U.S. District Court for the Southern District of Iowa, Case No. 3:22-cv-00015-SMR-HCA)—Part 2.
TRUX0000001—Photograph of Truxor DM 5000 (metadata shows last modified date of Aug. 19, 2009) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000002—Photograph of Truxor (metadata shows date taken of Apr. 13, 2007) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000003—Photograph of Truxor DM 5000 (metadata shows date taken of May 29, 2009) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000004—Photograph of Truxor DM 5000 (metadata shows date taken of May 29, 2009) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000005—Photograph of a hose (metadata shows date taken of May 30, 2009) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000006—Photograph of Truxor DM 5000 and a hose (metadata shows date taken of May 30, 2009) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000007—Photograph of a hose (metadata shows date taken of May 30, 2009) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000008—Photograph of a hose in water (metadata shows date taken of May 30, 2009) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000009-28—Truxor T-Series Borchure (metadata shows create date of Jan. 11, 2022) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000030—Photograph of Truxor (metadata shows last modified date of Nov. 22, 2005) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000031-82—Truxor DM 5000 Manual (metadata shows create date of Nov. 23, 2009) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000125-238—Spare Parts List for Truxor DM 5000 Manual (metadata shows created date of Mar. 29, 2011) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA)—Part 1.
TRUX0000125-238—Spare Parts List for Truxor DM 5000 Manual (metadata shows created date of Mar. 29, 2011) (Produced by

(56) References Cited

OTHER PUBLICATIONS third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA)—Part 2.
TRUX0000125-238—Spare Parts List for Truxor DM 5000 Manual (metadata shows created date of Mar. 29, 2011) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA)—Part 3.
TRUX0000125-238—Spare Parts List for Truxor DM 5000 Manual (metadata shows created date of Mar. 29, 2011) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA)—Part 4.
TRUX0000242—Photograph of Truxor DM 5000 (metadata shows date taken of Sep. 16, 2011) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000243—Photograph of Truxor DM 5000 (metadata shows date taken of Sep. 16, 2011) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000248-254—Praktik for Mudderpump 2500 (metadata shows created date of May 11, 2009) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA) (with machine translation).
TRUX0000255—Email allegedly related to remote control for Truxor (allegedly dated Dec. 16, 2010) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA) (with machine-translation).
TRUX0000256-257—Scanreco Remote Control—Control Unit Maxi (metadata shows date created of Apr 6, 2010) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000258—Email allegedly related to remote control for Truxor (allegedly dated Mar. 29, 2011) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
TRUX0000259—Screenshots of Video of Truxor DM 5000 (video allegedly taken in 2011) (Produced by third-party Truxor on Sep. 4, 2024 in *Nuhn Industries Ltd* v. *Bazooka Farmstar, LLC*, U.S. District Court for the Southern District of Iowa, Case No. 3:22-cv-00015-SMR-HCA).
BAZ15_0024319-336—SenwaTec Spare Parts List (metadata shows created date of Oct. 8, 2013) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA).
BAZ15_0024347-379—Manual Amphi-King SWT-AB380 (metadata shows created date of Apr. 25, 2014) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA).
BAZ15_0024380-412—Manual Amphi-King SWT-AB380 (metadata shows created date of Sep. 25, 2013) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA).
BAZ15_0024737-738—Berky Machine Program brochure (metadata shows created date of Mar. 31, 2003) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA).
BAZ15_0024739-740—Berky Sludge-Pump Type 5980 (Nov. 2001) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA).
BAZ15_0024741-742—Berky Amphibian Boat Type 6450 brochure (Jan. 2002) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA).
BAZ15_0024745-760—Berky Company Brochure (metadata shows created date of Jun. 9, 2004) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA).
BAZ15_0025046-90—Berky Amphibious Mower and Clearing Boat Type 6460 Maintenance and Oprning Instructions—Spare Parts List / from Dec. 2006 (metadata shows created date of Aug. 8, 2006) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA) (with machine translation).
BAZ15_0025091-150—Berky Amphibious Mower and Clearing Boat Type 6460 Maintenance and Oprning Instructions—Spare Parts List / from Dec. 2005 (metadata shows created date of Jun. 14, 2006) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA) (with machine translation)—Part 1.
BAZ15_0025091-150—Berky Amphibious Mower and Clearing Boat Type 6460 Maintenance and Oprning Instructions—Spare Parts List / from Dec. 2005 (metadata shows created date of Jun. 14, 2006) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA) (with machine translation)—Part 2.
BAZ15_0025091-150—Berky Amphibious Mower and Clearing Boat Type 6470 Maintenance and Oprning Instructions—Spare Parts List / from Dec. 2006 (metadata shows created date of Sep. 26, 2006) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA) (with machine translation)—Part 1.
BAZ15_0025151-195—Berky Amphibious Mower and Clearing Boat Type 6470 Maintenance and Oprning Instructions—Spare Parts List / from Dec. 2006 (metadata shows created date of Sep. 26, 2006) (Custodian Berky GmbH, produced by Bazooka on Mar. 14, 2024 in *Nuhn Industries Ltd* v. *Bazooka Farmstar, LLC*, U.S. District Court for the Southern District of Iowa, Case No. 3:22-cv-00015-SMR-HCA) (with machine translation)—Part 2.
Office action dated Sep. 6, 2024 on U.S. Appl. No. 18/073,035.
Office action dated Aug. 26, 2024 on U.S. Appl. No. 18/331,461.
Phil's Pumping and Fabrication—Our Products (Sep. 30, 2015), http://www.philspumpingandfab.com/prod_lag_pumps.php (https://web.archive.org/web/20150930223114/http://www.philspumpingandfab.com/prod_lag_pumps.php).
Annex Publishing & Printing Inc., Manure Manager, Mar./Apr. 2009.
Annex Publishing & Printing Inc., Manure Manager, May/Jun. 2012.
Annex Publishing & Printing Inc., Manure Manager, Jul./Aug. 2012.
Annex Publishing & Printing Inc., Manure Manager, Jan./Feb. 2013.
Petitioner's Redacted Reply to Patent Owner's Response in Inter Partes Review of U.S. Pat. No. 11,491,835 (Oct. 1, 2024) (Paper 35 in IPR2024-00004) (Public—Redacted).
USDA Dairy Forage Research Center et al., North American Manurexpo Professional Manure Management (2012) (EX1087 in IPR2024-00004).

(56) References Cited

OTHER PUBLICATIONS

Declaration of Eric S. Winkel in Support of Petitioner's Reply to the Patent Owner's Response in Inter Partes Review of U.S. Pat. No. 11,491,835, Dated Oct. 1, 2024 (EX1110 in IPR2024-00004) (Public—Redacted).
Declaration of Eric S. Winkel in Support of Petitioner's Opposition to Patent Owner's Motion to Amend in Inter Partes Review of U.S. Pat. No. 11,491,835, Dated Oct. 1, 2024 (EX1111 in IPR2024-00004).
Declaration of Benny D. Puck, Dated Aug. 28, 2024 (EX1121 in IPR2024-00004).
Screenshots of EX1123 in IPR2024-00004—Puck Enterprises, Inc., Puck Lagoon Agitation Boat and MobileStar Pump Control, YouTube (Dec. 28, 2011), https://www.youtube.com/watch?v=cMplzZ6IRYE (referred to as "Exhibit B" in EX1121).
Screenshots of EX1125 in IPR2024-00004—Puck Enterprises, Inc., Puck Agitation Boat—Ben Puck, YouTube (Jul. 29, 2011), https://www.youtube.com/watch?v=gfNO0bi0uk0 (referred to as "Exhibit D" in EX1121).
Screenshots of EX1126 in IPR2024-00004—Puck Enterprises, Inc., Puck Agitation Boat—Front Cannon 8.39.11, YouTube (Sep. 9, 2011), https://www.youtube.com/watch?v=4whiyZZ9N3s (referred to as "Exhibit E" in EX1121).
Between, merriam-webster.com, http://www.web.archive.org/20130518001225://https://www.merriam-webster.com/dictionary/between (EX1121 in 2024-00004), 2013.
Casappa Polaris Gear Pump, OneHydraulics (Oct. 1, 2024), https://www.onehydraulics.com/products/plp20-9s0-03s1-loc-oc-nel-casappa-polaris-gear-pump-9-17cc-3625psi-rated-3500rpm-ccw9t-16-32dp-shaft-sae-a-2-bolt-flange-0-625-5-8-10-sae-inlet-0-625-5-8-10-sae-outlet-alumin-bodyflange?srsltid=AfmBOopjmhYtBYy5xJF7u8DVhJ3cHsySDL9fFmys59ZKHW7e2sreRGC (EX1135 in IPR2024-00004).
Metalcraft Marine Incorporated, Firestorm 30 With Outboards (2004) (EX1136 in IPR2024-00004).
ABYC, H-27 Seacocks, Thru-Hull Fittings, and Drain Plugs (2021) (EX1139 in IPR2024-00004).
ABYC, Cathodic Protection (2021) (EX1140 in IPR2024-00004).
Redi-Prime® Venturi Prime, Cornell Pump CO. (2013), http://www.cornellpump.com/lit/brochure/BR_REDIPRIME.pdf [https://web.archive.org/web/cornellpump.com/lit/brochure/BR_REDIPRIME.pdf] (EX1143 in IPR2024-00004)
Screenshots from Nihn Indus., Ltd., Nuhn Lagoon Crawler X, YouTube (Jun. 3, 2021), https://www.youtu.be.com/hzzEOqCRdh0 (EX1155 in IPR2024-00004).
Sundstrom's Pit Pumping, LLC., http://www.sundstrompitpumping.com/ (last visited Oct. 1, 2024) (EX1156 in IPR2024-00004).
Petitioner's Opposition to Patent Owner's Motion to Amend in Inter Partes Review of U.S. Pat. No. 11,491,835 (Oct. 1, 2024) (Paper 37 in IPR2024-00004) (Public—Redacted).
Declaration of Ansgar Lonnemann, dated Sep. 23, 2024 (German) (EX1138 in IPR2023-01161).
Declaration of Ansgar Lonnemann, dated Sep. 23, 2024 (English translation) (EX1139 in IPR2023-01161).
Petitioner's IPR Hearing Demonstratives (Public version) (Oct. 14, 2024) (EX1140 in IPR2023-01161)—Part 1.
Petitioner's IPR Hearing Demonstratives (Public version) (Oct. 14, 2024) (EX1140 in IPR2023-01161)—Part 2.
Petitioner's IPR Hearing Demonstratives (Public version) (Oct. 14, 2024) (EX1140 in IPR2023-01161)—Part 3.
Petitioner's Demonstratives Opposition to Patent Owner's Motion to Amend—Oral Argument (Oct. 14, 2024) (EX1141 in IPR2023-01161).
Petitioner's Demonstratives regarding Motions to Exclude—Oral Argument (Oct. 14, 2024) (EX1142 in IPR2023-01161).
Patent Owner's IPR Hearing Demonstratives—Oral Argument (Oct. 8, 2024) (EX2104 in IPR2023-01161).
Patent Owner's Motion to Exclude Demonstratives—Oral Argument (Oct. 8, 2024) (EX2105 in IPR2023-01161).
Patent Owner's Motion to Amend Demonstratives—Oral Argument (Oct. 8, 2024) (EX2105 in IPR2023-01161).
Preliminary Guidance on Patent Owner's Motion to Amend the IPR of U.S. Pat. No. 11,491,835 (Paper 39 in IPR2024-00004) (Oct. 15, 2024).
Alberta Agriculture and Food Nutrient Management Planning Guide for Alberta (Jan. 1, 2008).
SDIA 15—ECF 217—Court's Order Denying Defendant's Motion for Judgement on the Pleadings, Plaintiff's Motion to Dismiss; and Granting Defendant's Motion to Amend/Correct (*Nuhn Industries Ltd v. Bazooka Farmstar, LLC*, U.S. District Court for the Southern District of Iowa, Case No. 3:22-cv-00015-SMR-HCA) Sep. 19, 2024.
Bazaooka Farmstar, LLC's Request for Ex Parte Reexamination of U.S. Appl. No. 11/448,224—Reexam No. 90/019,224, dated Jun. 30, 2023—Part 2.
Bazaooka Farmstar, LLC's Request for Ex Parte Reexamination of U.S. Appl. No. 11/448,224—Reexam No. 90/019,224, dated Jun. 30, 2023—Part 3.
Litigation documents related to Bazooka Farmstar, LLC's Subpoena to Non-Party Alamo Group, Inc.—ECF 4-2—UD Umwelt-Dienste GmbH Partner der Kommunen (Exhibit 2 to Declaration of Thomas J. Leach in Support of Bazooka Farmstar, LLC's Response in Opposition to Non-Party Alamo Group, Inc.'s Motion to Quash Subpoena and Motion for Protective Order (Mar. 18, 2024 in U.S. District Court for the Western District of Texas San Antonio Division, Case No. 5:24-mc-00247-OLG).
Patent Owner's Sur-Reply in Support of Patent Owner's Response in IPR of U.S. Pat. No. 11,358,425 (Paper 49 in IPR2023-01161) (Sep. 5, 2024).
Petitioner's Sur-Reply in Opposition to Patent Owner's Motion to Amend in IPR of U.S. Pat. No. 11,358,425 (Paper 52 in IPR2023-01161) (Pulic version Redacted) (Sep. 17, 2024).
Declaration of Douglas S. Prairie in Support of Petitioner's Revised Motion to Amend in IPR for U.S. Pat. No. 11,491,835 (EX2099 in IPR2024-00004) (Nov. 12, 2024).
Patent Owner's Sur-Reply in Support of Patent Owner's Response in IPR of U.S. Pat. No. 11,491,835 (Paper 40 in IPR2024-00004) (Nov. 12, 2024).
Patent Owner's Revised and Conditional Motion to Amend in IPR of U.S. Pat. No. 11,491,835 (Paper 42 in IPR2024-00004) (Nov. 12, 2024).
Main Post, Gequirlter Klarschlamm Oct. 15, 2010 (EX1073 in IPR2024-00098).
Declaration of Eric Winkel, Dated Nov. 12, 2024 (Redacted) (EX1079 in IPR2024-00098) (Nov. 12, 2024).
Preliminary Amendment of U.S. Appl. No. 18/073,035, filed Sep. 7, 2023 (EX1079 in IPR2024-00098).
Brian Trompeter, Company Hopes Amphibian Unit Will Be Game Changer in Emergency Repsonse, INSIDENOVA (Feb. 9, 2012), https://www.insidenova.com/news/arlington/company-hopesamphibian-unit-will-be-game-changer-in-emergency-repsonse/article_2ed36532-078d-598208fec-75dd7a15042f.html (EX1119 in IPR2024-00098).
Mike Hanlon, Humdinga—The 4WD amphibious vehicle, New Atlas (Jan. 20, 2004), https://new atlas.com/humdinga-the-4wd-amphibiousvehicle/2823/ (EX1120 in IPR2024-00098).
U.S. War Dep't, TM 9-802 Truck, Aphibian, 2½ ton, 6×6 GMC DUKW-353, 1942 (1947) (EX1121 in IPR2024-00098).
Cavity, Merriam-Webster, https://www.merriamwebster.com/dictionary/cavity (last vistied Nov. 6, 2024) (EX1123 in 2024-00098).
Air—Density vs. Pressure and Temperature, Eng'Toolbox, https://www.engineeringtoolbox.com/air-temperature-pressuredensity-d_771.html (last vistied Nov. 6, 2024) (EX1124 in 2024-00098).
Water Science School Water Density, USGS (Jun. 5, 2018), https://www.usgs.gov/special-topics/water-scienceschool/science/waterdensity#:~:text=In%20practical%20terms%2C%20density%20is,cube s%20float%20in%20%your%20glass (EX1125 in 2024-00098).
Anatomy of a Tire, P2 Infohouse, (Nov. 6, 2024), https://p2infohouse.org/ref/11/10504/html/intro/tire.htm (EX1126 in 2024-00098).
Raul Lutas, What is the Density of Steel?, Buy Beam: Steel Beams (Sep. 26, 2022), https://buyabeam.com/steel-beams/whatmakes-steel-so-dense/ (EX1127 in 2024-00098).

(56) References Cited

OTHER PUBLICATIONS

Val S. Lobanoff & Robert R. Ross, Centrifugal Pumps: Design & Application (2nd ed. 1992) (EX1130 in 2024-00098).
Paul M. Mayer et al., Where the rubber meets the road: Emerging environmental impacts of tire wear particles and their chemical cocktails, 927 Sci. Total Env't 171153 (Jun. 1, 2024), https://doi.org/10/1016/j.scitotenv.2024.171153 (EX1132 in IPR2024-00098).
Reply to Patent Owner Response in Inter Partes Review of U.S. Pat. No. 11,541,708 (Redacted) (Paper 30 in IPR2024-00098) (Nov. 6, 2024).
PUCK0000045, 46, 47, 55, 56—Photographs Produced by Puck Custom Enterprises (metadata shows image taken dates of Sep. 16, 2006, Sep. 27, 2006, and Oct. 25, 2006) (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
PUCK0000004, 43, 44, 53—Photographs Produced by Puck Custom Enterprises (metadata shows image taken dates of Nov. 1, 2010 and Nov. 2, 2010) (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
PUCK0000100-112—Photographs Produced by Puck Custom Enterprises (metadata shows image taken date of Jan. 17, 2011) (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
PUCK0000001, 2, 3, 36-42, 50, 51, 113-121—Photographs Produced by Puck Custom Enterprises (metadata shows image taken date of Jan. 21, 2011) (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
PUCK0000048, 58, 122-124, 126—Photographs Produced by Puck Custom Enterprises (metadata shows image taken dates of Mar. 21, 2011, Apr. 6, 2011, and Apr. 16, 2011) (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
PUCK0000060-62, 65-68, 129-139—Photographs Produced by Puck Custom Enterprises (metadata shows image taken date of Mar. 7, 2013) (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA)—Part 1.
PUCK0000063, 64, 69-76, 140-147—Photographs Produced by Puck Custom Enterprises (metadata shows image taken dates of Mar. 7, 2013) (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA)—Part 2.
PUCK0000077—Puck Agitation Boat Operators Manual 2011 (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
PUCK0000098—Puck Agitation Boats Brochure (metadata shows image taken date of Sep. 27, 2013) (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
PUCK0000005—Puck Agitation Boat Operators Manual (last revision date of Aug. 10, 2022) (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
Screenshots of PUCK0000054—Boat4010_MVI_5313.MOV (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
Screenshots of PUCK0000057—MVI_8629.MOV (Produced by third-party Puck Custom Enterprises on Nov. 13, 2024 in *Nuhn Industries Ltd v. Bazooka Farmstar, LLC*, U.S. District Court for the Southern District of Iowa, Case No. 3:22-cv-00015-SMR-HCA).
Effective Pond Clearance Procedures of UD Umwelt-Dienste GmbH (German) (metadate shows create date of Apr. 3, 2008) (Produced on Oct. 21, 2024 in *Nuhn Industries Ltd v. Bazooka Farmstar, LLC*, U.S. District Court for the Southern District of Iowa, Case No. 3:22-cv-00015-SMR-HCA).
Effective Pond Clearance Procedures of UD Umwelt-Dienste GmbH (English Machine Translation) (metadata shows create date of Apr. 3, 2008) (Produced on Oct. 21, 2024 in *Nuhn Industries Ltd v. Bazooka Farmstar, LLC*, U.S. District Court for the Southern District of Iowa, Case No. 3:22-cv-00015-SMR-HCA).
Final Written Decision in IPR of U.S. Pat. No. 11,491,835 (Paper 71 in IPR2024-00004) (Apr. 14, 2025).
Office Action mailed on Apr. 14, 2025 in the Merged Reexaminations of U.S. Pat. No. 10,974,557 (Reexam Nos. 90/019,258, 90/019,290, 90/019,302, and 90/019,428).
Lemmenes Custom Farms LLC, Facebook posts allegedly dated Jul. 27, 2013 and Aug. 2, 2013 (captured on Apr. 16, 2025, https://www.facebook.com/photo/?fbid=448370818595379&set=a.448370618595399, https://www.facebook.com/photo/?fbid=448370818595359&set=a.448370618595399, https://www.facebook.com/photo/?fbid=45099904833255&set=a.448370618595399.
Lemmenes Custom Farms LLC, Facebook posts allegedly dated Mar. 24, 2013 (captured on Apr. 16, 2025, https://www.facebook.com/photo/?fbid=396903697075425&set=pb.1000429856159.-2207520000, https://www.facebook.com/222075141224949/photos/pb.1000429856159.-2207520000/397011127065682/type=3).
Lemmenes Custom Farms LLC, Facebook posts allegedly dated Jul. 27, 2013 (printed on Apr. 30, 2025, https://www.facebook.com/photo/?fbid=448370818595379&set=a.260527397379723.
Lemmenes Custom Farms LLC, Facebook posts allegedly dated Aug. 2, 2013 (printed on Apr. 30, 2025, https://www.facebook.com/photo/?fbid=450999191665875&set=a.448370618595399.
Lemmenes Custom Farms LLC, Facebook posts allegedly dated Jul. 3, 2014 (printed on Apr. 30, 2025, https://www.facebook.com/photo/?fbid=450999191665875&set=a.448370618595399.
Popular Science, 100 Best Innovations of the Year (Dec. 2010) (Produced by Bazooka as BAZ15_0246916-BAZ15_0247039 on Apr. 28, 2025) (see Cover and p. 85).
Office Action mailed on Apr. 17, 2025 in the Reexamination of U.S. Pat. No. 11,448,224 (Reexam Nos. 90/019,482).
Final Written Decision in IPR of U.S. Pat. No. 11,541,708 (Paper 49 in IPR2024-00098) (May 5, 2025).

* cited by examiner

AMPHIBIOUS PUMPING VEHICLE

CROSS-REFERENCE TO RELATED APPLICATIONS

This application is a continuation of U.S. patent application Ser. No. 17/886,130 filed Aug. 11, 2022, which is a continuation of U.S. patent application Ser. No. 17/201,100 filed Mar. 15, 2021 now issued under U.S. Pat. No. 11,491,835 on Nov. 8, 2022, which is a continuation of U.S. patent application Ser. No. 16/891,627 filed Jun. 3, 2020 now issued under U.S. Pat. No. 10,974,557 on Apr. 13, 2021, which is a continuation of U.S. patent application Ser. No. 16/157,950, filed Oct. 11, 2018 now issued under U.S. Pat. No. 10,710,422 on Jul. 14, 2020, which is a continuation of U.S. patent application Ser. No. 15/586,493 filed May 4, 2017, now issued under U.S. Pat. No. 10,124,638 on Nov. 13, 2018, which is a continuation of U.S. patent application Ser. No. 15/044,905 filed Feb. 16, 2016 now issued under U.S. Pat. No. 9,694,636 on Jul. 4, 2017, which is a continuation of international patent application PCT/CA2014/050789, filed Aug. 18, 2014, which claims the benefit of U.S. patent application 61/867,598 filed Aug. 19, 2013, the entire contents of which are herein incorporated by reference.

TECHNICAL FIELD

The invention relates to pumps and vehicles equipped for pumping. In particular, the invention relates to manure pumps and amphibious vehicles equipped for pumping liquid manure, such as animal manure contained in a farm lagoon.

BACKGROUND

Manure produced during animal husbandry, particularly hog and cattle manure, is transferred by washing to a pit or lagoon for storage prior to removal for land application or further processing. During storage, a crust can develop on the surface of the pit or lagoon that must be disrupted prior to or during removal of the manure. Pumps are employed for this purpose with jets that return a percentage of the manure back to the pit or lagoon in the form of a high volume spray to disrupt the crust and recirculate the manure. Pumps for use in recirculating manure from smaller pits are known; however, these pumps are typically suitable for accessing the pit or lagoon from its edge and are connected to a tractor or similar land vehicle for operational power. They are therefore limited in their ability to recirculate manure to the middle of large lagoons, which are becoming increasing common as the size of animal husbandry operations increases.

Accordingly, there is a need for improved pumps and vehicles equipped for pumping, particularly pumps and vehicles suitable for use with large manure lagoons.

SUMMARY OF THE INVENTION

According to the invention, there is provided an amphibious pumping vehicle comprising: a floatable vehicle body; ground engaging propulsion structure configured to raise and lower relative to the vehicle body; a fluid pump; a first fluid nozzle configured to direct fluid through the air, the fluid nozzle connected by a fluid conduit to the fluid pump; and, a power source configured to provide power to both the ground engaging propulsion structure and the fluid pump.

The floatable vehicle body may be in the shape of a mono-hull, a catamaran or a barge. Floatation of the vehicle body may be provided by a displacement hull, pontoon elements, or buoyant elements, for example foam filled buoyant chambers, such as are used for supporting floating docks. The vehicle body may be made using a variety of suitable materials, for example, fiberglass, aluminum, plastics, steel, etc.

The ground engaging propulsion structure may comprise ground engaging elements of the type suitable for powering a vehicle across wet or muddy terrain. For example, the ground engaging propulsion structure may comprise an endless track or a set of wheels. The set of wheels may comprise two or more wheels, for example four wheels, six wheels or eight wheels. May be provided in pairs with one wheel of each pair disposed on opposite sides of the vehicle. When the vehicle comprises a set of wheels, any number of the wheels may be driven in order to provide propulsion for the vehicle. Although at least two wheels may be driven, it is preferred that at least four wheels are driven. Although the vehicle may be provided with steering structure configured to change direction of one or more pairs of wheels, it is preferred that the wheels are independently driven at variable speeds, allowing them to be fixed in direction relative to the vehicle body. This provides directional control of the vehicle, even in wet or muddy conditions where conventional steering is likely to be ineffective due to sliding of the steerable set of wheels. A variety of drive mechanisms may be used to operate the wheels independently at variable speed; for example, at least one motor may be connected to each wheel that is hydraulically or electrically operable at variable speed. A transmission may alternatively be provided with structure configured to allow each wheel to be operated at variable speeds.

The ground engaging propulsion structure is configured to raise and lower relative to the vehicle body. Raising and lowering may be provided by telescoping structure or lever structure configured to pivot relative to the vehicle body. The lever structure may comprise a linear actuator that is driven, for example hydraulically, to cause pivoting of the lever arm relative to the vehicle body and thereby raise or lower the wheels. Each wheel is preferably raised or lowered at the same time. Alternatively, the lever structure may comprise a planetary drive that is either mechanically or hydraulically powered to cause pivoting of the lever arm.

The vehicle further comprises a power source configured to provide power to both the ground engaging propulsion structure and the fluid pump. The power source may be self-contained on the vehicle or may be linked to shore. For example, the power source may comprise an internal combustion engine, a fuel-cell, electric batteries, etc. The power source may comprise an electric motor that may be driven from shore via an electrical cable. The power source may be connected to a generator for supplying electrical power to electrical systems on board the vehicle. The power source may be connected to a hydraulic pump for supplying hydraulic fluid pressure to hydraulic systems on board the vehicle. The power source may be connected to the fluid pump hydraulically, electrically, or via a mechanical drive. A single power source may be used to provide power to all vehicle systems, including the fluid pump. In one embodiment, the power source is an internal combustion engine that is connected to the fluid pump and a hydraulic pump via a mechanical drive. The mechanical drive may comprise a gearbox to provide an appropriate rotational speed for the fluid pump. The mechanical drive may comprise a gearbox to provide an appropriate rotational speed for the hydraulic pump. The fluid pump and hydraulic pump may be operated at the same or different rotational speeds.

The fluid pump may comprise a pump housing configured for immersion within the fluid. The pump housing may comprise a bottom fluid inlet and at least two tangential fluid outlets. A greater number of tangential fluid outlets may be provided, for example three fluid outlets. The tangential fluid outlets may be combined into a single fluid conduit for directing the combined output of the fluid pump to a desired location. The vehicle may comprise structure configured to cause raising and lowering of the fluid pump, especially the fluid pump housing, relative to the vehicle body. For example, a hydraulically or electrically driven linear actuator may be provided on the vehicle and configured to raise and lower the fluid pump. This may be accomplished via a telescoping structure or a lever structure of the vehicle. The tangential fluid outlets may be equipped with flexible or telescoping connections to the single fluid conduit. Lowering the fluid pump for immersion into the fluid obviates the need for priming the fluid pump, which can be problematic when the fluid is manure comprising solid materials that can plug the pump or priming structure. Immersion of the pump also simplifies intermittent operation of the pump, due to eliminating potential loss of prime, and reduces the need for pump maintenance.

The vehicle comprises a first fluid nozzle configured to direct fluid through the air. The fluid nozzle is connected by fluid conduit to the fluid pump. The fluid conduit connecting the fluid nozzle to the fluid pump may comprise the single fluid conduit that is connected to the tangential fluid outlets of the pump. The vehicle may further comprise a plurality of fluid nozzles comprising the first fluid nozzle and at least one second fluid nozzle connected to the fluid conduit. The first fluid nozzle may comprise a front nozzle and the second fluid conduit may comprise the rear nozzle or a pair of rear nozzles. The plurality of fluid nozzles may comprise at least two side fluid nozzles on opposite sides of vehicle connected to the fluid conduit. The at least two side fluid nozzles may comprise a pair of fluid nozzles on opposite sides of the vehicle connected to the fluid conduit; thus, the at least two side fluid nozzles may comprise a total of four fluid nozzles. The vehicle may further comprise valve structure configured to proportion fluid flow between the plurality of fluid nozzles. The valve structure may comprise a valve corresponding to each fluid nozzle. The valve corresponding to each fluid nozzle may be actuatable, for example hydraulically or electrically. The valve structure may be actuatable remotely.

The plurality of fluid nozzles and the valve structure may cooperate to provide directional control, motive power, or a combination thereof for the vehicle when floating. For example, by closing valve structure associated with the fluid nozzle(s) on the right side of the vehicle, fluid flow is directed to the nozzle(s) on the left side of the vehicle, causing the vehicle to turn to the right. In one embodiment, steering is achieved solely by cooperation of the plurality of fluid nozzles and the valve structure; accordingly, the vehicle does not comprise a rudder. In one embodiment, movement of the vehicle while floating is achieved solely by cooperation of at least the second fluid nozzle and the valve structure; accordingly, the vehicle does not comprise a propeller.

One or more fluid nozzles may comprise adjustment structure that is powered and configured to adjust an angle of the fluid nozzle relative to the floatable vehicle body. For example, the first fluid nozzle may comprise first adjustment structure and the second fluid nozzle(s) may comprise second adjustment structure, each adjustment structure configured to adjust an angular orientation of its respective fluid nozzle(s) in a vertical and/or horizontal plane. In one embodiment, both the first fluid nozzle and the second fluid nozzle(s) are adjustable in a vertical plane. The second fluid nozzle(s) is/are adjustable in the vertical plane by an amount sufficient to cause forward or backward movement of the vehicle when floating. In other words, the second fluid nozzle(s) is/are adjustable to point at least partially toward the front of the vehicle at least partially toward the rear of the vehicle. The second fluid nozzle(s) may be configured to direct fluid through the air in a substantially downward direction. The first fluid nozzle may be configured to direct fluid through the air in a substantially upward direction. The side fluid nozzle(s) may be configured to direct fluid through the air in a substantially downward direction. One or more side fluid nozzle(s) may comprise adjustment structure configured to adjust an angular orientation of its respective side fluid nozzle(s) in a vertical plane.

The location of at least the ground engaging propulsion structure, the power source and the fluid pump may be selected to provide a desired location for a center of gravity of the vehicle. The desired location for the center of gravity of the vehicle may be selected to improve handling characteristics of the vehicle while floating. The center of gravity may be located along the longitudinal centerline of the vehicle. The center of gravity may be located substantially in the middle of the vehicle, for example at an intersection of longitudinal centerline of the vehicle and the transverse centerline of the vehicle. The center of gravity may be located rearward of the transverse centerline of the vehicle. The center of gravity may be located forward of the transverse centerline of the vehicle. Thus the ground engaging propulsion structure, power source, and fluid pump cooperate together to improve handling characteristics of the vehicle.

The vehicle may comprise remote control structure configured to cause the vehicle to be remotely controllable by an operator remote from the vehicle. The vehicle may be remotely controllable by an operator remote from the vehicle when the vehicle is ground engaging and when the vehicle is floating. The remote control structure may comprise a wireless transmitter and a wireless receiver. The remote control structure may be configured to control the speed and or direction of the vehicle when ground engaging and when floating. The remote control structure may be configured to control an amount of fluid flow from at least the first nozzle. The remote control structure may be configured to control an angular orientation of at least the first nozzle relative to the vehicle body. The remote control structure may be configured to control an amount of fluid flow from at least the second nozzle(s). The remote control structure may be configured to control an angular orientation of at least the second nozzle(s) relative to the vehicle body. The remote control structure may be configured to control the valve structure in order to proportion fluid flow between the plurality of fluid nozzles. The remote control structure may be configured to control rotational speed of the fluid pump. The remote control structure may be configured to raise and lower the fluid pump. The remote control structure may be configured to raise and lower the ground engaging propulsion structure. The remote control structure may be configured to start and stop the power source.

Further features of the invention will be described or will become apparent in the course of the following description.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION

Figure 1:
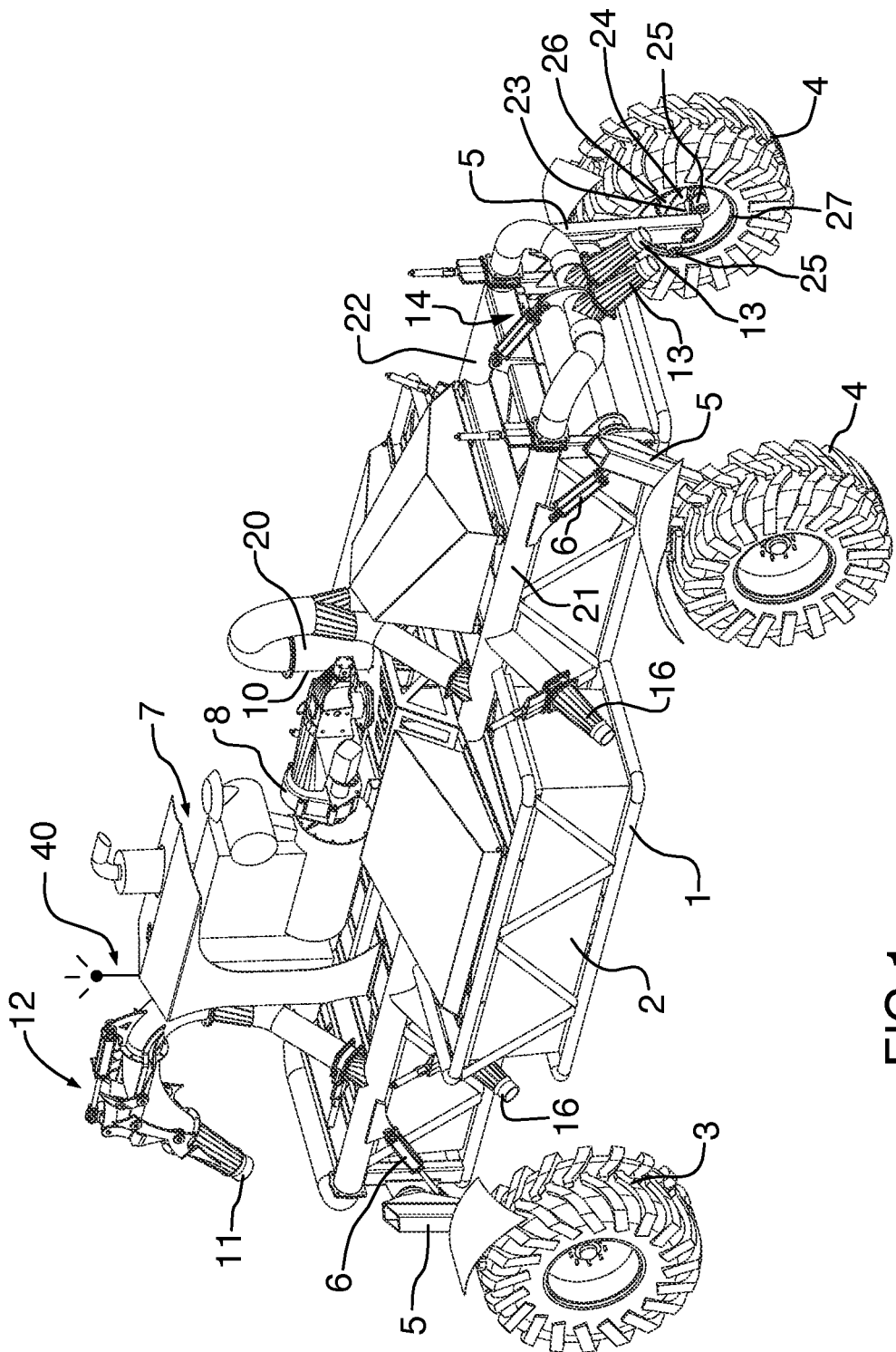
FIG. 1 shows a perspective view of an embodiment of the vehicle with wheels lowered.

In describing the figures, like features are referred to by like reference numerals. Although not all features indicated on a particular drawing are necessarily described with reference to that drawing, all of the features are described with reference to at least one of the drawings.

Figure 2:
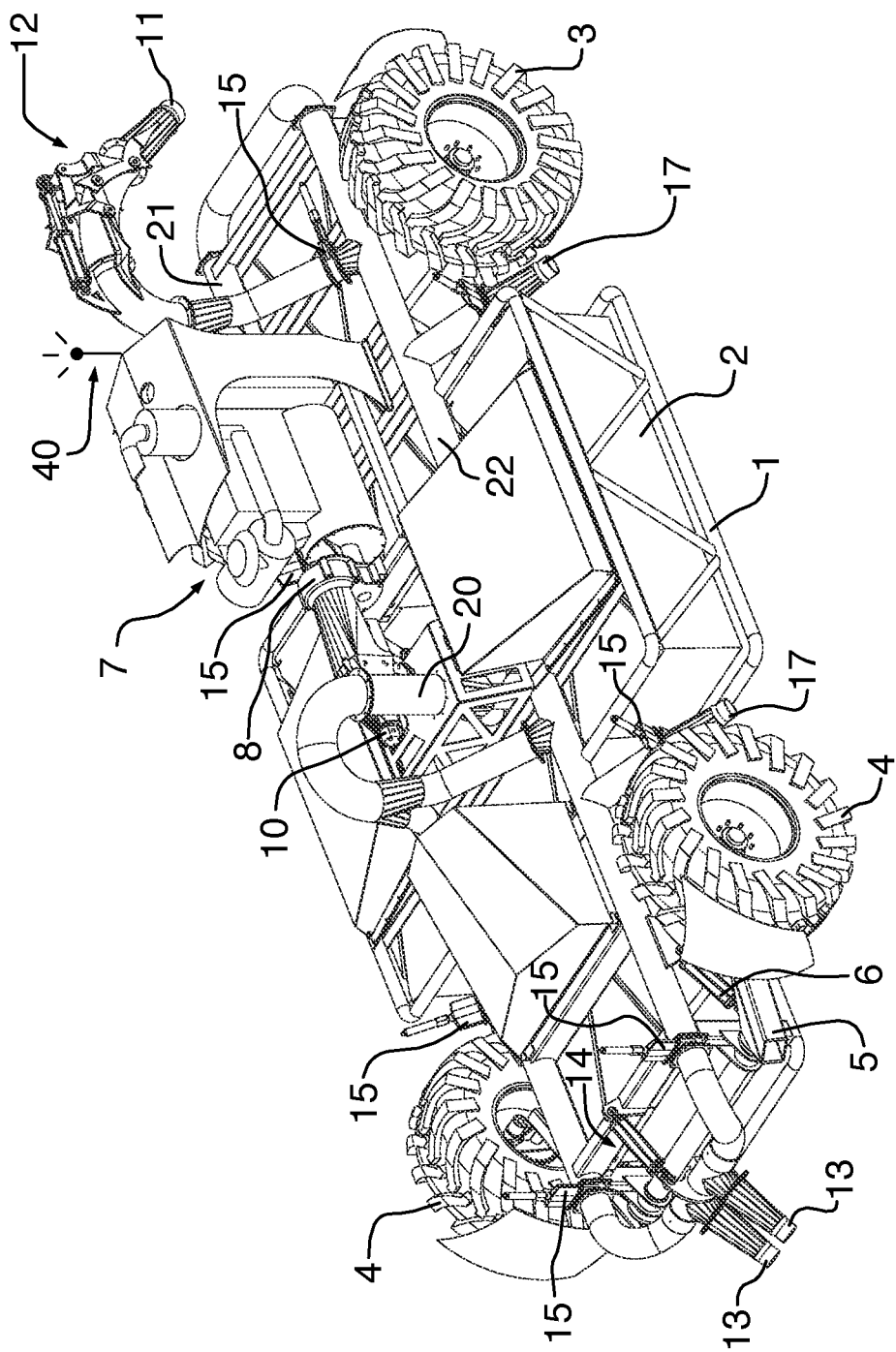
FIG. 2 shows another perspective view of the vehicle with wheels raised.
Figure 3:
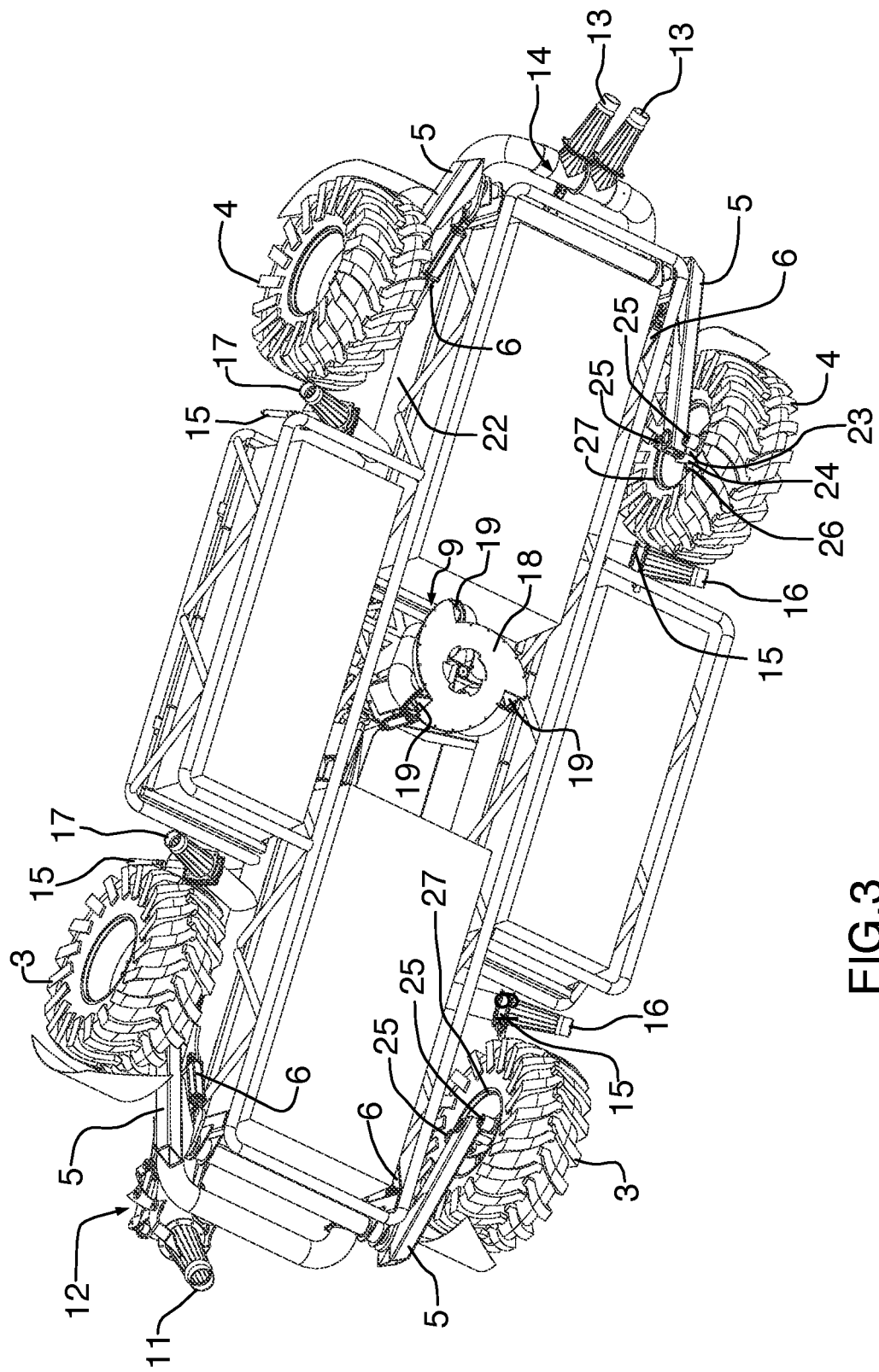
FIG. 3 shows a perspective view of the underside of the vehicle.

Referring to FIGS. 1-3, an amphibious vehicle comprises a vehicle body 1 incorporating buoyant elements 2. The buoyant elements comprise flotation tanks of the type that may be foam filled and used, for example, in the construction of floating docks. The vehicle comprises a ground engaging propulsion structure comprising two sets of wheels 3, 4. Each wheel is rotatably mounted to lever structure 5 that is pivotally attached to the vehicle body. Each lever structure 5 is driven by a hydraulic actuator 6 that is operable to cause raising and lowering of the wheels 3, 4 by pivoting of the lever structure 5. A power source 7 comprising an internal combustion engine, for example a diesel engine, is mounted to the vehicle body. A mechanical drive 8 connects the power source 7 to the fluid pump 9 and a hydraulic pump 10 that is used to provide hydraulic system fluid pressure for the vehicle.

The fluid pump 9 comprises a pump housing 18 with three tangential fluid outlets 19 that are combined into a single fluid conduit 20. The single fluid conduit 20 is then split into left side 21 and right side 22 fluid conduits which connect at the front and rear of the vehicle to form a complete circuit. The fluid pump 9 is thus fluidically connected to all fluid nozzles of the vehicle via the fluid conduits 20-22.

A first fluid nozzle 11 is provided at a front of the vehicle. The first fluid nozzle 11 comprises first articulation means 12 that is hydraulically powered to cause the nozzle to change angular orientation relative to the vehicle body 1 in a vertical plane. A pair of second fluid nozzles 13 is provided at a rear of the vehicle. The second fluid nozzles 13 comprise a second articulation means 14 that is hydraulically powered to cause the nozzles to change angular orientation relative to the vehicle body 1 in a vertical plane. The first and second fluid nozzles are part of a plurality of fluid nozzles of the vehicle. The plurality of fluid nozzles further comprises side fluid nozzles 16, 17 on opposite sides of the vehicle. A pair of left side fluid nozzles 16 and a pair of right side fluid nozzles 17 are provided.

Valve structure comprising a valve 15 corresponding to each fluid nozzle 11, 13, 16, 17 is also provided. The valves 15 are powered and operable to open or close. The valves 15 may be opened fully or partially to proportion flow between the plurality of fluid nozzles. Cooperation between the valves 15 and the plurality of fluid nozzles is used to provide directional control and motive power for the vehicle while floating. For example, proportioning fluid flow from the right side fluid nozzles 17 to the left side fluid nozzles 16 causes the vehicle to turn to the right will floating. Similarly, fluid flow may be proportioned between the first fluid nozzle 11 and the second fluid nozzles 13 to cause the vehicle to move forward or backward. By rotating the second fluid nozzles 13 fully downwardly and then up toward the front of the vehicle using the second articulation means 14, the vehicle may also be directed rearward and/or slowed in its forward movement speed. Thus, the combination of proportioning flow between the plurality of fluid nozzles using the valve structure and/or articulating the nozzles may be used to control forward, rearward, left and right movement and speed of the vehicle. The flow rate of the fluid pump 9 may also be adjusted to enhance directional and speed control via the plurality of nozzles while floating.

Figure 4:
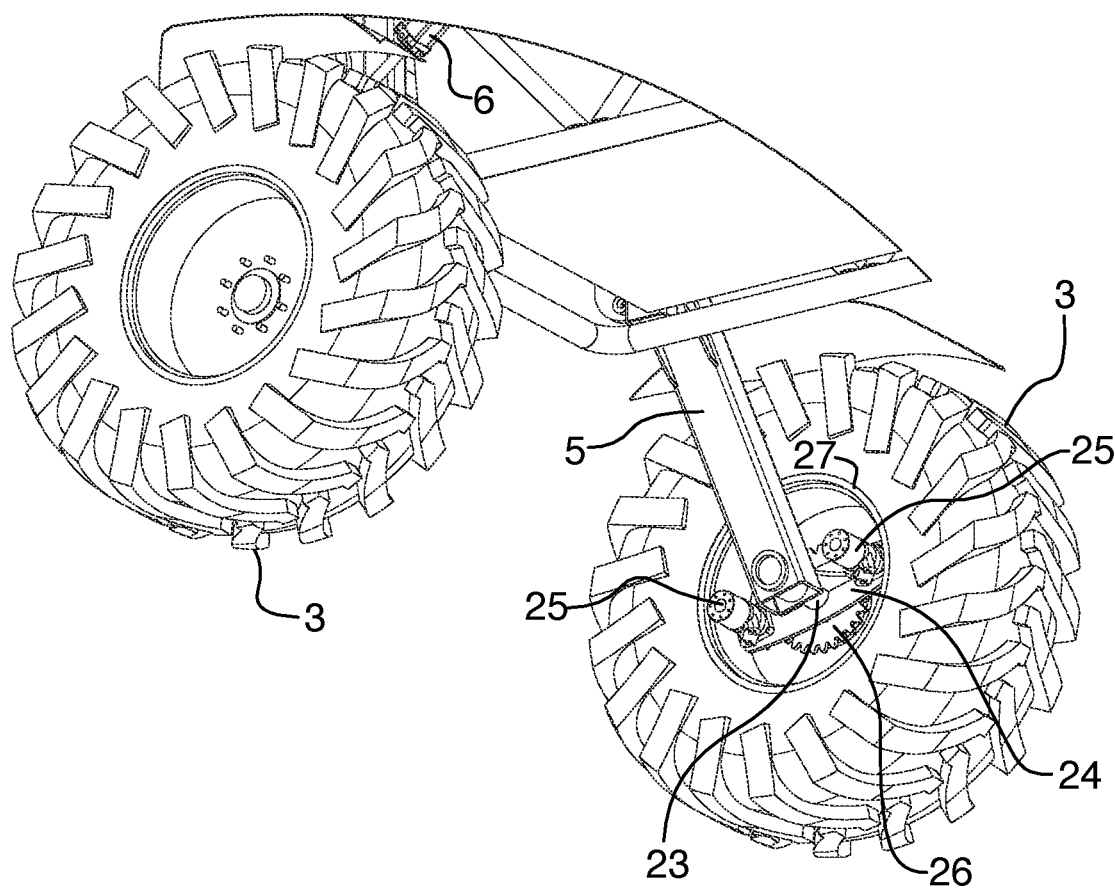
FIG. 4 shows a perspective view of a set of wheels of the vehicle from the underside of the vehicle.

Referring additionally to FIG. 4, each wheel of the front set of wheels 3 is rotatably attached to its corresponding lever 5 by a spindle 23. Fixedly mounted to lever 5 is a bracket 24 supporting a pair of hydraulic motors 25. Each hydraulic motor 25 has an output gear (not shown) that is engaged with a drive gear 26. The drive gear 26 is fixedly attached to a rim 27 of each wheel 3 concentric with the spindle 23. Referring to the right side wheel of the set of wheels 3 (showing an interior of the rim 27), operation of the hydraulic motors 25 in a clockwise direction causes the drive gear 26 to rotate in a counterclockwise direction, moving the vehicle forward. Reversing the direction of operation of the hydraulic motors 25 causes the vehicle to move rearward. By increasing the rotational speed of the hydraulic motors 25 on the right side relative to the motors 25 on the left side, the vehicle is caused to turn to the left. The motors 25 connected to the rear set of wheels 4 work in a similar manner to those described for the front set of wheels 3. Thus, directional and motive control of the vehicle (forward/reverse) while on land is controlled by varying the relative speed and rotational direction of the hydraulic motors 25.

Figure 5:
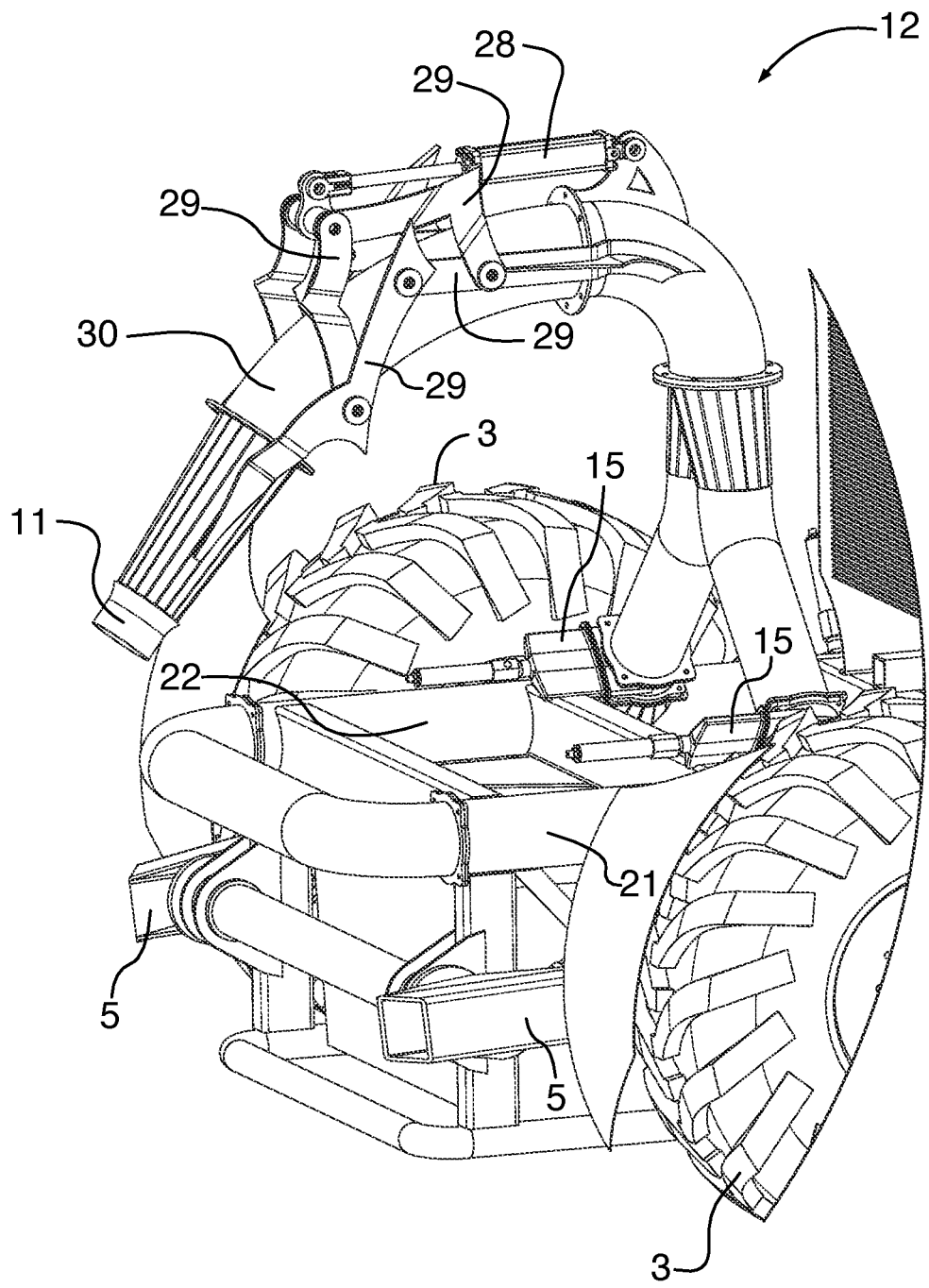
FIG. 5 shows a perspective view of the first fluid nozzle of vehicle.

Turning now to FIG. 5, the first fluid nozzle 11 is able to change angular direction in a vertical plane relative to the vehicle body 1 through operation of a powered first articulation means 12. The first articulation means 12 comprises a hydraulic first articulation cylinder 28 that is coupled to a four bar linkage 29. The four bar linkage serves to amplify the effective stroke length of the first articulation cylinder 28 to cause the nozzle to move through a larger degree of motion in the vertical plane than if the linkage 29 were not present. The first fluid nozzle 11 is connected to the fluid conduits 21, 22 via a flexible conduit 30 that permits articulation of the nozzle. Valves 15 are provided to proportion flow to the first fluid nozzle in a manner as described previously.

Figure 6:
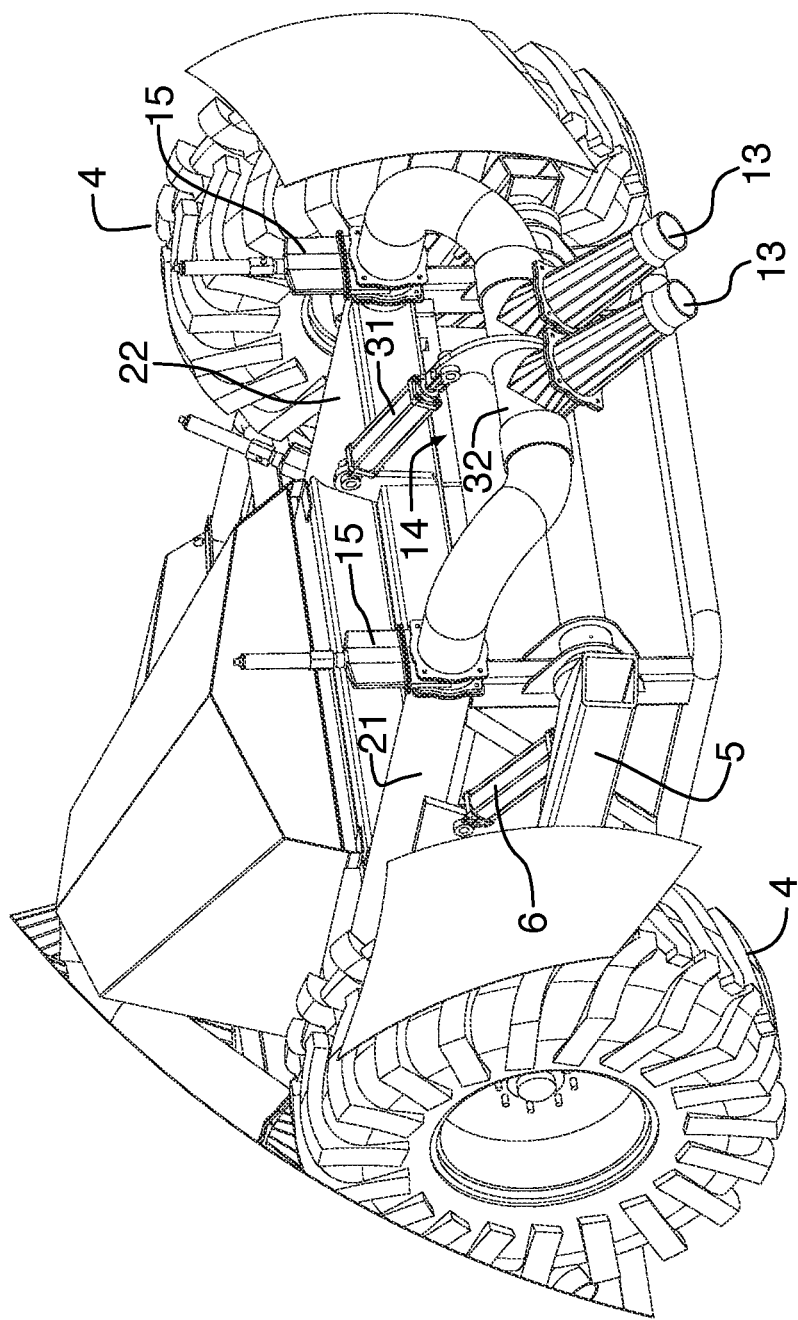
FIG. 6 shows a perspective view of a second fluid nozzle of the vehicle.

Referring to FIG. 6, the second fluid nozzles 13 are connected to the fluid conduits 21, 22 by articulation means 14 that comprises a hydraulic second articulation cylinder 31 mounted to the vehicle body 1 and connected to a rotatable conduit section 32. Actuation of the second articulation cylinder 31 causes the rotatable conduit section 32 to rotate relative to the first and second fluid conduits 21, 22. The second fluid nozzles 13 are provided on rotatable conduit section 32 and thus rotate with the conduit section 32 upon actuation of the articulation cylinder 31. This causes the nozzles 13 to change angular orientation relative to the vehicle body 1 in a vertical plane. The geometry of the second articulation cylinder 31 and the rotatable conduit section 32 is such that the nozzles 13 may be rotated fully downwardly and then upwardly towards the front of the vehicle. This allows an operator to change the amount of forward movement to slow or even reverse forward movement of the vehicle. When operated in conjunction with the valves 15, the nozzles 13 and second articulation structure 14 provide a high degree of control over forward and reverse movement of the vehicle.

Figure 7:
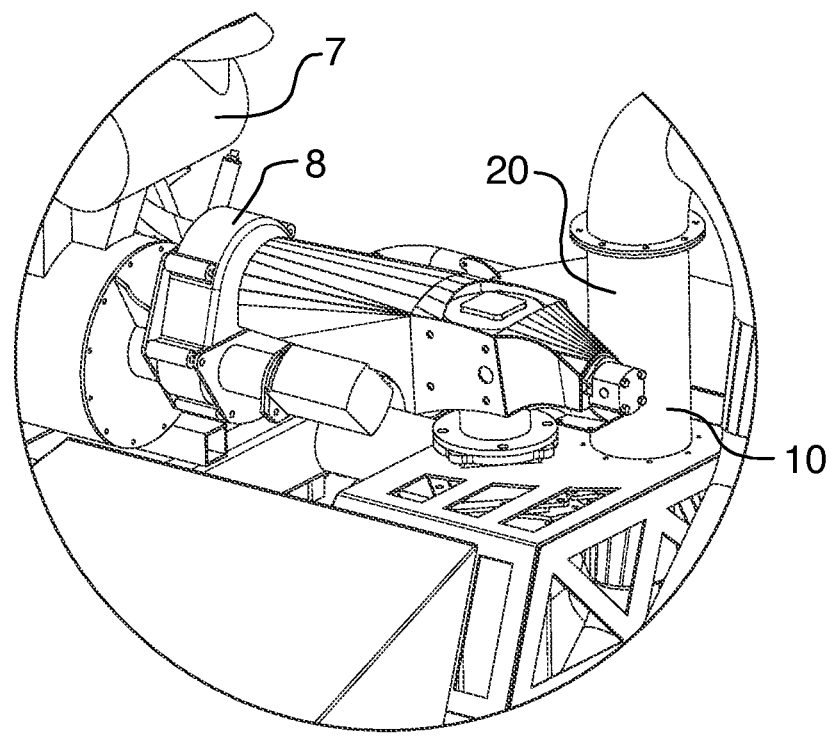
FIG. 7 shows a perspective view of a mechanical drive connecting the power source of the vehicle to the fluid pump and a hydraulic pump of the vehicle.

Referring to FIG. 7, the power source 7 comprises an internal combustion engine connected to a mechanical drive 8 that delivers power to the pump 9 (not shown in FIG. 7) and also to the hydraulic pump 10 that is used to provide hydraulic fluid pressure to the vehicle's hydraulic systems. A transmission is provided within the mechanical drive 8 that allows the rotational speed of the fluid pump 9 to be adjusted independently of the rotational speed of the hydraulic pump 10. The power source 7 is thus mechanically connected to both the fluid pump 9 and the hydraulic pump 10.

Figure 8:
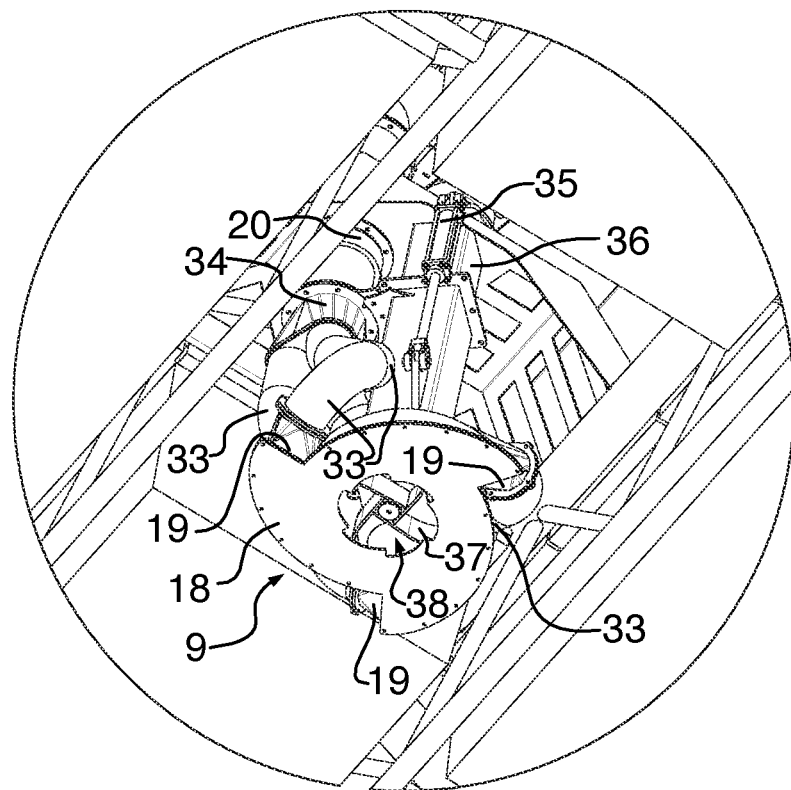
FIG. 8 shows a perspective view of the fluid pump from the underside of the vehicle.

Referring to FIG. 8, the fluid pump 9 comprises a pump housing 18 comprising three tangential fluid outlets 19 that are connected via flexible pump outlet conduits 33 to a combiner 34 that is used to combine the fluid output of the tangential fluid outlets 19 into the single conduit 20. A pump actuation cylinder 35 is provided to cause raising and lowering of the pump 9 and especially the pump housing 18 relative to the vehicle body 1. A telescoping pump support structure 36 is provided for use in combination with the pump actuation cylinder 35. A mechanical drive shaft (not shown) runs through the telescoping pump support structure 36 to provide power to the pump impeller 37. When powered, the impeller 37 draws the fluid to be pumped through an enlarged bottom fluid opening 38 of the pump housing 18. By immersing the pump housing 18 in the fluid, fluid is allowed to enter the pump housing, thereby obviating the need for priming the pump. Raising the pump 9 via the pump actuation cylinder 35 and telescoping pump support structure 36 allows the vehicle to exit the lagoon (or similar fluid reservoir) without damaging the pump. Thus, these structures cooperate with the ground engaging propulsion structure to allow the vehicle to operate on land.

An example of a pump 9 suitable for use with the vehicle is disclosed in co-pending U.S. patent application Ser. No. 13/038,189 filed Mar. 1, 2011, entitled Pump for Immersion Within a Fluid Reservoir, which is incorporated herein by reference.

The location of at least the ground engaging propulsion structure, the power source and the fluid pump are selected to provide a desired location for a center of gravity of the vehicle. The desired location for the center of gravity of the vehicle is selected to improve handling characteristics of the vehicle while floating. The center of gravity is located along the longitudinal centerline of the vehicle, substantially in the middle of the vehicle.

A remote control structure 40 comprises an antenna configured to cause the vehicle to be remotely controllable by an operator remote from the vehicle. The remote control structure comprises a wireless transmitter used by the operator and a wireless receiver on the vehicle. The wireless receiver interfaces with a hydraulic control center on the vehicle to permit control of hydraulically operated components, such as hydraulic cylinders, valves, motors, etc. This allows the operator to control vehicle speed and direction on land or when floating, to raise the wheels and to change the angular orientation of the first and second fluid nozzles. A wireless engine starter is provided to control operation of the internal combustion engine used as a power source. A set of hydraulic controls is optionally provided to modulate engine speed and/or fluid pump rotational speed. Thus, a variety of functions may be controlled remotely that allow the vehicle to operate on land or when floating.

In operation, an operator uses the remote controls to maneuver the vehicle to the lagoon entrance, drive the vehicle into the lagoon, raise the ground engaging propulsion structure (wheels), lower the fluid pump, begin pumping fluid with the fluid pump through the fluid conduits and selectively open at least the second fluid nozzles to cause the vehicle to move out on to the surface of the lagoon. The valves associated with the side fluid nozzles may also be opened or closed to provide directional control of the vehicle on the lagoon. Once the vehicle is in the desired position, the valves associated with the first fluid nozzle are opened and the first articulation structure is used to position the first fluid nozzle at a desired angular orientation relative to the vehicle body. This is generally an upward orientation so that the fluid is sprayed widely to break crusts of material floating on the surface of the lagoon. In this manner, fluid is recirculated and directed to desired locations in the lagoon. As fluid is emptied from the lagoon, the floating vehicle is permitted to lower with the fluid level. When the lagoon has been sufficiently emptied, the operator is able to reverse the foregoing process in order to maneuver the vehicle to the lagoon exit, lower the wheels, and drive the vehicle up the muddy bank out of the lagoon.

The novel features will become apparent to those of skill in the art upon examination of the description. It should be understood, however, that the scope of the claims should not be limited by the embodiments, but are intended by the inventor to be given the broadest interpretation consistent with the wording of the claims and the specification as a whole.

The invention claimed is:

1. An amphibious manure lagoon agitation vehicle comprising:
 a vehicle body having a front, a rear, a middle, a left side, a right side, an underside, and a longitudinal centerline extending from the front to the rear of the vehicle body;
 four powered ground engaging wheels including a front left wheel, a front right wheel, a rear left wheel, and a rear right wheel;
 a first buoyant element located on the left side of the vehicle body in a space between the front left wheel and the rear left wheel;
 a second buoyant element located on the right side of the vehicle body in a space between the front right wheel and the rear right wheel;
 a liquid manure pump configured to pump liquid manure from a manure lagoon and generate a flow of liquid manure through a fluid conduit, the liquid manure pump including a pump housing and an impeller located along the underside of the vehicle body such that the impeller is immersed in the liquid manure of the manure lagoon when the amphibious manure lagoon agitation vehicle is floating in the liquid manure of the manure lagoon;

a power source configured to provide power to both rotationally drive the powered ground engaging wheels when the amphibious manure lagoon agitation vehicle is ground engaging and rotationally drive the impeller of the liquid manure pump; and, a remote control structure configured to control the four powered ground engaging wheels and the flow of liquid manure through the fluid conduit, wherein the speed and/or direction of the amphibious manure lagoon agitation vehicle is remotely controllable by an operator remote from the amphibious manure lagoon agitation vehicle when the amphibious manure lagoon agitation vehicle is ground engaging and when the amphibious manure lagoon agitation vehicle is floating in the liquid manure of the manure lagoon.

2. The amphibious manure lagoon agitation vehicle according to claim 1, wherein the pump housing has a bottom inlet in the pump housing that is immersed in the liquid manure when the amphibious manure lagoon agitation vehicle is floating in the liquid manure of the manure lagoon.

3. The amphibious manure lagoon agitation vehicle according to claim 1, wherein immersion of the impeller within the liquid manure of the manure lagoon obviates the need for priming the liquid manure pump.

4. The amphibious manure lagoon agitation vehicle according to claim 1, wherein the pump housing has a bottom inlet in the pump housing and at least two tangential fluid outlets.

5. The amphibious manure lagoon agitation vehicle according to claim 4, wherein at least one of the tangential fluid outlets is equipped with a flexible connection to the fluid conduit.

6. The amphibious manure lagoon agitation vehicle according to claim 4, wherein the at least two tangential fluid outlets are connected to a combiner that is configured to combine the flow of liquid manure from the tangential fluid outlets into the fluid conduit.

7. The amphibious manure lagoon agitation vehicle according to claim 1, wherein the liquid manure pump comprises a mechanical drive shaft that drives rotation of the impeller within the pump housing.

8. The amphibious manure lagoon agitation vehicle according to claim 7, wherein the impeller is configured to draw liquid manure in the manure lagoon through a bottom opening in the pump housing.

9. The amphibious manure lagoon agitation vehicle according to claim 1, wherein at least one of the buoyant elements comprises a foam filled buoyant chamber.

10. The amphibious manure lagoon agitation vehicle according to claim 1, wherein the four powered ground engaging wheels are configured to be independently driven.

11. The amphibious manure lagoon agitation vehicle according to claim 1, wherein the four powered ground engaging wheels are configured to be independently driven at variable speeds.

12. The amphibious manure lagoon agitation vehicle according to claim 1, further comprising a steering structure configured to change direction of one or more of the four powered ground engaging wheels.

13. The amphibious manure lagoon agitation vehicle according to claim 1, further comprising an articulation cylinder that is coupled to a linkage and configured to adjust an angle, relative to the vehicle body, at which the flow of liquid manure is ejected from the fluid conduit.

14. The amphibious manure lagoon agitation vehicle according to claim 1, wherein the fluid conduit is configured to direct the flow of liquid manure through the air and back into the manure lagoon to disrupt surface crust formed on the liquid manure in the manure lagoon and recirculate the liquid manure in the manure lagoon.

15. The amphibious manure lagoon agitation vehicle according to claim 1, wherein the fluid conduit comprises a terminal opening.

16. The amphibious manure lagoon agitation vehicle according to claim 1, further comprising a hydraulic articulation cylinder configured to change an angle, relative to the vehicle body, at which the flow of liquid manure is ejected from the fluid conduit.

17. The amphibious manure lagoon agitation vehicle according to claim 16, wherein the hydraulic articulation cylinder is coupled to a four bar linkage.

18. The amphibious manure lagoon agitation vehicle according to claim 1, wherein the four powered ground engaging wheels, the power source, and the liquid manure pump are positioned to give the amphibious manure lagoon agitation vehicle a center of gravity that is located along the longitudinal centerline and substantially in the middle of the vehicle body.

19. An amphibious manure lagoon agitation vehicle comprising:
a vehicle body having an underside, a left side, a right side, a front, a rear, and a longitudinal centerline extending from the front to the rear of the vehicle body;
four powered ground engaging wheels comprising a front left wheel, a front right wheel, a rear left wheel, and a rear right wheel;
a liquid manure pump configured to pump liquid manure from a manure lagoon and generate a flow of liquid manure through a fluid conduit, the liquid manure pump including a pump housing and an impeller within the pump housing, the impeller is located along the underside of the vehicle body such that the impeller is immersed in the liquid manure of the manure lagoon when the amphibious manure lagoon agitation vehicle is floating in the liquid manure of the manure lagoon;
a power source configured to provide power to each of the four powered ground engaging wheels and the liquid manure pump; and,
a remote control structure configured to control the four powered ground engaging wheels and the flow of liquid manure through the fluid conduit, wherein the speed and/or direction of the amphibious manure lagoon agitation vehicle is remotely controllable by an operator remote from the amphibious manure lagoon agitation vehicle when the amphibious manure lagoon agitation vehicle is ground engaging and when the amphibious manure lagoon agitation vehicle is floating in the liquid manure of the manure lagoon.

20. The amphibious manure lagoon agitation vehicle according to claim 19, wherein the pump housing has a bottom inlet in the pump housing and at least two tangential fluid outlets.

21. The amphibious manure lagoon agitation vehicle according to claim 20, wherein the fluid conduit is mounted to the vehicle body and at least one of the tangential fluid outlets is equipped with a flexible connection to the fluid conduit.

22. The amphibious manure lagoon agitation vehicle according to claim 20, wherein each of the tangential fluid outlets has an output that is combined with the output of the other tangential fluid outlets in a combiner that is mounted to the vehicle body.

23. The amphibious manure lagoon agitation vehicle according to claim 19, wherein the liquid manure pump comprises a mechanical drive shaft that is configured to drive rotation of the impeller within the pump housing.

24. The amphibious manure lagoon agitation vehicle according to claim 19, wherein the pump housing has a bottom inlet in the pump housing and wherein the impeller is configured to draw the liquid manure in the manure lagoon through the bottom inlet in the pump housing.

25. An amphibious manure lagoon vehicle comprising:
a floatable vehicle body comprising an underside, a first side, a second side, a front, a rear, a first buoyant element on the first side of the floatable vehicle body and a second buoyant element on the second side of the floatable vehicle body;
four powered ground engaging wheels comprising a first front wheel, a second front wheel, a first rear wheel, and a second rear wheel, the first front wheel and the first rear wheel are on the first side of the floatable vehicle body and the second front wheel and the second rear wheel are on the second side of the floatable vehicle body, and the first buoyant element is located in a space between the first front wheel and the first rear wheel and the second buoyant element is located in a space between the second front wheel and the second rear wheel;
a liquid manure pump configured to recirculate liquid manure contained in a manure lagoon, the liquid manure pump including a pump housing and an impeller in the pump housing, the liquid manure pump is positioned along the underside of the floatable vehicle body such that the impeller is immersed in the liquid manure when the amphibious manure lagoon vehicle is floating in the liquid manure of the manure lagoon;
a power source configured to provide power to both rotationally drive the four powered ground engaging wheels when the amphibious manure lagoon vehicle is ground engaging and rotationally drive the impeller of the liquid manure pump; and,
a remote control structure configured to control the four powered ground engaging wheels and the liquid manure pump, wherein the speed and/or direction of the amphibious manure lagoon vehicle is remotely controllable by an operator remote from the amphibious manure lagoon vehicle when the amphibious manure lagoon vehicle is ground engaging and when the amphibious manure lagoon vehicle is floating in the liquid manure of the manure lagoon.

26. An amphibious manure lagoon vehicle comprising:
a floatable vehicle body having a frame, a front, a rear, a middle, an underside, a longitudinal centerline, a transverse centerline, and at least two buoyant elements supported by the frame, the at least two buoyant elements including a first buoyant element that is disposed on a first side of the amphibious manure lagoon vehicle and a second buoyant element that is disposed on a second side of the amphibious manure lagoon vehicle;
four ground engaging wheels that are positioned such that the first buoyant element is disposed in a space between two of the of the four ground engaging wheels on the first side of the amphibious manure lagoon vehicle and the second buoyant element is disposed in a space between two of the of the four ground engaging wheels on the second side of the amphibious manure lagoon vehicle;
four variable speed hydraulic motors, one variable speed hydraulic motor per ground engaging wheel, for powering the four ground engaging wheels;
a liquid manure pump configured to pump liquid manure through a fluid conduit, the liquid manure pump including a pump housing having a bottom fluid inlet, the pump housing located along the underside of the floatable vehicle body such that the pump housing is immersed in the liquid manure when the amphibious manure lagoon vehicle is floating;
a linkage that is configured to adjust an angle, relative to the floatable vehicle body, at which the liquid manure is ejected from the fluid conduit;
an internal combustion engine configured to provide power to both the four variable speed hydraulic motors and the liquid manure pump;
each of the four ground engaging wheels, the internal combustion engine, and the liquid manure pump positioned to provide a center of gravity of the amphibious manure lagoon vehicle that is located along the longitudinal centerline and substantially in the middle of the floatable vehicle body; and,
a remote control structure configured to control the four variable speed hydraulic motors and the liquid manure pump, wherein the speed and/or direction of the amphibious manure lagoon vehicle is remotely controllable by an operator remote from the amphibious manure lagoon vehicle when the amphibious manure lagoon vehicle is ground engaging and when the amphibious manure lagoon vehicle is floating.

27. The amphibious manure lagoon vehicle according to claim 26, wherein the position of each of the four ground engaging wheels, the internal combustion engine, and the liquid manure pump is selected such that the center of gravity of the amphibious manure lagoon vehicle is located at an intersection of the longitudinal centerline and the transverse centerline.

28. The amphibious manure lagoon vehicle according to claim 26, wherein the pump housing of the liquid manure pump is positioned between at least two of the four ground engaging wheels.

29. An amphibious manure lagoon agitation vehicle comprising:
a vehicle body having a front, a rear, a left side, a right side, and an underside;
four powered ground engaging wheels including a front left wheel, a front right wheel, a rear left wheel, and a rear right wheel;
a first buoyant element located in a space on the left side of the vehicle body between the front left wheel and the rear left wheel;
a second buoyant element located in a space on the right side of the vehicle body between the front right wheel and the rear right wheel;
means for circulating liquid manure in a manure lagoon when the amphibious manure lagoon agitation vehicle is in the liquid manure of the manure lagoon;
a power source configured to provide power to each of the four powered ground engaging wheels and the submersible means for circulating liquid manure; and,
a remote control structure configured to control the four powered ground engaging wheels and the submersible means for circulating liquid manure, wherein the speed and/or direction of the amphibious manure lagoon agitation vehicle is remotely controllable by an operator remote from the amphibious manure lagoon agitation vehicle when the amphibious manure lagoon agitation vehicle is ground engaging and when the amphibious manure lagoon agitation vehicle is floating in the liquid manure of the manure lagoon.

30. The amphibious manure lagoon agitation vehicle according to claim 29, wherein the submersible means for circulating liquid manure is located along the underside of the vehicle body.

31. The amphibious manure lagoon agitation vehicle according to claim 29, wherein the submersible means for circulating liquid manure is immersed in the liquid manure when the amphibious manure lagoon agitation vehicle is floating in the liquid manure of the manure lagoon.

32. The amphibious manure lagoon agitation vehicle according to claim 29, wherein the submersible means for circulating liquid manure is a liquid manure pump.

33. The amphibious manure lagoon agitation vehicle according to claim 29, wherein the submersible means for circulating liquid manure is a liquid manure pump with a pump housing and an impeller that are located along the underside of the vehicle body and are submerged in the liquid manure of the manure lagoon when the amphibious manure lagoon agitation vehicle is floating, wherein the impeller is located in the pump housing, and wherein the liquid manure pump includes a bottom inlet in the pump housing and at least two tangential outlets.

34. The amphibious manure lagoon agitation vehicle according to claim 1, wherein the fluid conduit is configured to discharge a spray of liquid manure back into the manure lagoon to disrupt surface crust formed on the liquid manure in the manure lagoon and recirculate the liquid manure in the manure lagoon.

35. The amphibious manure lagoon agitation vehicle according to claim 1, further comprising a linkage configured to adjust an angle, relative to the vehicle body, at which a spray of liquid manure is directed through the air and back into the manure lagoon to disrupt surface crust formed on the liquid manure in the manure lagoon and recirculate the liquid manure in the manure lagoon.

36. The amphibious manure lagoon agitation vehicle according to claim 1, wherein displacement of the vehicle body is configured to disrupt surface crust formed on the liquid manure in the manure lagoon.

37. The amphibious manure lagoon agitation vehicle according to claim 1, wherein the four powered ground engaging wheels are configured to disrupt surface crust formed on the liquid manure in the manure lagoon when the amphibious manure lagoon agitation vehicle drives into the manure lagoon.

38. The amphibious manure lagoon agitation vehicle according to claim 19, wherein the pump housing and the impeller of the liquid manure pump are positioned between at least two of the four powered ground engaging wheels.

39. An amphibious manure lagoon vehicle, comprising:
a floatable vehicle body having a front, a rear, a middle, and an underside;
powered ground engaging wheels;
a liquid manure pump configured to pump liquid manure in a manure lagoon, the liquid manure pump including a pump housing and an impeller located along the underside of the floatable vehicle body at a location that is rearward of the front of the floatable vehicle body and forward of the rear of the floatable vehicle body such that the impeller is immersed in the liquid manure of the manure lagoon when the amphibious manure lagoon vehicle is floating in the manure lagoon;
a power source configured to provide power to both rotationally drive the powered ground engaging wheels when the amphibious manure lagoon vehicle is ground engaging and rotationally drive the impeller of the liquid manure pump; and
a remote control structure configured to control the powered ground engaging wheels and the liquid manure pump, wherein the speed and/or direction of the amphibious manure lagoon vehicle is remotely controllable by an operator remote from the amphibious manure lagoon vehicle when the amphibious manure lagoon vehicle is ground engaging and when the amphibious manure lagoon vehicle is floating.

40. The amphibious manure lagoon vehicle according to claim 39, wherein the powered ground engaging wheels includes a front set of powered ground engaging wheels at the front of the floatable vehicle body and a rear set of powered ground engaging wheels at the rear of the floatable vehicle body.

41. The amphibious manure lagoon vehicle according to claim 40, wherein the floatable vehicle body has a transverse centerline and wherein each of the powered ground engaging wheels are rotatably attached to a spindle.

42. The amphibious manure lagoon vehicle according to claim 41, wherein the impeller of the liquid manure pump is positioned along the transverse centerline of the floatable vehicle body.

43. The amphibious manure lagoon vehicle according to claim 41, wherein the pump housing and the impeller of the liquid manure pump are positioned between the transverse centerline and the spindles supporting the front set of powered ground engaging wheels.

44. The amphibious manure lagoon vehicle according to claim 41, wherein the pump housing and the impeller of the liquid manure pump are positioned between the transverse centerline and the spindles supporting the rear set of powered ground engaging wheels.

45. The amphibious manure lagoon vehicle according to claim 41, wherein the pump housing and the impeller of the liquid manure pump are positioned between the spindles supporting the front set of powered ground engaging wheels and the spindles supporting the rear set of powered ground engaging wheels.

46. The amphibious manure lagoon vehicle according to claim 40, wherein the pump housing and the impeller of the liquid manure pump are positioned between the front set of powered ground engaging wheels and the rear set of powered ground engaging wheels.

47. The amphibious manure lagoon vehicle according to claim 39, wherein the pump housing and the impeller of the liquid manure pump are positioned along the middle of the floatable vehicle body.

48. The amphibious manure lagoon vehicle according to claim 39, wherein the impeller of the liquid manure pump is positioned at the middle of the floatable vehicle body.

49. An amphibious manure lagoon vehicle, comprising:
a floatable vehicle body having a front, a rear, a middle, and an underside;
powered ground engaging wheels;
a liquid manure pump configured to pump liquid manure in a manure lagoon, the liquid manure pump including a pump housing, an impeller, and a substantially vertical drive shaft connected to the impeller, the pump housing having a bottom fluid inlet, the pump housing and the impeller located rearward of the front of the floatable vehicle body and forward of the rear of the floatable vehicle body and along the underside of the floatable vehicle body such that the impeller is immersed in the liquid manure of the manure lagoon when the amphibious manure lagoon vehicle is floating in the manure lagoon, wherein the liquid manure pump has a constant angular orientation relative to the floatable vehicle body;

a power source configured to provide power to both rotationally drive the powered ground engaging wheels when the amphibious manure lagoon vehicle is ground engaging and rotationally drive the impeller of the liquid manure pump; and a remote control structure configured to control the powered ground engaging wheels and the liquid manure pump, wherein the speed and/or direction of the amphibious manure lagoon vehicle is remotely controllable by an operator remote from the amphibious manure lagoon vehicle when the amphibious manure lagoon vehicle is ground engaging and when the amphibious manure lagoon vehicle is floating.

50. The amphibious manure lagoon vehicle according to claim 49, wherein the powered ground engaging wheels includes a front set of powered ground engaging wheels at the front of the floatable vehicle body and a rear set of powered ground engaging wheels at the rear of the floatable vehicle body.

51. The amphibious manure lagoon vehicle according to claim 49, wherein portions of the vehicle that are submerged when the vehicle is floating at substantially the same submerged depth as the pump housing are spaced from and positioned to each side of the pump housing and are spaced from and positioned forward of and rearward of the pump housing, wherein the portions of the vehicle that are submerged when the vehicle is floating and positioned forward of and rearward of the pump housing, and wherein a longitudinal centerline of the vehicle passes through the portions of the vehicle that are spaced from and positioned forward of and rearward of the pump housing.

52. The amphibious manure lagoon vehicle according to claim 51, wherein the portions of the amphibious manure lagoon vehicle that are submerged when the amphibious manure lagoon vehicle is floating are at substantially the same horizontal plane as the pump housing.

53. The amphibious manure lagoon vehicle according to claim 49, wherein components of the vehicle that have substantially the same submerged depth as the pump housing when the vehicle is floating are spaced from and positioned to each side of the pump housing and are spaced from and positioned forward of and rearward of the pump housing and wherein a longitudinal centerline of the vehicle passes through the components of the vehicle that are spaced from and positioned forward of and rearward of the pump housing.

54. The amphibious manure lagoon vehicle according to claim 53, wherein the components of the amphibious manure lagoon vehicle that have substantially the same submerged depth as the pump housing when the amphibious manure lagoon vehicle is floating are in substantially the same horizontal plane as the impeller.

55. An amphibious manure lagoon vehicle, comprising:
a floatable vehicle body having a front, a rear, a middle, and an underside;
powered ground engaging wheels;
a liquid manure pump configured to pump liquid manure in a manure lagoon, the liquid manure pump including a pump housing, an impeller, and a substantially vertical drive shaft connected to the impeller, the pump housing having a bottom fluid inlet, the pump housing and the impeller located rearward of the front of the floatable vehicle body and forward of the rear of the floatable vehicle body and along the underside of the floatable vehicle body such that the impeller is immersed in the liquid manure of the manure lagoon when the amphibious manure lagoon vehicle is floating in the manure lagoon, wherein the liquid manure pump has a constant angular orientation relative to the floatable vehicle body, wherein portions of the vehicle that have substantially the same submerged depth as the pump housing when the vehicle is floating are spaced from and positioned to each side of the pump housing and are spaced from and positioned forward of and rearward of the pump housing, wherein a longitudinal centerline of the vehicle passes through the portions of the vehicle that are spaced from and positioned forward of and rearward of the pump housing;

a power source configured to provide power to both rotationally drive the powered ground engaging wheels when the amphibious manure lagoon vehicle and rotationally drive the impeller of the liquid manure pump; and a remote control structure configured to control the powered ground engaging wheels and the liquid manure pump, wherein the speed and/or direction of the amphibious manure lagoon vehicle is remotely controllable by an operator remote from the amphibious manure lagoon vehicle when the amphibious manure lagoon vehicle is ground engaging and when the amphibious manure lagoon vehicle is floating.

56. The amphibious manure lagoon vehicle according to claim 55, wherein the liquid manure pump is configured to generate a flow of liquid manure through a fluid conduit.

57. The amphibious manure lagoon vehicle according to claim 55, further comprising a linkage configured to adjust an angle, relative to the floatable vehicle body, at which a spray of liquid manure is directed through the air and back into the manure lagoon to disrupt surface crust formed on the liquid manure in the manure lagoon and recirculate the liquid manure in the manure lagoon.

58. The amphibious manure lagoon vehicle according to claim 55, wherein the powered ground engaging wheels comprise a front left wheel, a front right wheel, a rear left wheel, and a rear right wheel, and the amphibious manure lagoon vehicle further comprises a front left motor connected to the front left wheel, a front right motor connected to the front right wheel, a rear left motor connected to the rear left wheel, and a rear right motor connected to the rear right wheel.

59. The amphibious manure lagoon vehicle according to claim 55, wherein the pump housing is mounted to the underside of the floatable vehicle body.

60. The amphibious manure lagoon agitation vehicle according to claim 1, where in the four powered ground engaging wheels contact the ground when the vehicle is ground engaging and do not contact the ground when the vehicle is floating.

61. The amphibious manure lagoon agitation vehicle according to claim 1, wherein the four powered ground engaging wheels comprise a single set of four powered ground engaging wheels and the vehicle does not have any other ground engaging wheels.

62. The amphibious manure lagoon agitation vehicle according to claim 19, where in the four powered ground engaging wheels contact the ground when the vehicle is ground engaging and do not contact the ground when the vehicle is floating.

63. The amphibious manure lagoon agitation vehicle according to claim 19, wherein the four powered ground engaging wheels comprise a single set of four powered ground engaging wheels and the vehicle does not have any other ground engaging wheels.

64. The amphibious manure lagoon vehicle according to claim 25, where in the four powered ground engaging wheels contact the ground when the vehicle is ground engaging and do not contact the ground when the vehicle is floating.

65. The amphibious manure lagoon vehicle according to claim 25, wherein the four powered ground engaging wheels comprise a single set of four powered ground engaging wheels and the vehicle does not have any other ground engaging wheels.

66. The amphibious manure lagoon vehicle according to claim 26, where in the four ground engaging wheels contact the ground when the vehicle is ground engaging and do not contact the ground when the vehicle is floating.

67. The amphibious manure lagoon vehicle according to claim 26, wherein the four ground engaging wheels comprise a single set of four ground engaging wheels and the vehicle does not have any other ground engaging wheels.

68. The amphibious manure lagoon agitation vehicle according to claim 29, where in the four powered ground engaging wheels contact the ground when the vehicle is ground engaging and do not contact the ground when the vehicle is floating.

69. The amphibious manure lagoon agitation vehicle according to claim 29, wherein the four powered ground engaging wheels comprise a single set of four powered ground engaging wheels and the vehicle does not have any other ground engaging wheels.

70. The amphibious manure lagoon vehicle according to claim 39, where in the powered ground engaging wheels contact the ground when the vehicle is ground engaging and do not contact the ground when the vehicle is floating.

71. The amphibious manure lagoon vehicle according to claim 39, wherein the powered ground engaging wheels comprise a single set of four powered ground engaging wheels and the vehicle does not have any other ground engaging wheels.

72. The amphibious manure lagoon vehicle according to claim 49, where in the powered ground engaging wheels contact the ground when the vehicle is ground engaging and do not contact the ground when the vehicle is floating.

73. The amphibious manure lagoon vehicle according to claim 49, wherein the powered ground engaging wheels comprise a single set of four powered ground engaging wheels and the vehicle does not have any other ground engaging wheels.

74. The amphibious manure lagoon vehicle according to claim 55, where in the powered ground engaging wheels contact the ground when the vehicle is ground engaging and do not contact the ground when the vehicle is floating.

75. The amphibious manure lagoon vehicle according to claim 55, wherein the powered ground engaging wheels comprise a single set of four powered ground engaging wheels and the vehicle does not have any other ground engaging wheels.

* * * * *

UNITED STATES PATENT AND TRADEMARK OFFICE
CERTIFICATE OF CORRECTION

| | | |
|---|---|---|
| PATENT NO. | : 12,337,633 B2 | Page 1 of 1 |
| APPLICATION NO. | : 18/073035 | |
| DATED | : June 24, 2025 | |
| INVENTOR(S) | : Ian Nuhn | |

It is certified that error appears in the above-identified patent and that said Letters Patent is hereby corrected as shown below:

In the Claims

1. Column 11, Line 59 and Line 62 Cancel the duplicate "of the" appearing twice in Claim 26; and 2. Column 12, Line 52 Amend Claim 29 to recite "submersible" before the first recitation of "means".

Signed and Sealed this
Twenty-fifth Day of November, 2025

John A. Squires
*Director of the United States Patent and Trademark Office*